(12) United States Patent
Sheesley

(10) Patent No.: US 11,816,629 B2
(45) Date of Patent: Nov. 14, 2023

(54) CONTAINERIZED SHIPPING, STORAGE AND INVENTORY SYSTEM

(71) Applicant: John M. Sheesley, San Antonio, TX (US)

(72) Inventor: John M. Sheesley, San Antonio, TX (US)

( * ) Notice: Subject to any disclaimer, the term of this patent is extended or adjusted under 35 U.S.C. 154(b) by 0 days.

(21) Appl. No.: 17/214,337

(22) Filed: Mar. 26, 2021

(65) Prior Publication Data

US 2021/0304125 A1    Sep. 30, 2021

Related U.S. Application Data

(60) Provisional application No. 63/000,274, filed on Mar. 26, 2020.

(51) Int. Cl.
*G06Q 10/087* (2023.01)
*B66F 9/075* (2006.01)
*B65D 21/08* (2006.01)

(52) U.S. Cl.
CPC ......... *G06Q 10/087* (2013.01); *B65D 21/086* (2013.01); *B66F 9/07504* (2013.01)

(58) Field of Classification Search
None
See application file for complete search history.

(56) References Cited

U.S. PATENT DOCUMENTS

| | | | | |
|---|---|---|---|---|
| 694,415 | A | * | 3/1902 | Phelan .................. A47B 73/00 211/74 |
| 724,977 | A | * | 4/1903 | Weir ........................ A47F 7/26 312/133 |
| 3,204,580 | A | * | 9/1965 | Spence ................... B61D 3/18 410/13 |
| 3,207,095 | A | * | 9/1965 | Hiatt, Jr. ............ A47B 87/0223 108/53.5 |

(Continued)

OTHER PUBLICATIONS

Action Handling; "Ticket Holders"; https://www.youtube.com/watch?v=7CTJUDoDVEQ; Jun. 28, 2021; US.

(Continued)

*Primary Examiner* — Fateh M Obaid
(74) *Attorney, Agent, or Firm* — Miguel Villarreal, Jr.; Gunn, Lee & Cave, P.C.

(57) ABSTRACT

A frame rack system for the transportation, storage and inventory of commodities using intermodal open and closed frame racks configured to be compatible with ISO shipping container conventions. The open framed rack is preloaded and secured for transport or staging by yard personnel from a ground level position. ISO compatible corner pin blocks and forklift pockets allow for flexibility in handling loads at departure and destination. Material handling equipment compatibility allows for materials to be shipped and stored at unimproved sites. Tie-down rings allow for many options in securing loads. The stackability of units provides for an overall working deck height of less than 6 feet. Closed framed racks fit over the open frame racks to allow for (Continued)

multiple decks. Color-coded identifiers and identification codes facilitate storage and inventory. The present invention offers a simple, identifiable, contents-protected, multi-modal logistical solution, incorporating a "One Man One Machine" philosophy.

4 Claims, 56 Drawing Sheets

(56) References Cited

U.S. PATENT DOCUMENTS

| | | | | |
|---|---|---|---|---|
| 3,665,869 | A * | 5/1972 | Howe | B65D 88/129 |
| | | | | 108/53.5 |
| 3,735,713 | A * | 5/1973 | Glassmeyer | B65D 88/129 |
| | | | | 108/53.5 |
| 4,988,003 | A * | 1/1991 | Spitzer | A47B 87/0207 |
| | | | | 220/23.6 |
| 7,896,177 | B1 * | 3/2011 | Toma | A47B 47/0008 |
| | | | | 312/265.4 |
| 8,282,174 | B2 * | 10/2012 | De Cuyper | H02B 1/308 |
| | | | | 312/265.5 |
| 9,549,482 | B2 * | 1/2017 | Podemski | F16B 12/46 |
| 10,925,390 | B2 * | 2/2021 | Reuter | A47B 47/0008 |
| 2004/0257766 | A1 * | 12/2004 | Rasmussen | H05K 7/20736 |
| | | | | 361/689 |
| 2005/0132563 | A1 * | 6/2005 | Schmidt | B21D 39/031 |
| | | | | 29/709 |
| 2006/0025010 | A1 * | 2/2006 | Spitaels | H01R 13/741 |
| | | | | 439/532 |
| 2008/0185309 | A1 * | 8/2008 | Grigsby | B65D 19/44 |
| | | | | 206/454 |
| 2008/0218042 | A1 * | 9/2008 | Hartel | H02B 1/301 |
| | | | | 361/608 |
| 2011/0239123 | A1 * | 9/2011 | Tsujimoto | H04L 67/02 |
| | | | | 715/740 |
| 2013/0032507 | A1 * | 2/2013 | Du Toit | B65D 19/0018 |
| | | | | 206/599 |
| 2014/0124464 | A1 * | 5/2014 | Nijakowski | B65D 19/44 |
| | | | | 211/60.1 |
| 2014/0360552 | A1 * | 12/2014 | Britcher | B65D 19/44 |
| | | | | 211/85.8 |
| 2015/0158629 | A1 * | 6/2015 | Harris | A47B 87/0215 |
| | | | | 108/51.11 |
| 2015/0259098 | A1 * | 9/2015 | Sanger | B65D 88/12 |
| | | | | 220/544 |
| 2017/0327270 | A1 * | 11/2017 | De Villiers | B65D 21/0209 |
| 2018/0215003 | A1 * | 8/2018 | Shoda | B23C 3/12 |
| 2018/0312296 | A1 * | 11/2018 | Sheesley | B65D 19/0077 |

OTHER PUBLICATIONS

Alkonplastics; VISIPRO Pallet Rack Protector Sizes and Features; https://www.youtube.com/watch?v=pFSXyKd2MhA; Jun. 28, 2021; US.

* cited by examiner

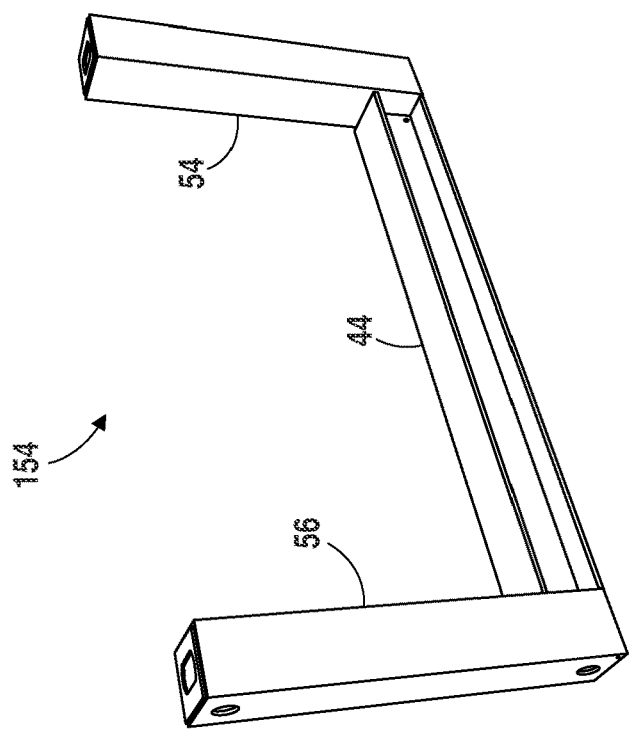
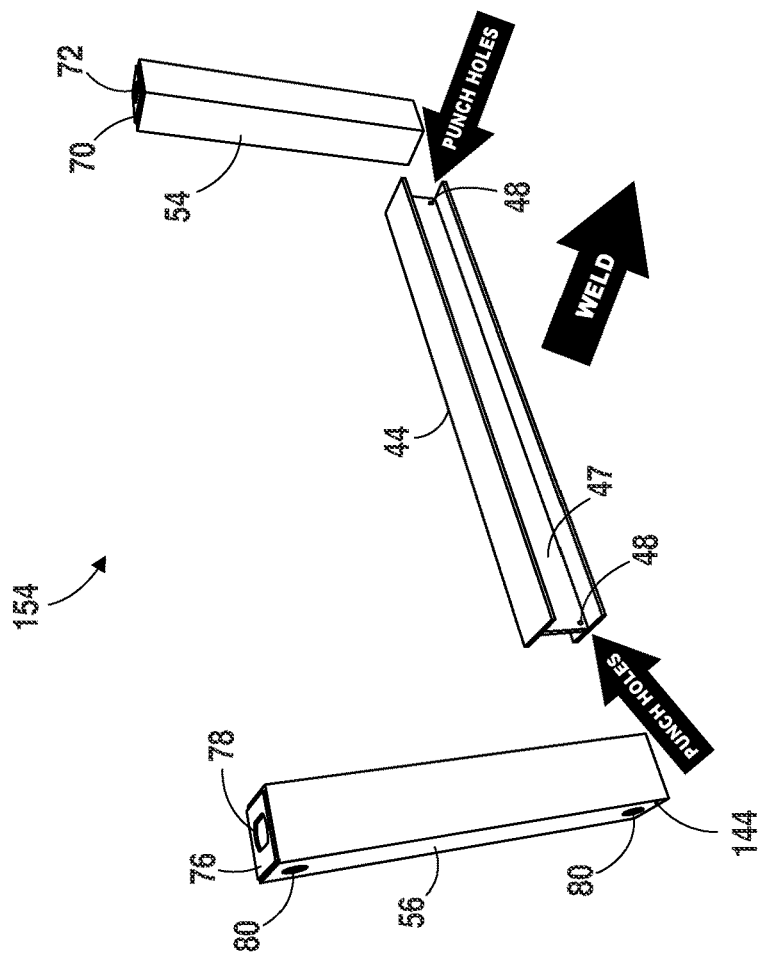
Fig. 7A
Fig. 7B

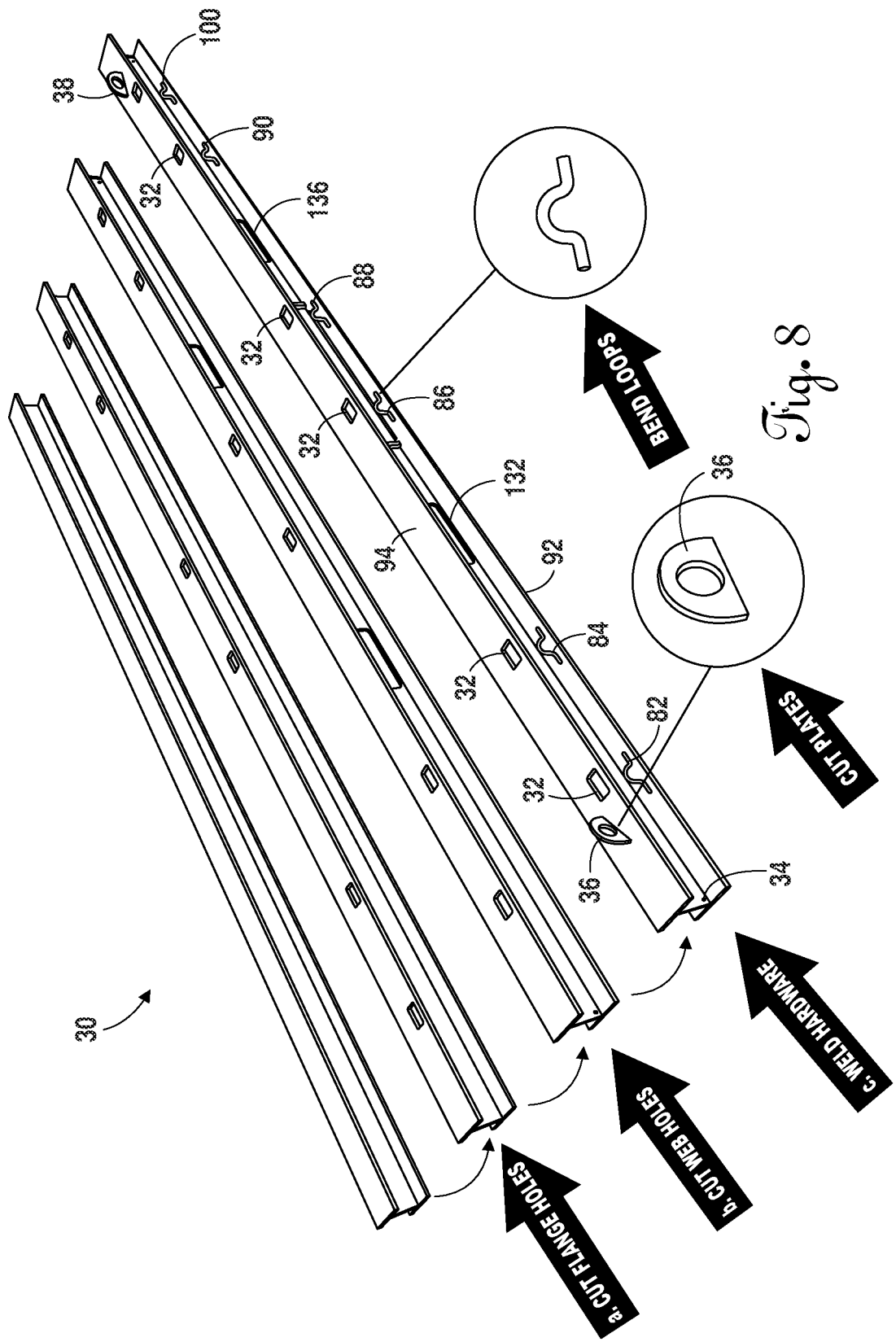

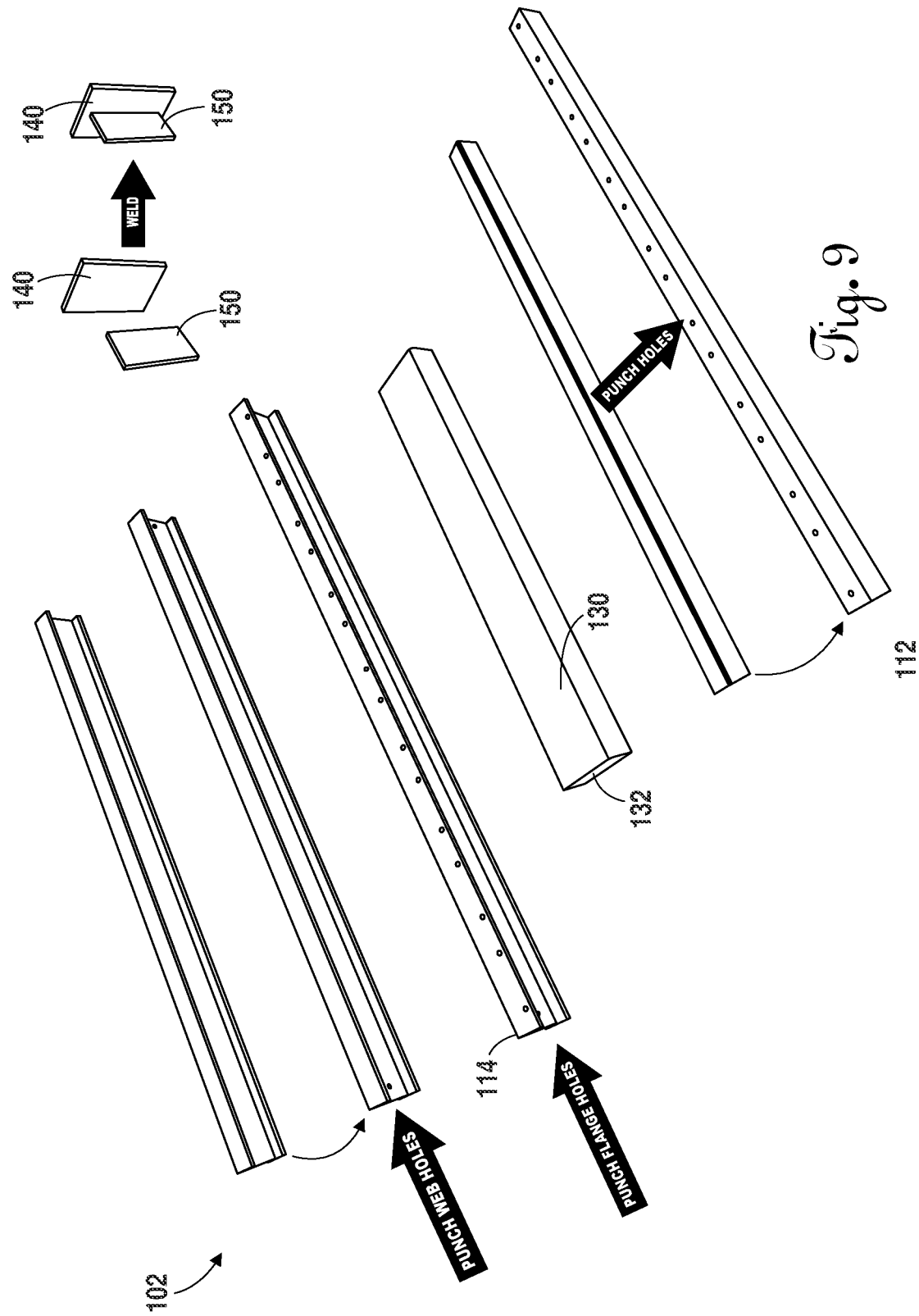

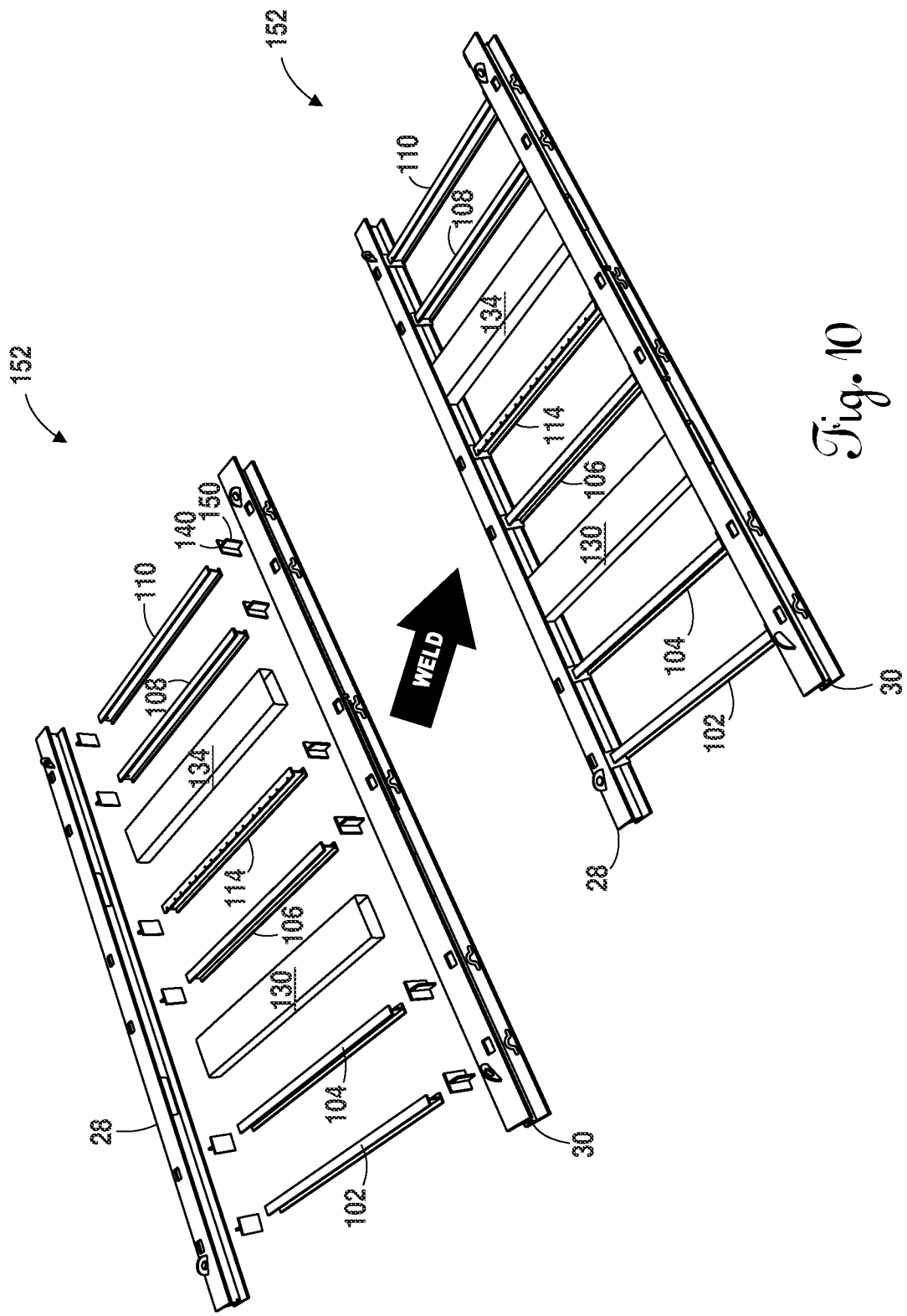

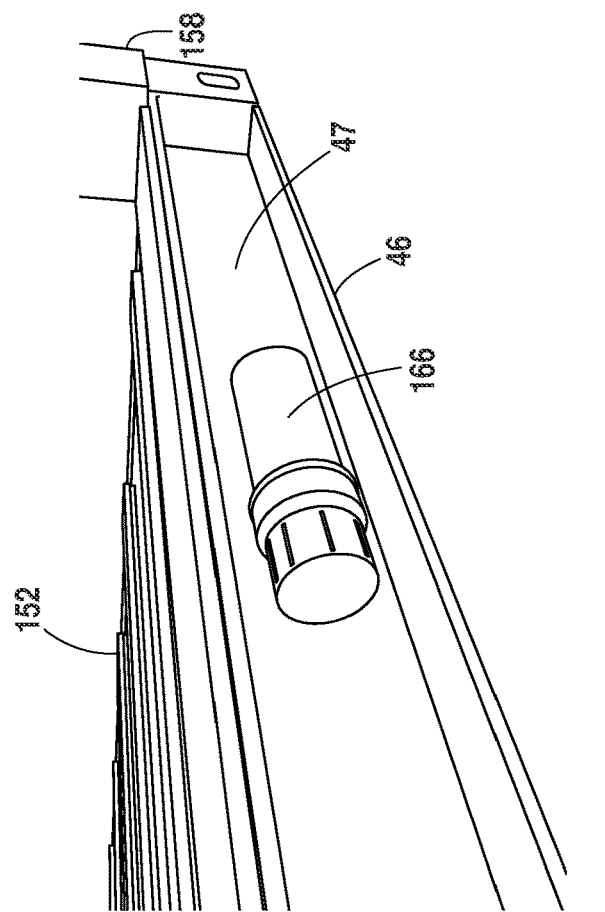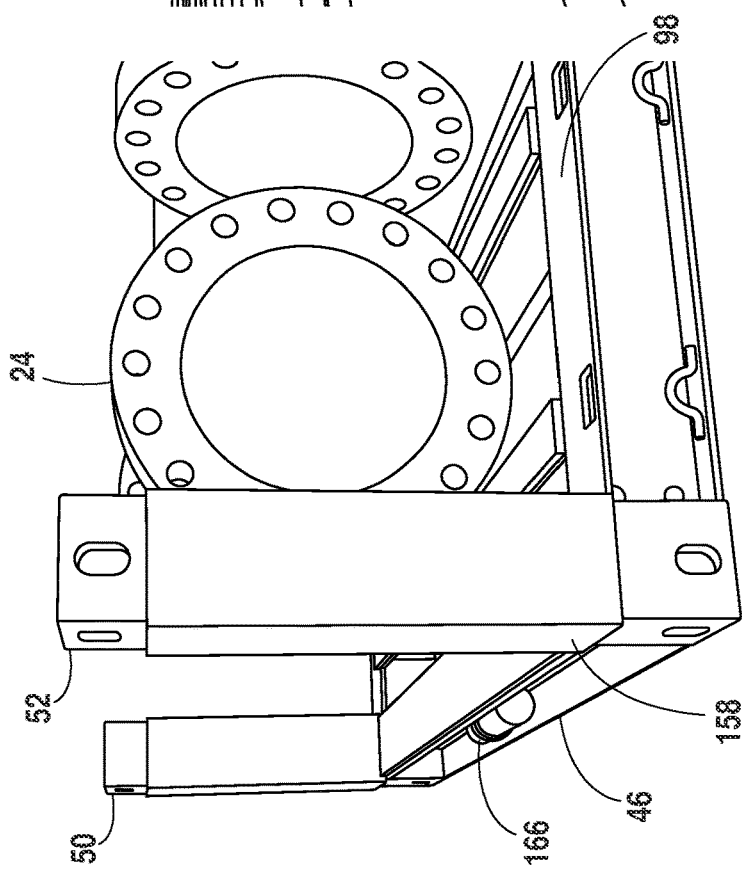

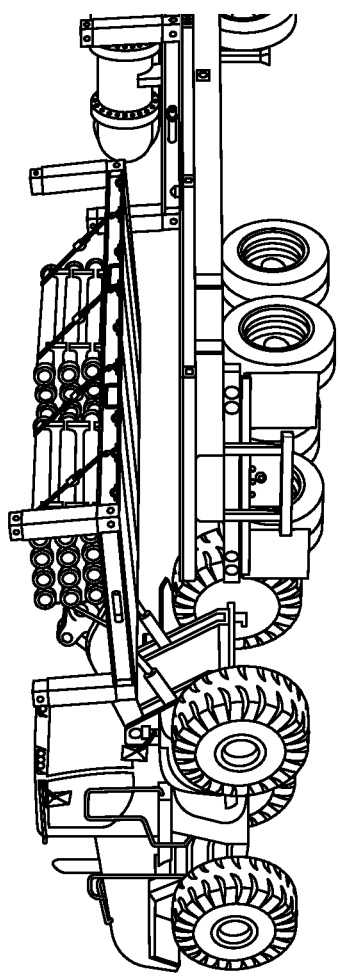
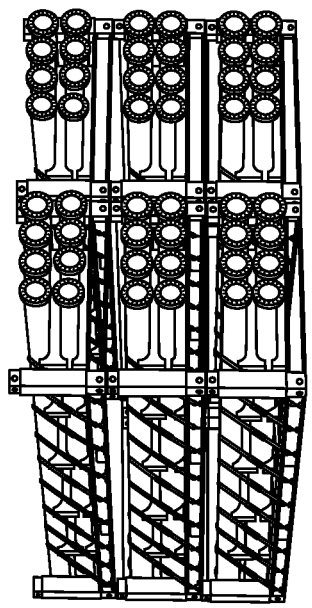
Fig. 33

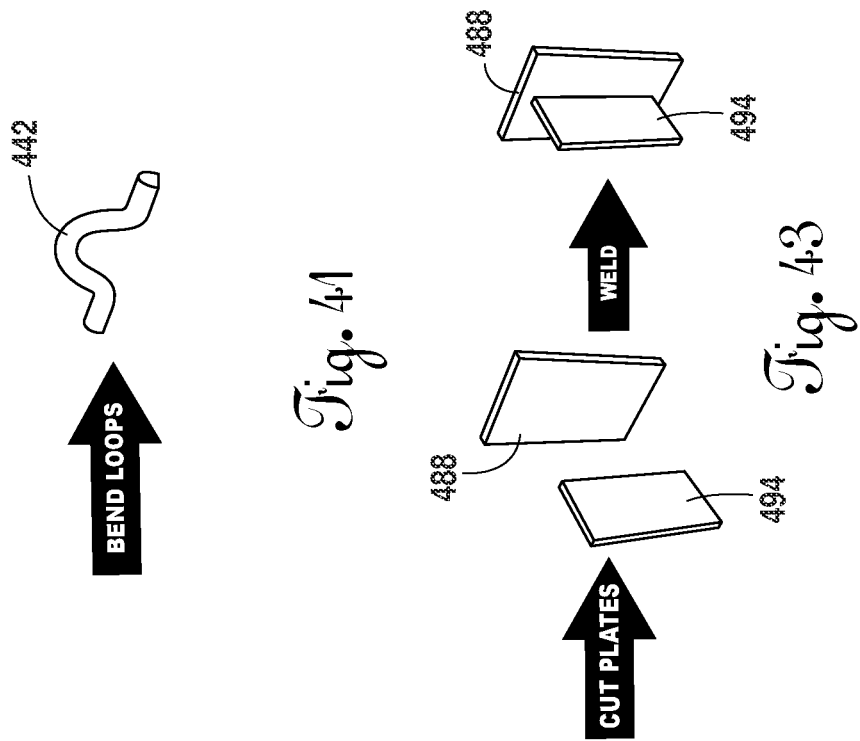
Fig. 41
Fig. 43
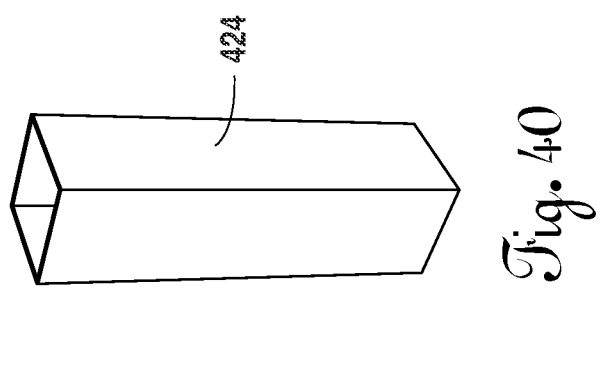
Fig. 40
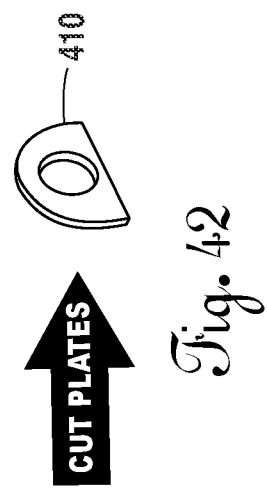
Fig. 42

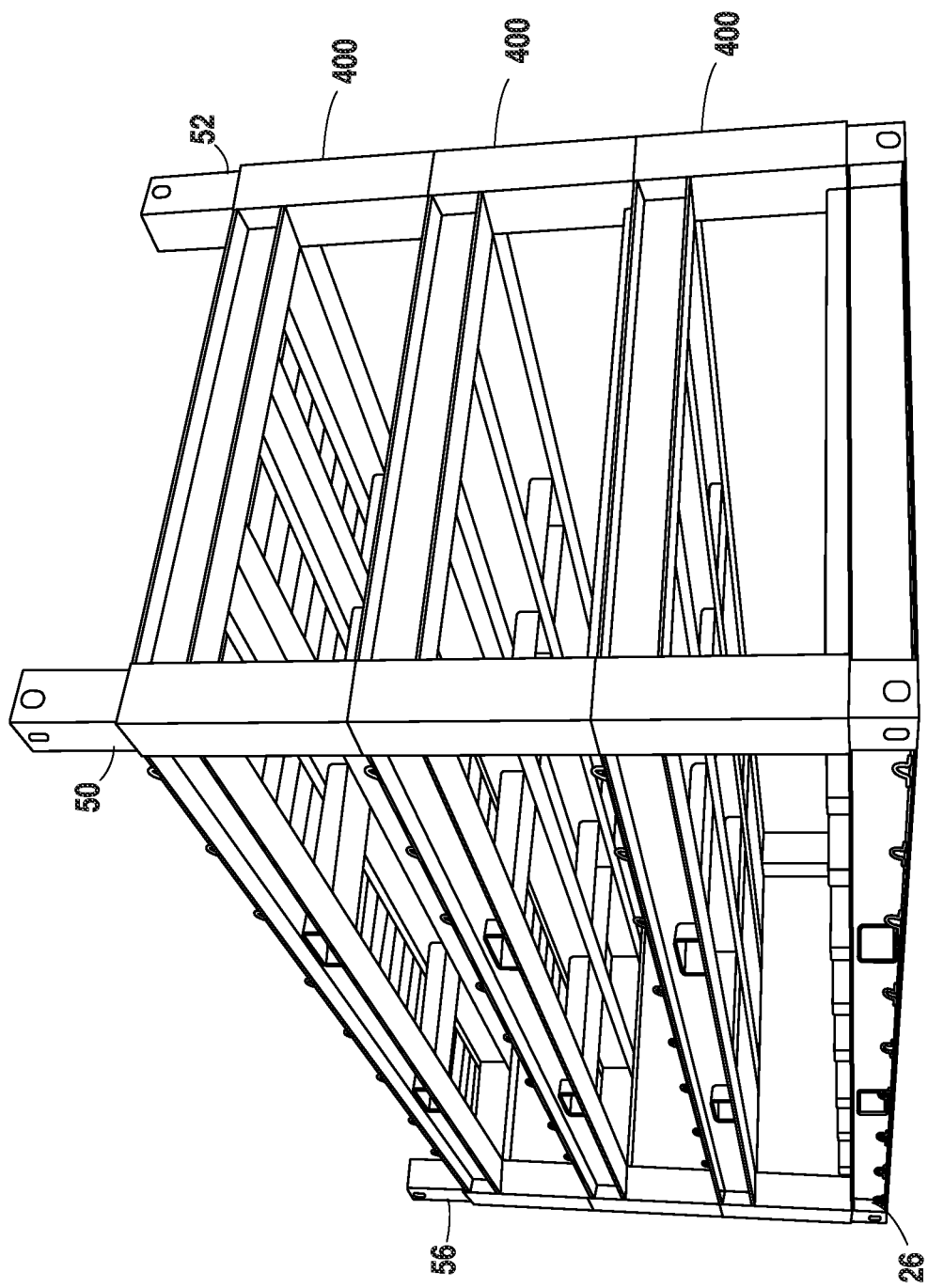

CONTAINERIZED SHIPPING, STORAGE AND INVENTORY SYSTEM

CROSS-REFERENCES TO RELATED APPLICATIONS

This original non-provisional patent application claims priority to and the benefit of U.S. provisional application Ser. No. 63/000,274, filed Mar. 26, 2020, and entitled "Bunks Tray System," which is incorporated by reference herein.

STATEMENT REGARDING FEDERALLY-SPONSORED RESEARCH OR DEVELOPMENT

Not applicable.

BACKGROUND

1. Field of the Invention

The present invention relates to metal shipping container platforms. More specifically, the invention relates to the transportation, storage and inventory of a multitude of commodities such as iron and pipe spools, using intermodal open and closed frame racks configured to be compatible with International Organization for Standardization (ISO) shipping container conventions.

2. Description of the Related Art

According to a recent study, ninety percent (90%) of injuries on a construction site are sprains and pulled muscles, such as a worker's back and ankles. Seventy-five percent (75%) of these injuries are as a direct result of a worker having to repeatedly get on and off a trailer to, for example, secure a load. The cost to companies is estimated to hover about $63,000 per incident on average.

The current systems and methods in place for handling finished products, such as finished pipe spools of various shapes and sizes are laborious, tedious, inefficient, unorganized and unsafe. For example, and referring to FIG. 1, at a fabrication plant or yard 10, finished products or commodities are stored until they are needed. This storage process entails a worker 20 to move the finished product, such as pipe spools 12, from the point of fabrication to another desired location in yard 10. As pipe spools 12 are quite heavy, the use of heavy machinery, such as a tractor or forklift 22 is required to move pipe spool 12 to its storage location. Pipe spools 12 are transported one at a time and placed on pallet 18 for storage. This process continues indefinitely until the desired amount of product has been fabricated and stored until ready to be transported to a job site or other destination. Other products, such as spools 14, elongated spools 16 and irregularly shaped spools 24 are moved about in similar fashion and placed on pallets 18 in yard 10 for storage. Individual spool handling requires many trips and the participation of several individuals. The spools are subsequently secured on truck beds for transport.

There is always a danger that pipe spools 12, spools 14, elongated spools 16, irregularly shaped spools 24 or other heavy finished product may fall from the transporting vehicle, e.g., forklift, to the ground and be damaged. Even worse, the pipe spools 12 may fall on a worker causing serious injury or even death.

The laydown yard 10 eventually gets filled with pallets upon pallets of products and takes up a substantial footprint on the yard, as shown in FIG. 2. As a result, there is only so much inventory that can be held until an order is received and some of the product is shipped away. Worker 20 must attempt to keep tract and inventory the finished product and try to locate a particular product or products when an order for same is received. This is inefficient and results in increased demurrage (waiting time) costs. Further, the laying down of product across a yard makes for disorganization and confusion. As a result, inventory can be difficult to track and manage.

There exists open frame racks in the prior art. However, such existing open frame racks are limited in the commodities they can carry. In addition, the ends of the posts or legs of these platforms terminate in corner blocks which are not flush on the sides, but instead protrude beyond the exterior surfaces of the posts or legs to which the corner blocks attach, making it difficult, if not impossible, to stack. Further, the corner blocks of these existing open frame racks do not allow a subsequent frame rack, e.g., a closed frame rack, to slide over the open frame rack. For example, a cargo container or other frame rack, e.g., closed frame rack, cannot slide over the posts or legs of the open frame rack with a normal ISO block as the fitting would be too loose and not secure creating a dangerous and potentially deadly environment. As a consequence, only a single loaded open frame rack may be transported at a time. Again, this is inefficient, is labor intensive, requires manpower and takes longer.

There is a need for a system that can secure the multitude of commodities for transit before the commodities are placed in the yard. There is a further need for a system in which fewer trips are required for the handlers and also requires a substantially less number of individuals, freeing others to perform other cost savings functions and reducing demurrage costs.

There is also a substantial need for a system in which a load may be safely be secured to a transport medium without the need to constantly be getting on and off a trailer, thus, minimizing the risk of injury or even, in some cases, death.

There is also a substantial need for a system in which multiple loads may be loaded to a transport media in a stacked configuration safely and securely, thereby minimizing the number of trips necessary to both load and transport the loads to a desired location.

There is also a need for a system to provide a mechanism to track and easily inventory product at the yard. There is also a need for such secured commodities to be able to take up a smaller footprint in the yard such that more inventory may to be held, and for same to be quickly and efficiently located, pulled, and loaded on a trailer or other transport vehicle or taken to a specified location to be used within the yard.

BRIEF SUMMARY OF THE INVENTION

The present invention provides a system to simplify project logistics in the construction industry. Specifically, the invention relates to the transportation, storage and inventory of a multitude of commodities such as iron and pipe spools, using open and closed frame racks configured to be compatible with ISO shipping container conventions.

The open framed rack, available under the trademark BUNKS®, functions as storage and shipping platforms for a wide variety of materials. ISO compatible corner pin blocks and standard forklift pockets allow for flexibility in handling loads at departure and destination. Rough Terrain Container handler compatibility allows for materials to be shipped and stored at unimproved sites. Multiple tie-down rings allow for many options in securing loads. Stackability of up to two units for an overall working deck height of less than 6 feet. Open design and unit designation allow for easier inventory control.

The present invention offers a simple, identifiable, contents-protected, multi-modal logistical solution, incorporating a "One Man One Machine" philosophy.

Open Framed Rack (Bunks)

The intermodal open framed racks are preloaded and secured for transport or staging by yard personnel from the safety of a ground level position. Tie-down anchors and strap ports are located at the ends of each crossbeam, and on both end beams. Corner pin blocks and forklift pockets allow open framed rack to be used with all capacity-rated rough terrain Material Handling Equipment (MHE). In many cases there might be several smaller pieces that could easily fit but the open framed rack become overwhelmed. When this occurs, the closed framed rack of the present invention is incorporated into the system of the present invention.

Closed Framed Rack (Tray)

The intermodal closed framed rack, available under the trademark THE is configured to be compatible with shipping container conventions that fit over metal shipping container platforms, namely, intermodal open frame racks configured to be compatible with shipping container conventions to allow for multiple decks. The closed framed rack of the present invention is also ISO compatible.

The tray will slip over a bunk. The corners of the tray have slots that slide over the upward extending members of each corner of the bunk such that when slid over and in place, the tray provides an additional platform upon which to place items (e.g., tubing, etc.). The upward extending members at each corner of the bunks may be lengthened such that up to three trays may be fitted over a single bunk providing an additional three platforms to store and transport products and materials on that bunk.

The closed framed rack can also be preloaded and secured by personnel working from the ground. In the event that the base level of the open framed rack is full but there is still air space above, the closed framed rack can simply be lifted and placed in position on the open framed rack. There may be multiple closed framed racks on an open framed rack. There is no requirement for further securement, binding or lashing required. The open framed rack has now doubled its capacity while segregating components with the closed framed rack adapter. The open framed rack and closed framed rack can be separated and used individually. However, the closed framed rack requires the open framed rack for transport. The system of the present invention places a tray right on top of a bunks platform and then the bunks with the tray incorporated can both be placed on a truck by a single individual.

Configurations of the open framed rack and closed framed racks can accommodate up to three levels of storage. The closed framed racks offer a "slide-in, slide-out" identifier in multiple colors and ID code preferences. This system contains fewer components than transport systems that currently exists. The cost savings of manpower and equipment is staggering.

An advantage of the present invention is to allow for multiple levels of product to be assembled, stored and transported. In addition, a single individual, e.g., manager, as the operator of a heavy-duty forklift, an articulating forklift or an RT240/290 equipped with a container top handling attachment, can pick up, move, load, stack and/or place the entire truckload of a commodity without the need for a ground spotter, a tag line holder or a driver to secure the load other than just engaging the twist locks. Thus, a single individual—"One Man One Machine"—may quickly and efficiently perform the job and accomplish any mission. An additional advantage, thus, is the resulting substantial savings in time and costs.

For purposes of this application, the terms "open frame rack," "flatrack" and "bunks" are synonymous. Similarly, the terms "closed frame rack" and "tray" are synonymous.

BRIEF DESCRIPTION OF THE FIGURES

FIG. 7A-7B depict the end goal posts of an embodiment of the open frame rack of the present invention and the method of attachment for same.

FIG. 8 depicts the side rails in an I-beam configuration of an embodiment of the present invention.

FIG. 9 shows the cross members of an embodiment of the present invention.

FIG. 10 shows an exploded view of the deck and manner of attachment of components for same of an embodiment of the present invention.

FIG. 15 is a closeup partial view of one end of an embodiment of the present invention showing sleeves over the pin posts and attachment of document container.

FIG. 16 is a closeup partial view of one end of an embodiment of the present invention showing attachment of document container.

FIG. 33 depicts a project site showing stacked cargo-loaded open framed racks of the present invention at a project site or onsite staging area and arranged in order of assembly.

FIG. 40 is a front view of a post or leg of an embodiment of the closed frame rack of the present invention.

FIG. 41 depicts the tie-down anchor of an embodiment of the closed frame rack of the present invention.

FIG. 42 depicts the tie-down loop of an embodiment of the closed frame rack of the present invention.

FIG. 41 depicts the attachment mechanism for plates of an embodiment of the closed frame rack of the present invention.

FIG. 63 shows a perspective view of an alternative embodiment of the present invention showing an assembly of an open frame rack and three closed frame racks.

DETAILED DESCRIPTION OF THE INVENTION

Bunks

Figure 1:
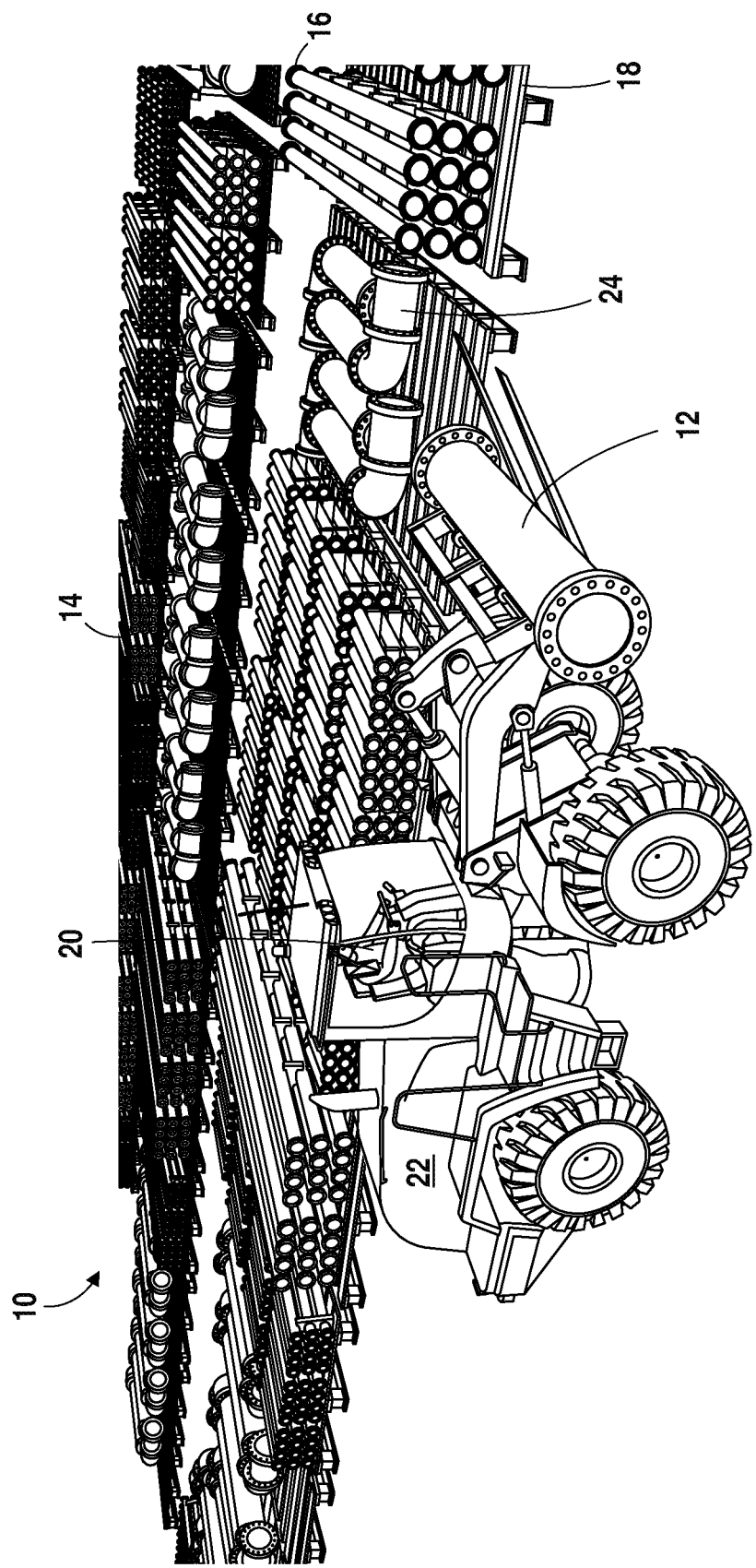
FIG. 1 depicts an environmental perspective of the prior art.
Figure 2:
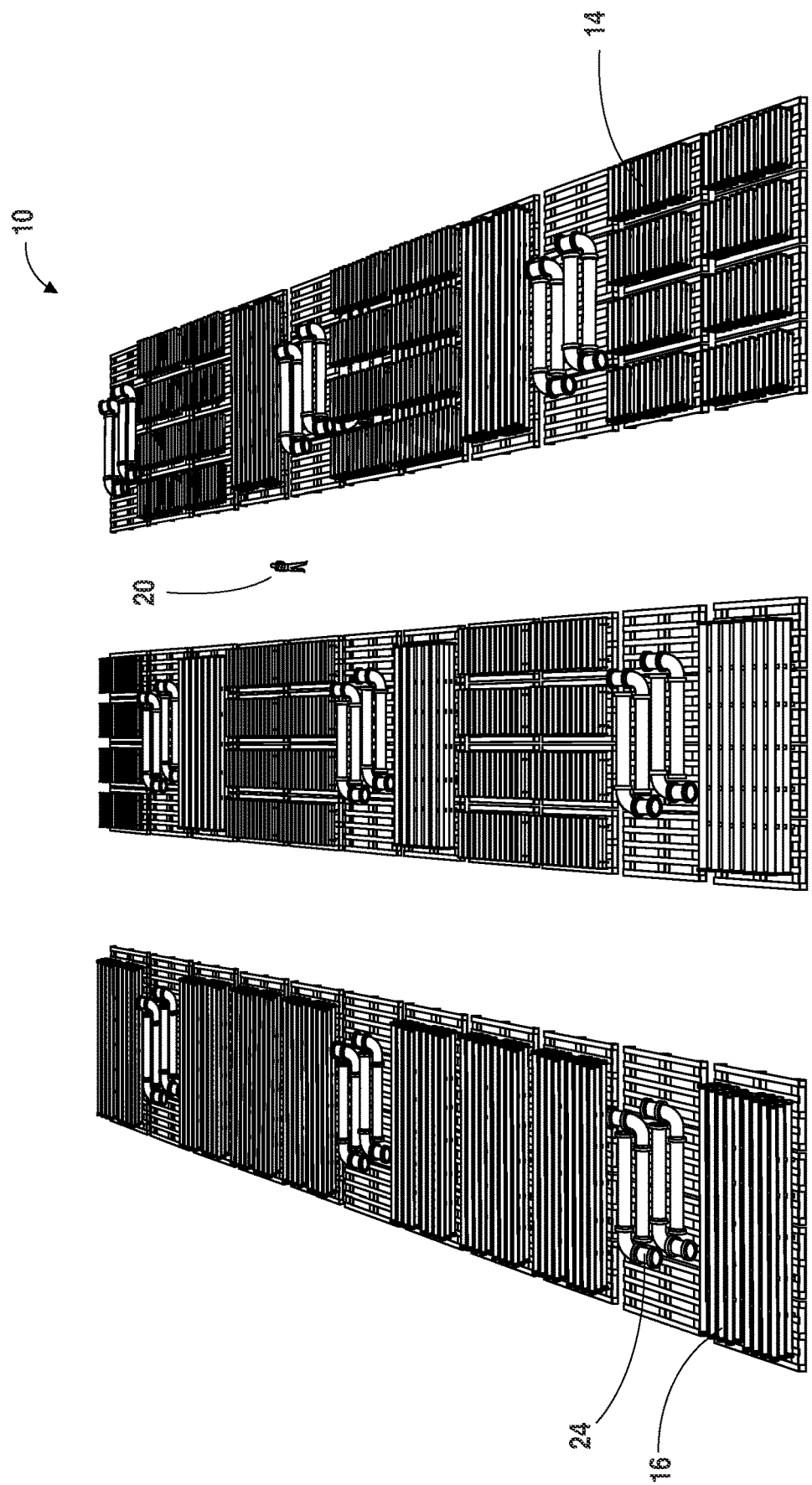
FIG. 2 is an environment aerial view of a yard with placement of equipment performed by the prior art.
Figure 3:
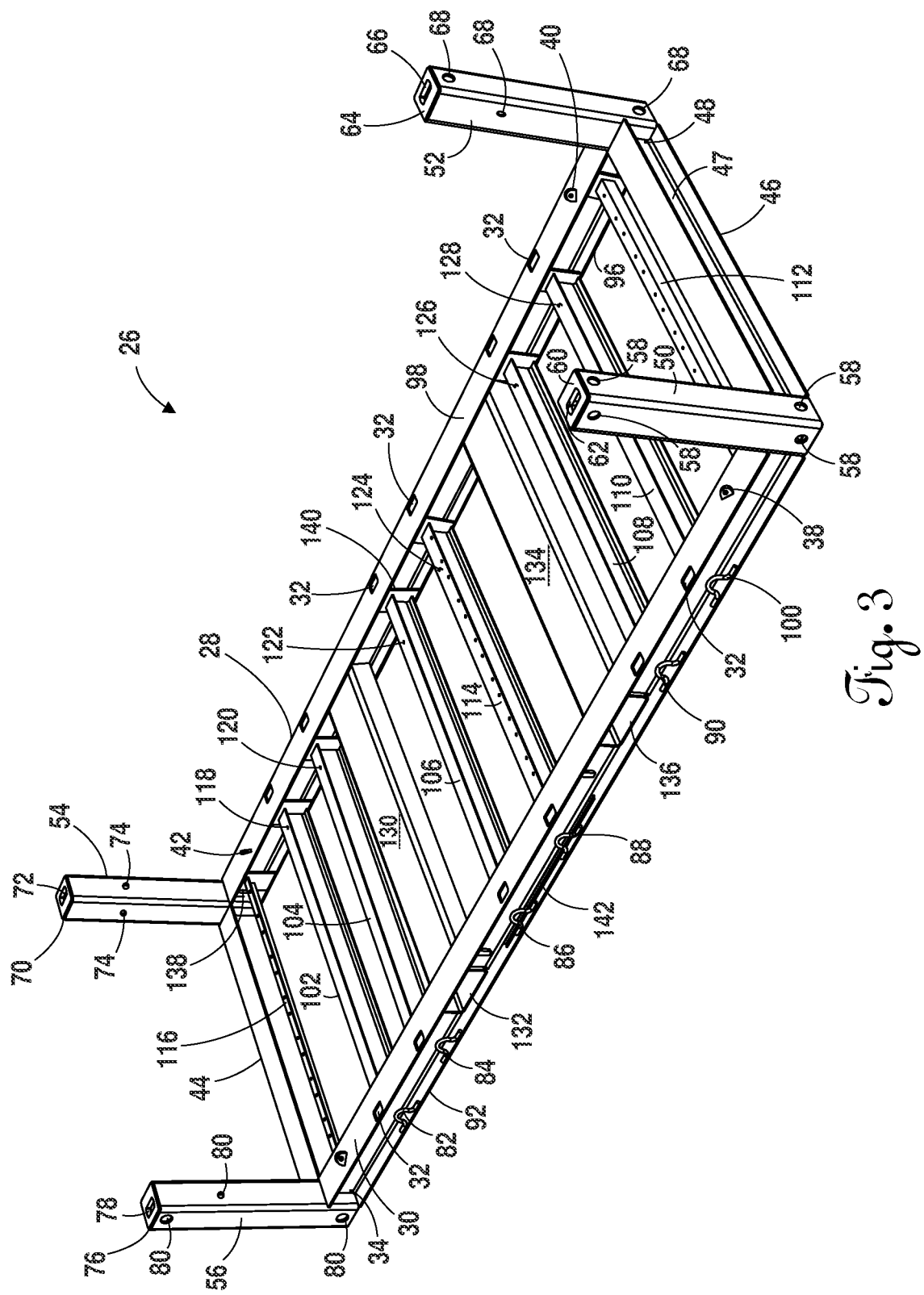
FIG. 3 is a perspective view of an embodiment of the open frame rack of the present invention.
Figure 4:
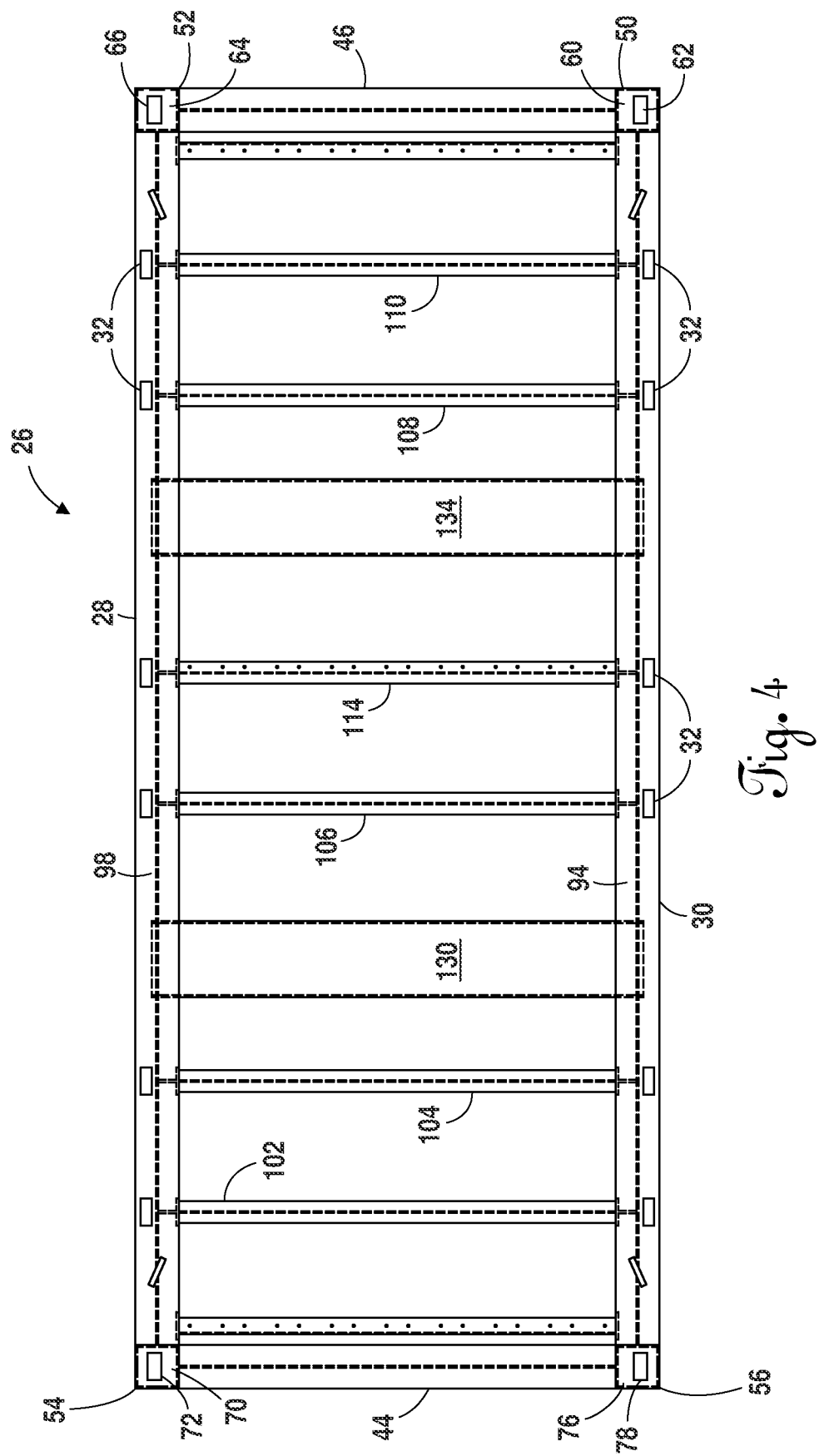
FIG. 4 is a top view of an embodiment of the open frame rack of the present invention.
Figure 5:
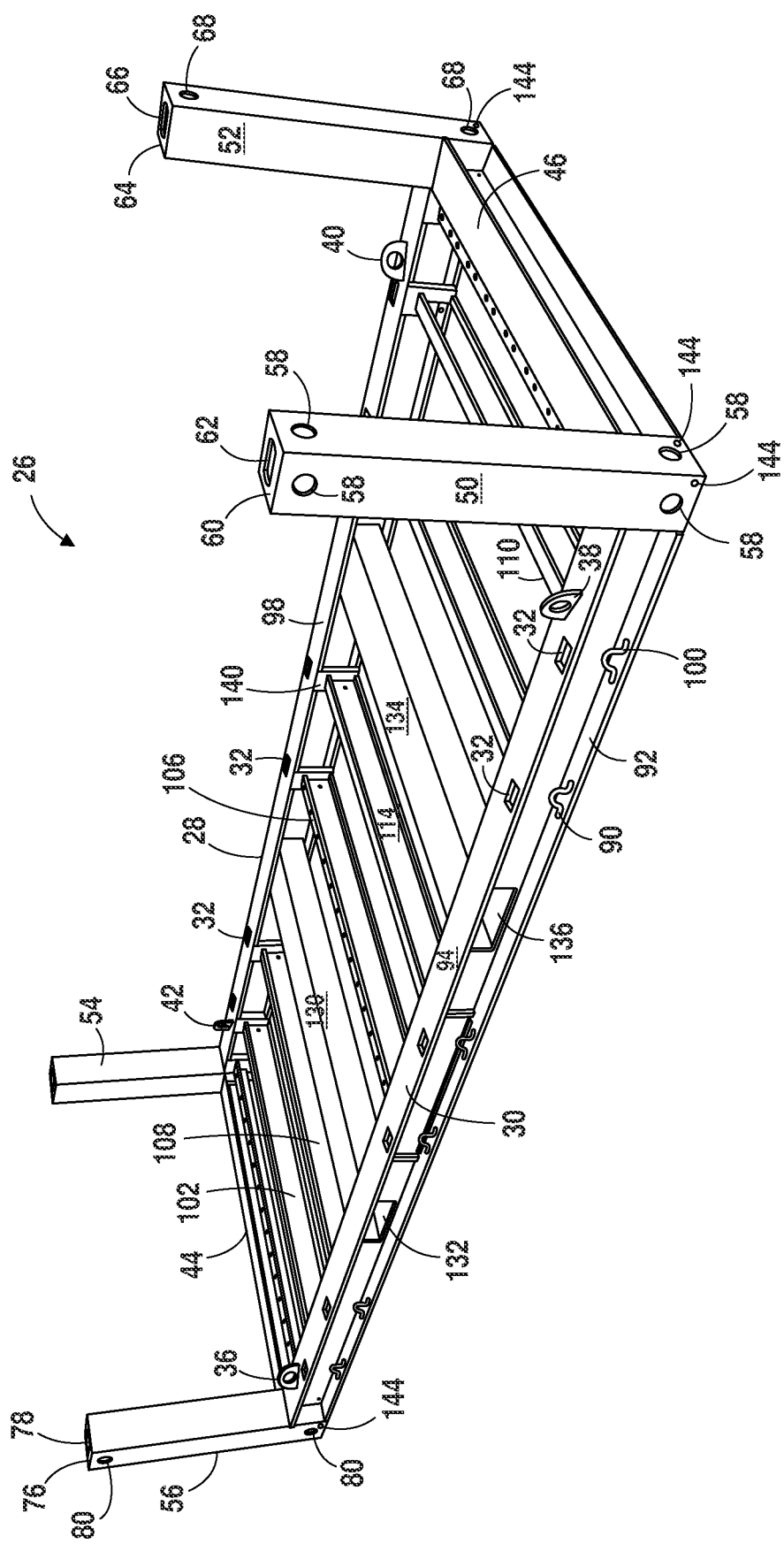
FIG. 5 shows a perspective view of an embodiment of the open frame rack of the present invention.

Referring now to FIGS. 3-5, open frame rack 26 has a rectangularly configured frame comprised of side rails 28 and 30, end rails 44 and 46 and pin posts 50, 52, 54 and 56 at the corners connecting side rails 28 and 30 and end rails 44 and 46.

Still referring to FIGS. 3-5 and also to FIG. 8, side rails 28 and 30 have I-beam configurations. Tie-down anchors are on the bottom of each I-beam side rail. For example, tie-down anchors 82, 84, 86, 88, 90 and 100 are spaced at predetermined intervals along lower surface 92 of side rail 28. Tie-down anchors 82, 84, 86, 88, 90 and 100 on the bottom of each I-beam side rail 28 are vertically aligned with a plurality of strap ports 32 along upper surface 94 of I-beam side rail 28. A strap, such as a tie down strap or other securing device, such as rachet straps, passes through strap ports 32 and is secure to tie-down anchors 82, 84, 86, 88, 90 and 100. In this fashion, the tie-down strap (not shown) is protected from damage during transport. Side rail 30 has a similar configuration. Side rails 28 and 30 are 8" in height. Decking strip 142 is located on lower surface 92 of side rail 30 between forklift pockets 132 and 136. The present invention contains six tie-down anchors. However, more tie-down anchors (and corresponding strap ports) may be included and still remain within the contemplation of the present invention.

Still referring to FIGS. 3-5, drain holes 34 (only one of which can be seen in FIG. 3) are at each end of side rails 28 and 30 proximate to end rails 44 and 46. Anchor mounts 36, 38, 40 and 42 at each end of side rails 28 and 30 extend distally from upper surfaces 94 and 98 of side rails 28 and 30. Anchor mounts 36, 38, 40 and 42 provide additional anchor points to engage, hoist and transport open frame rack 26.

Still referring to FIGS. 3-5, and also to FIGS. 7A and 7B, end rails 44 and 46 are perpendicular to side rails 28 and 30. End rails 44 and 46 have I-beam configurations. Punch hole 48 are located on middle surface 47 of end rail 46. The connection of pin posts 56 and 54 to either end of end rail 44 forms a "goal post" 154, as shown in FIG. 7B. Pin posts 50 and 52 and end rail 46 form a similar goal post opposite goal post 154.

Figure 6C:
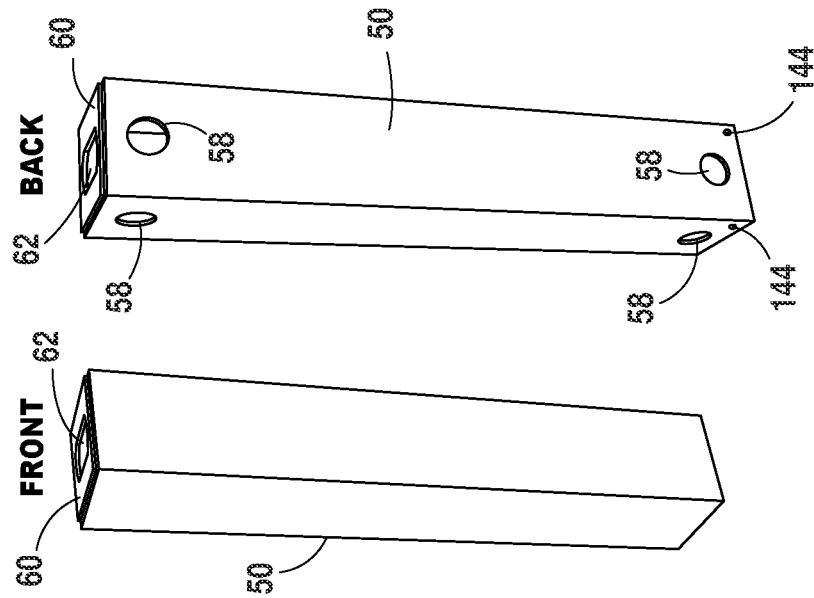
FIGS. 6A-6C are the configured plate, or pin pad, and its attachment to the pin posts of an embodiment of the open frame rack of the present invention.
Figure 6B:
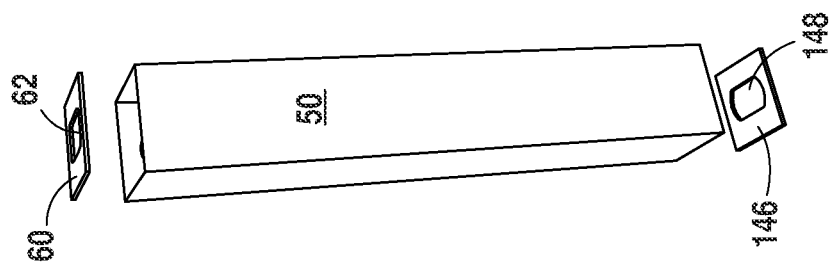
Figure 6A:
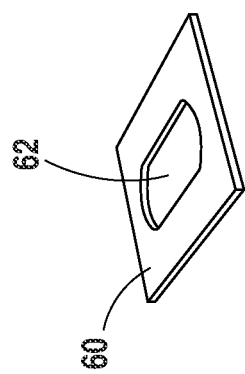

Referring still to FIGS. 3-5 and also now to FIGS. 6A-6C, a critical feature of the present invention is the combination pin post and pin pad incorporated into open frame rack 26. There are four pin posts 50, 52, 54 and 56. One pin post at each corner of the bunk or open frame rack 26. Pin post 50 is comprised of hollow steel tubing in a rectangular configuration. Pin post 50 connects to end rail 46 and side rail 30. The connection is permanent and may be accomplished through welding. Pin post 50 is flush with the edges of the lower surface 92 and upper surface 94 of I-beam side rail 30. Apertures 58 on pin post 50 provide engagement locations for locking pins (not shown). Drainage holes 144 allow any moisture collected within pin post 50 to drain out. Pin posts 52, 54 and 56 are similarly configured.

Figure 58:
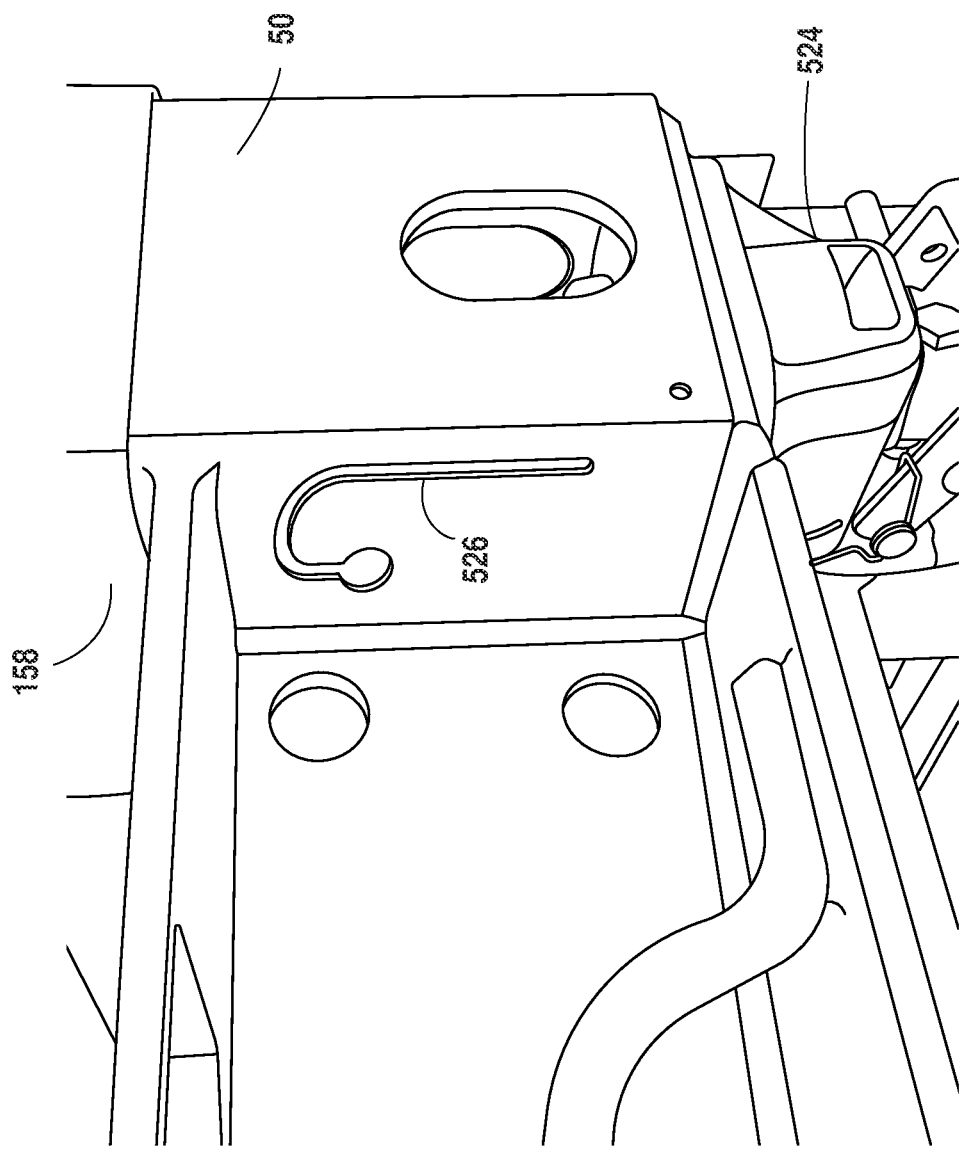
FIG. 58 is a partial closeup view showing a "J" slot within the bottom portion of the pin post of an embodiment of the open frame rack of the present invention.
Figure 59:
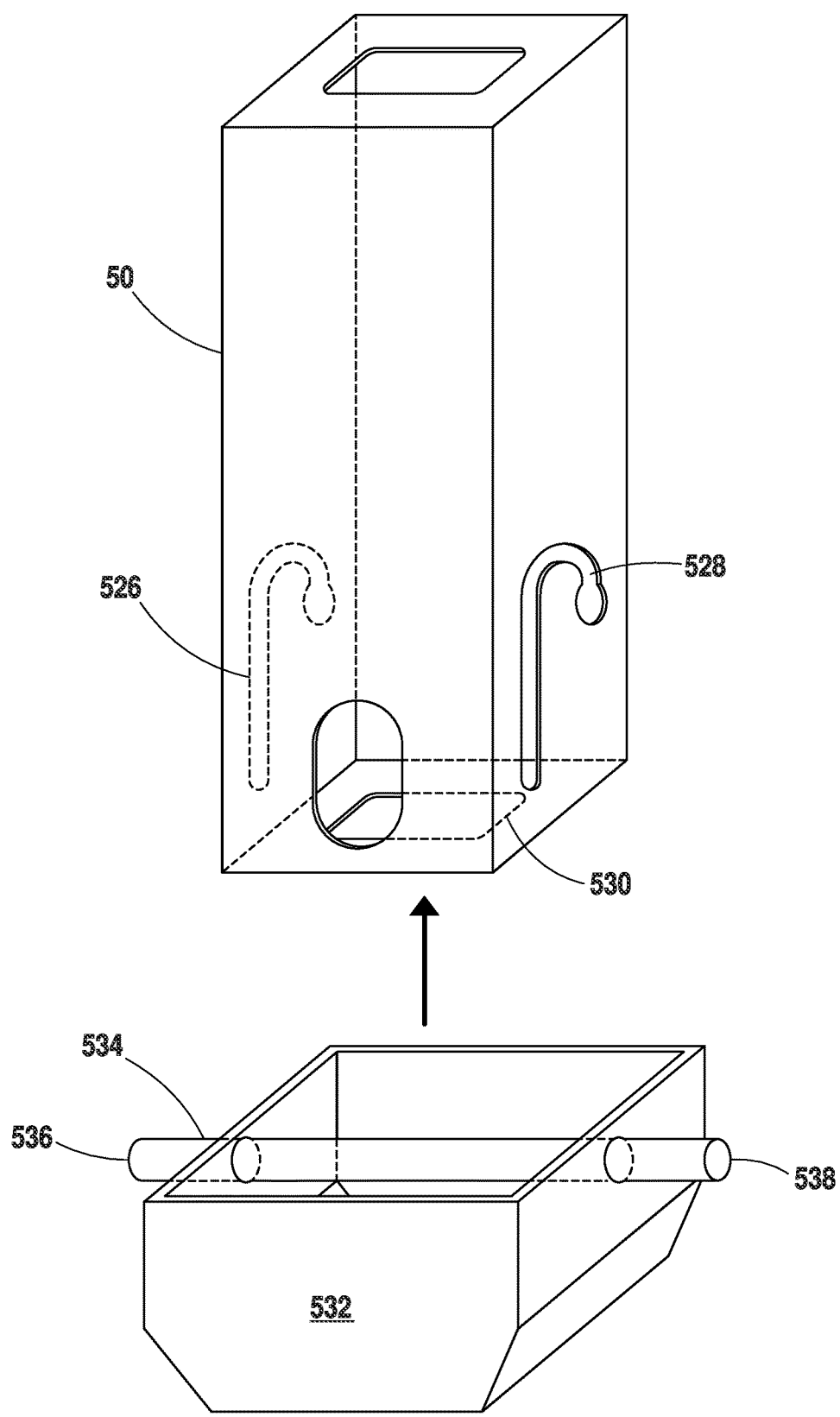
FIG. 59 depicts a stacking block and pin post having "J" slots within the bottom portion of either side of the pin post of an embodiment of the open frame rack of the present invention to accommodate the stacking block within the pin post.

In an alternative embodiment, and turning now to FIGS. 58-59, the pin posts may also contain stacking blocks within. For example, pin post 50 has "J" slot 526 and "J" slot 528 on opposite sides. Pin post 50 contains stacking block 532. Stacking pin 534 having ends 536 and 538 fits inside pin post 50 configured to deploy when it is desired to stack bunks 26 and have the secure stack. When placing bunk 26 on a trailer, pin 534 could be elevated within the post allowing pin 534 on the trailer to secure bunk 26. Stacking block 532 is placed within pin post 50 via aperture 530 and resides permanently within the bottom of pin post 50. But, when it is desired to stack one pin post on top of another longer pin post (as in stacking of bunks 26), stacking block 532 is moved along so that the stacking block sits on the bottom portion of the candy cane slot. If no stacking is desired, the stacking block is moved within the grooves of the candy cane slots such that ends 536 and 538 of stacking pin 534 slide stacking block 532 up and over and rests at the higher end of the "J" slots 526 and 528, respectively.

Each pin post is 48" high measured from the ground to the top of the pin post. A "bunk 48", then, has 8" in common with the I-beam and the remaining 40" of the pin post is above the I-beam. The height of the pin posts in the present invention is 48". However, different heights, such as 24" and 60", may also be used without deviating from the present invention.

Figure 60:
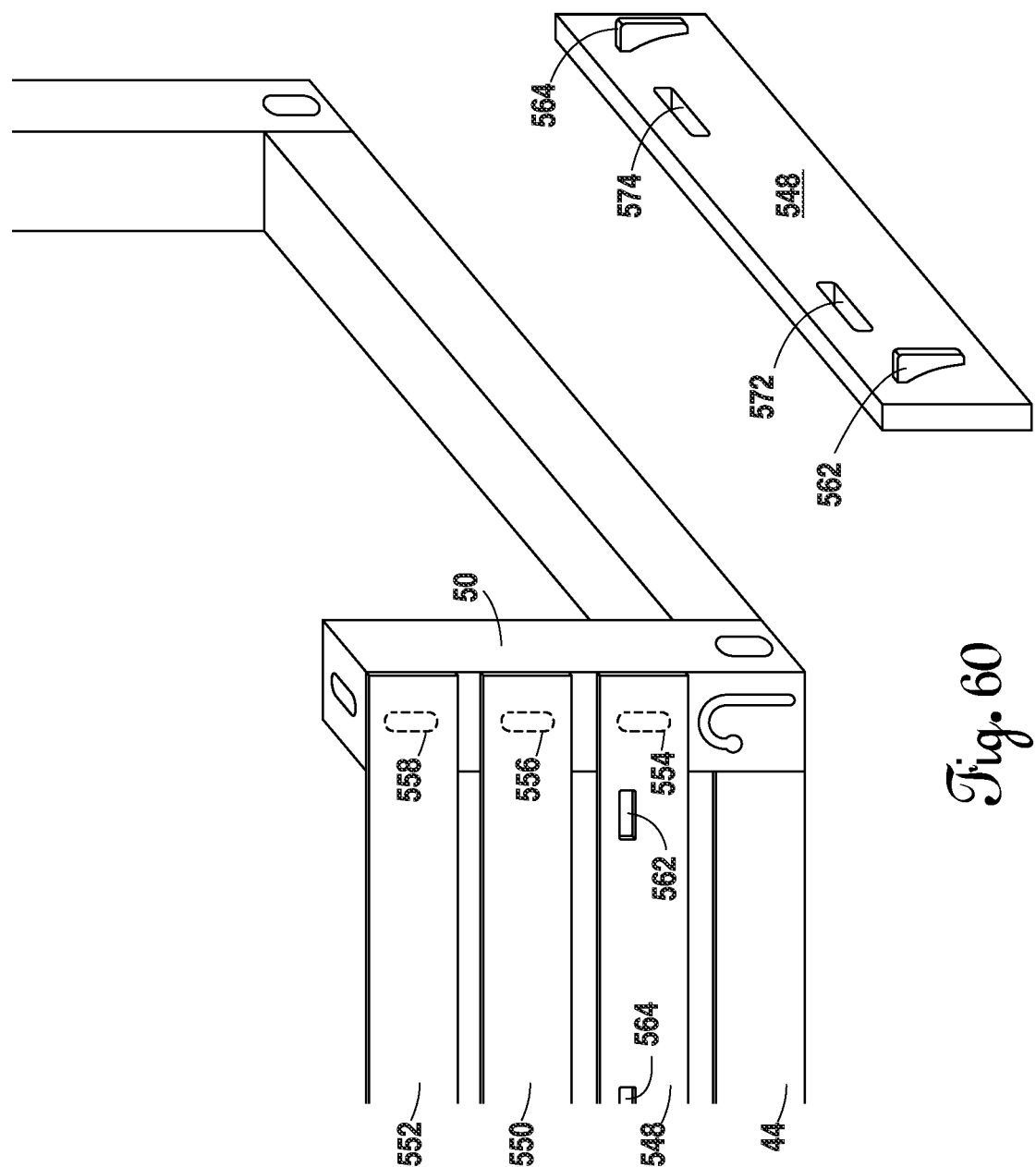
FIG. 60 depicts an alternative embodiment of the open frame rack having a main headboard at the end and a plurality of headboards on the sides thereof.

In another embodiment, a headboard may be incorporated into bunks 26 at each end 44 and 46 of bunk rack 26. For example, and referring now to FIG. 60, headboard 548 has hanging pins 562 and 564. Hand holes 572 and 574 facilitate carrying of headboard 548 by a worker. OSHA regulations allow for items weighing 50 lbs. or less to be lifted by one individual, i.e., the maximum weight one person can lift at a jobsite is 50 lbs. Additional individuals are required to lift items over this weight limit. The weight of headboard is 50 lbs. or less.

Pin post 50 has slots 554, 556, 558 arranged vertically at predetermined intervals along a side. Hanging pins 562 and 574 then engage with corresponding slots on pin post to secure headboard 548 in place. Headboard 548 is customized to fit into the tie-down cutouts, is secured with pins and provides additional load security. Additional headboard 550 and 552 may be added to increase the overall height of the headboards. The dimensions of the headboards are 12"×8'.

Still referring to FIGS. 3-5, FIGS. 6A-6C, each pin post has a pin pad at the top and bottom ends. The inventor uses the term "pin" as a reference to where the connecting "pin" would attach via a twist lock, as will be discussed later on. Pin pad 60 is comprised of a steel plate that has aperture 62 that traverses the center of pin pad 60, as shown in FIG. 6A. Pin pad 60 is recessed and welded into the top of the square tube of pin post 50. Pin pad 146 having aperture 148 is recessed and welded into the bottom of the square tube of pin post 50, as shown in FIG. 6B. Pin pad 60 is attached to pin post 50 such that the final configuration of pin post 50 and pin pad 60 includes flat surfaces along the sides of pin post 50 flush with the bunk, and a flat top with aperture 62 thereon (See, e.g., FIG. 6C). Aperture 62 is ISO compatible such that its configuration will accommodate the secure engagement of other ISO compatible intermodal container conventions. Pin pads 64, 70 and 76 are similarly configured (See, e.g., FIG. 56).

Still referring to FIGS. 3-5 and also to FIG. 9, several cross beams or members provide strength and reinforcement to open frame rack 26. Cross beams 102, 104, 106, 108, and 110 have an I-beam configuration. End cross members 112 and 116 have perforations at predetermined intervals along the top surface. Middle cross member 114 is in an I-beam configuration and also has perforations at predetermined intervals along its top surface.

Referring now to FIG. 9, plate 150 is welded to cross plate 140. Cross plates 138 and 140 are attached at each end of cross beams 102, 104, 106, 108, and 110 and of end cross members 112 and 116 and of middle cross member 114 (See, e.g., FIGS. 3 and 5). These cross plates secure the cross beams to the inside surface of side rails 28 and 30, as shown in FIG. 3. The cross plates are comprised of two welded plates.

A pair of fork tubes 130 and 134 traverse side rails 28 and 30 forming forklift pockets 132 and 136 which allows for a forklift to engage open frame rack 26 for transporting to a different location (See, e.g., FIGS. 3, 5 and 10).

Referring now to FIG. 10, platform or deck 152 is comprised of side rails 28 and 30, cross members 102, 104, 106, 108, and 110, end cross members 112 and 116 and middle cross member 114, fork tubes 130 and 134, and plate 150 welded to cross plate 140. The deck or platform is formed by welding the components together. An exploded view of deck 152 describes the attachment mechanism, i.e., welding, used to connect these components.

Figure 11:
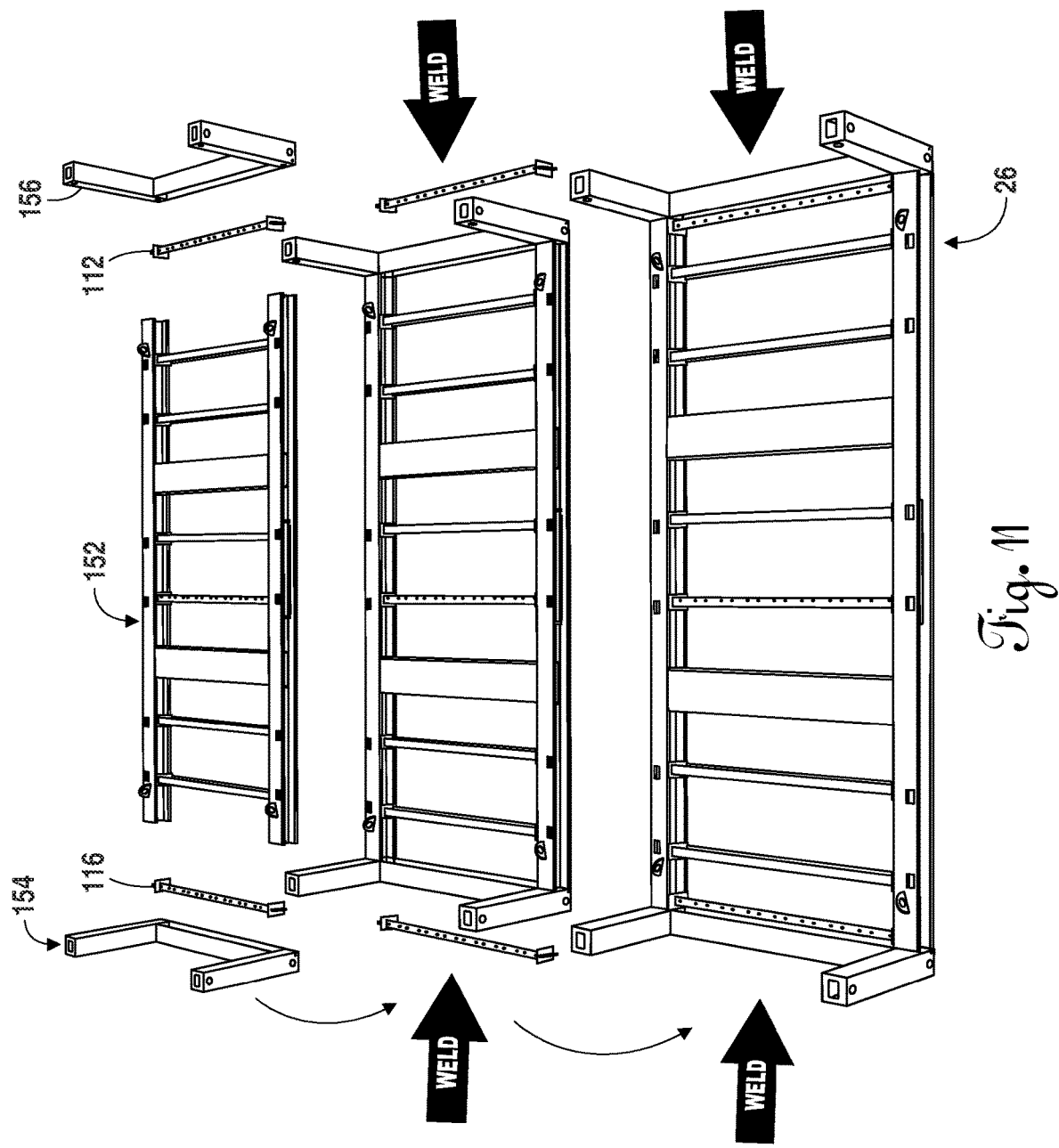
FIG. 11 depicts the final attachment mechanisms for components an embodiment of the present invention.

Referring now to FIG. 11, goal posts 154 and 156 and end perforated cross members 112 and 116 are attached via welding to opposite ends of deck 152 to complete open frame rack 26.

Figure 12:
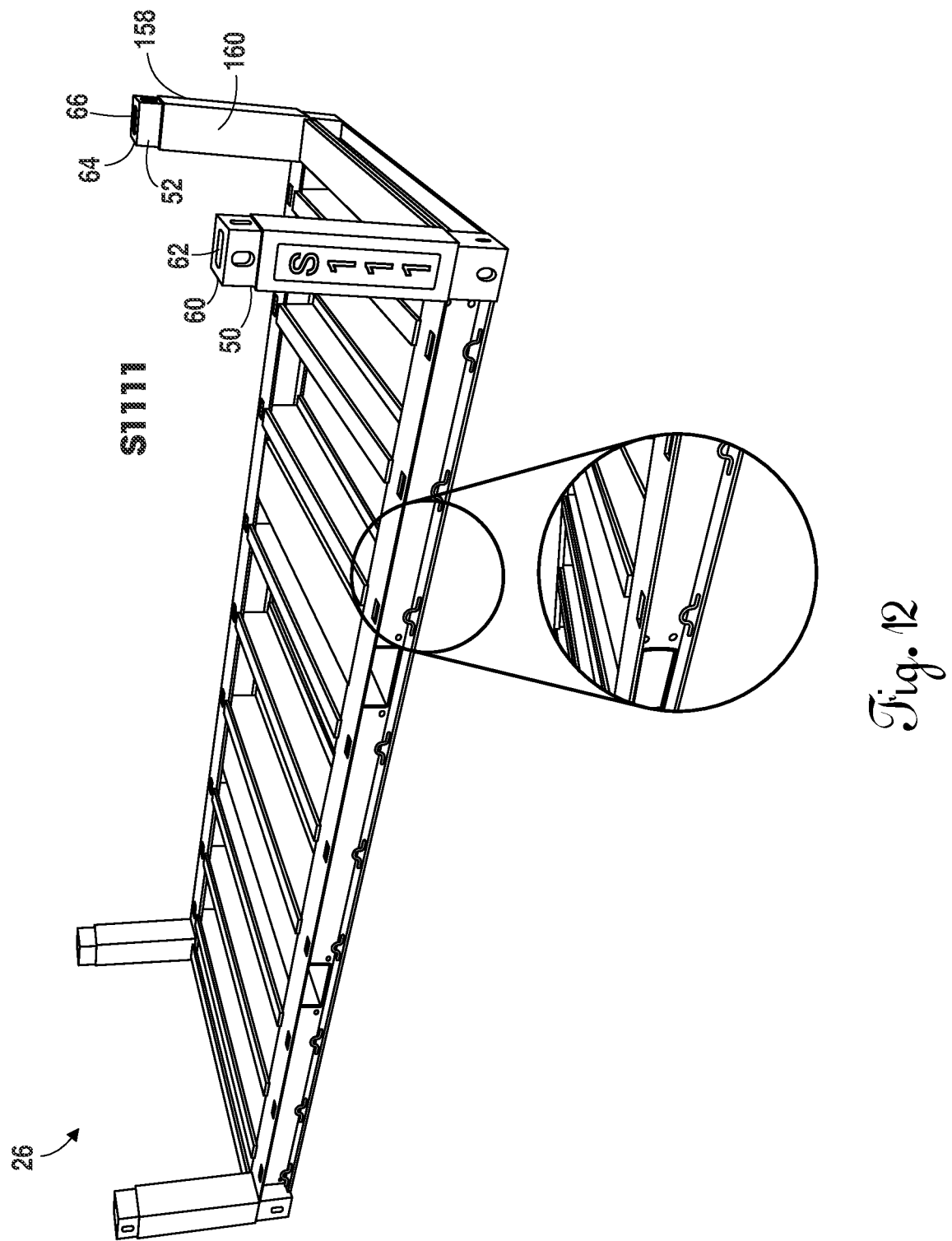
FIG. 12 is a perspective view of an alternative embodiment of the present invention.

Referring now to FIG. 12, in an alternative embodiment, bunks 26 may also include sleeves which slide over pin posts, e.g., sleeve 158 over pin post 52. Sleeve 158 may be color-coded for easy identification and inventory purposes. Area 160 on slidable sleeve 158 also provides for the include of a number system, e.g., "S111" on pin post 50, to further facilitate identification and tracking of inventory. The dimensions of bunks 26 are 20 ft. (L)×8 ft. (W) with a height of each pin post from the ground to the top of the pin post which may exceed 3.5'. However, other dimensions may be used and still remain within the contemplation of the present invention.

Figure 13:
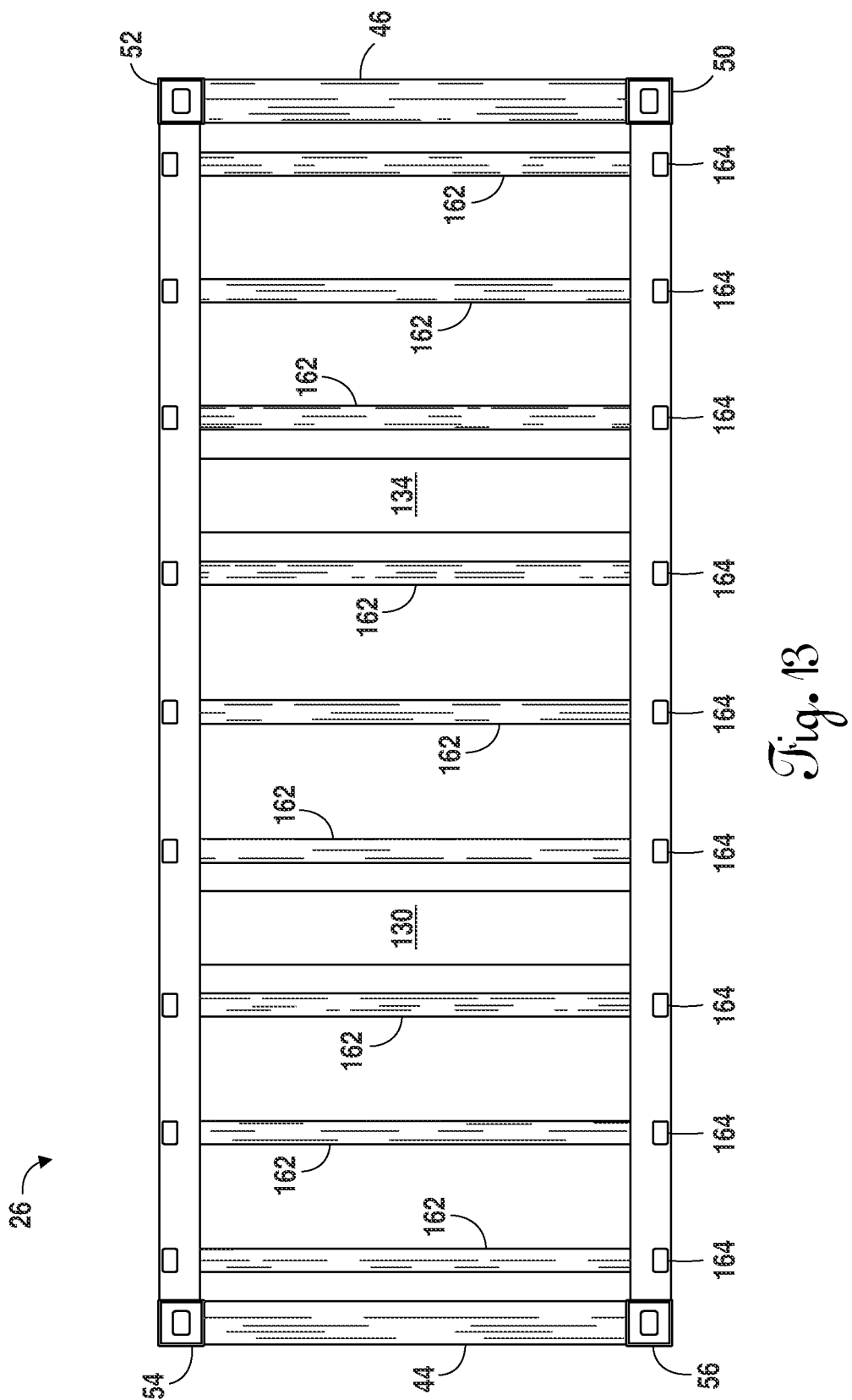
FIG. 13 is a top view of an alternative embodiment of the present invention.
Figure 14:
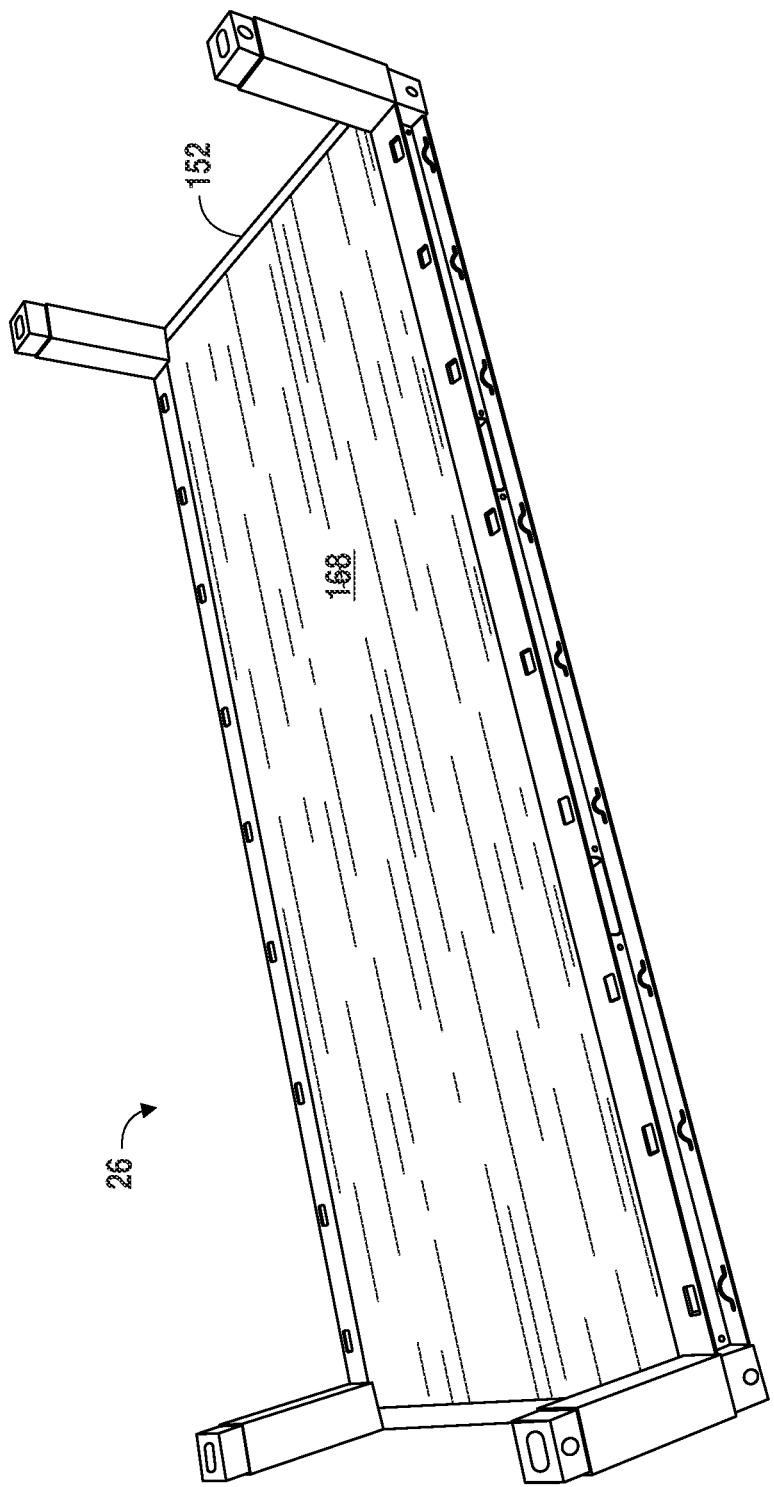
FIG. 14 is a perspective view of an alternative embodiment of the present invention showing a full deck as the platform.
Figure 56:
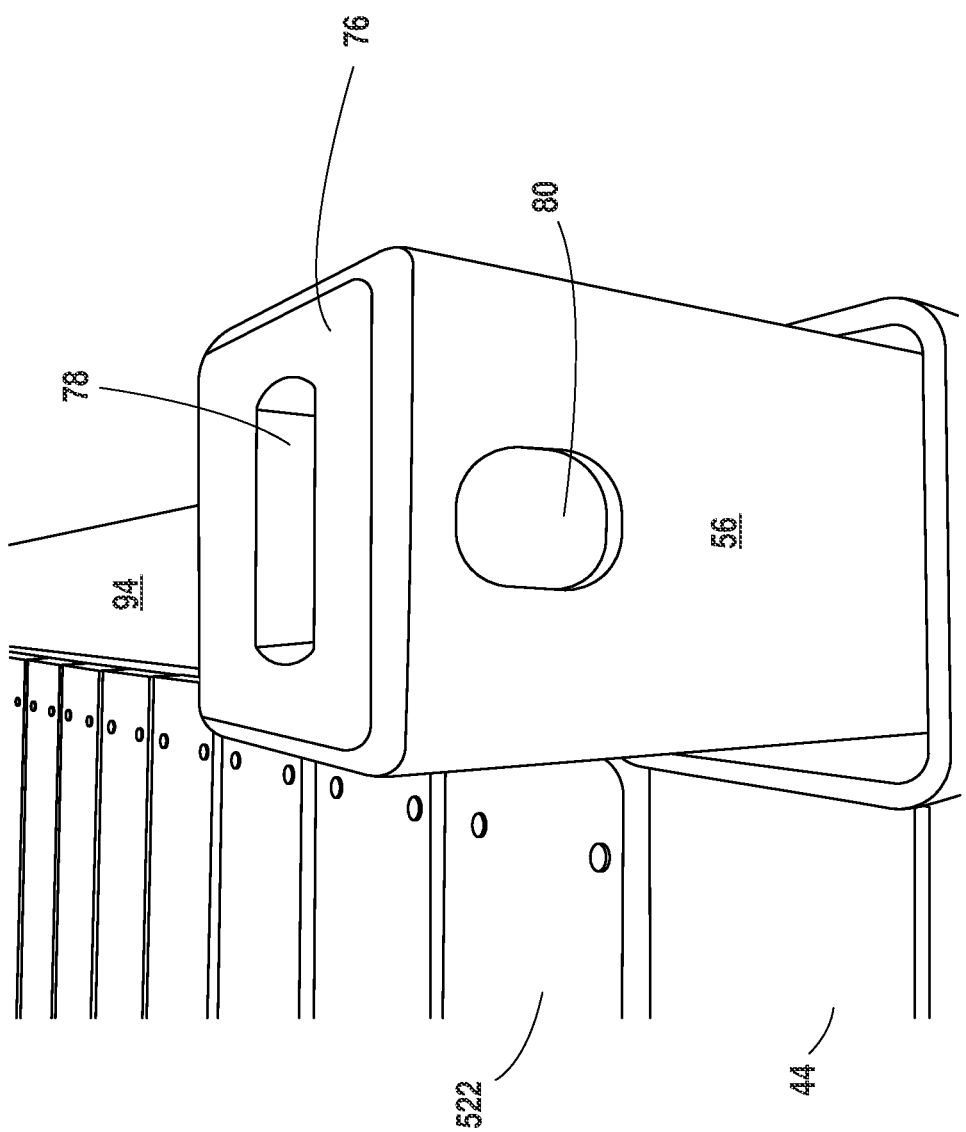
FIG. 56 is a partial closeup view showing attachment of the pin pad to the pin post of an embodiment of the open frame rack of the present invention.

The present invention uses six cross members. However, additional cross members may be included. For example, and referring now to FIG. 13, in another alternative embodiment, there may be 9 cross members 162 with corresponding strap ports 164. In addition, the cross members 162 may be of lumber or high-density polyethylene (HDPE) lumber, as shown in FIG. 13, and may be fastened via rivets, as shown in FIG. 56 (cross members 522). Other comparable material having high strength-to-density ratio may also be used and still remain within the contemplation of the present invention. Further, platform or deck 152 may even have a "full deck" or sheet 168 of similar material over cross members 162, hiding same as shown in FIG. 14. This embodiment has the same footprint, weight capacities and tie-down features described above. Such full deck material may be used to introduce additional fastening mechanisms, such as screws, to secure any cargo (See, e.g., FIG. 26).

Referring now to FIG. 15, bunks 26 is loaded with cargo, e.g., irregularly shaped spool 24. Sleeve 158 is color coded together with identification number. Document container 166 is securely attached to middle surface 47 of end rail 46. FIG. 16 provides a closeup of securely attached document container 166. Document container 166 may hold important papers, such as the operation manual, a bill of lading and the like, regarding the shipment. Cargo arrives at its destination undamaged. This may be checked against the documents, e.g., bill of lading, carried within document container 166. In another embodiment, the present invention may also include radio-frequency identification (RFID) tags. The color-coded inventory with identification numbers and RFID tracking system allows for inventory to be accurately maintained.

Figure 17:
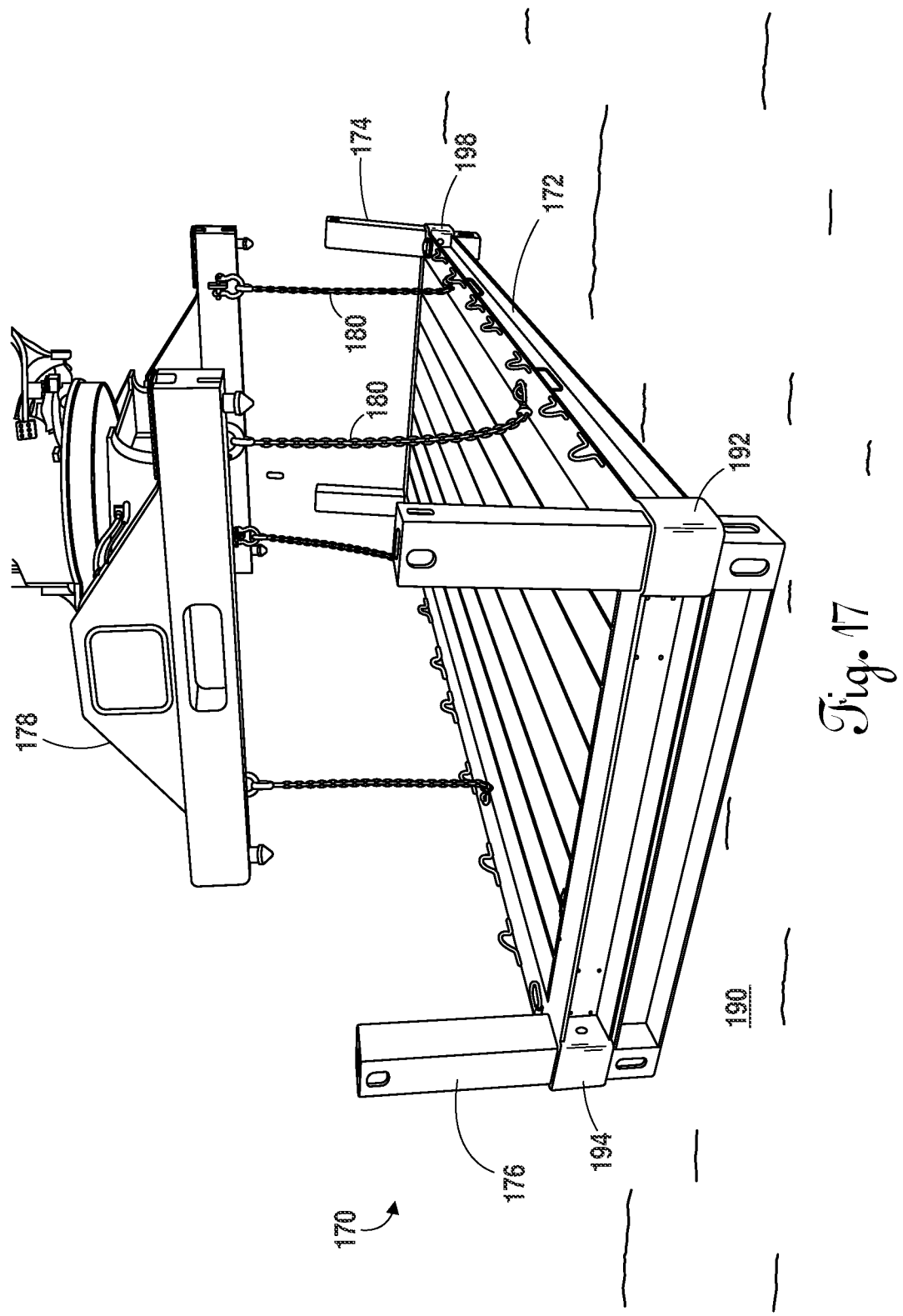
FIG. 17 is a perspective view of another embodiment of the present invention showing a platform with removable pin posts.
Figure 18:
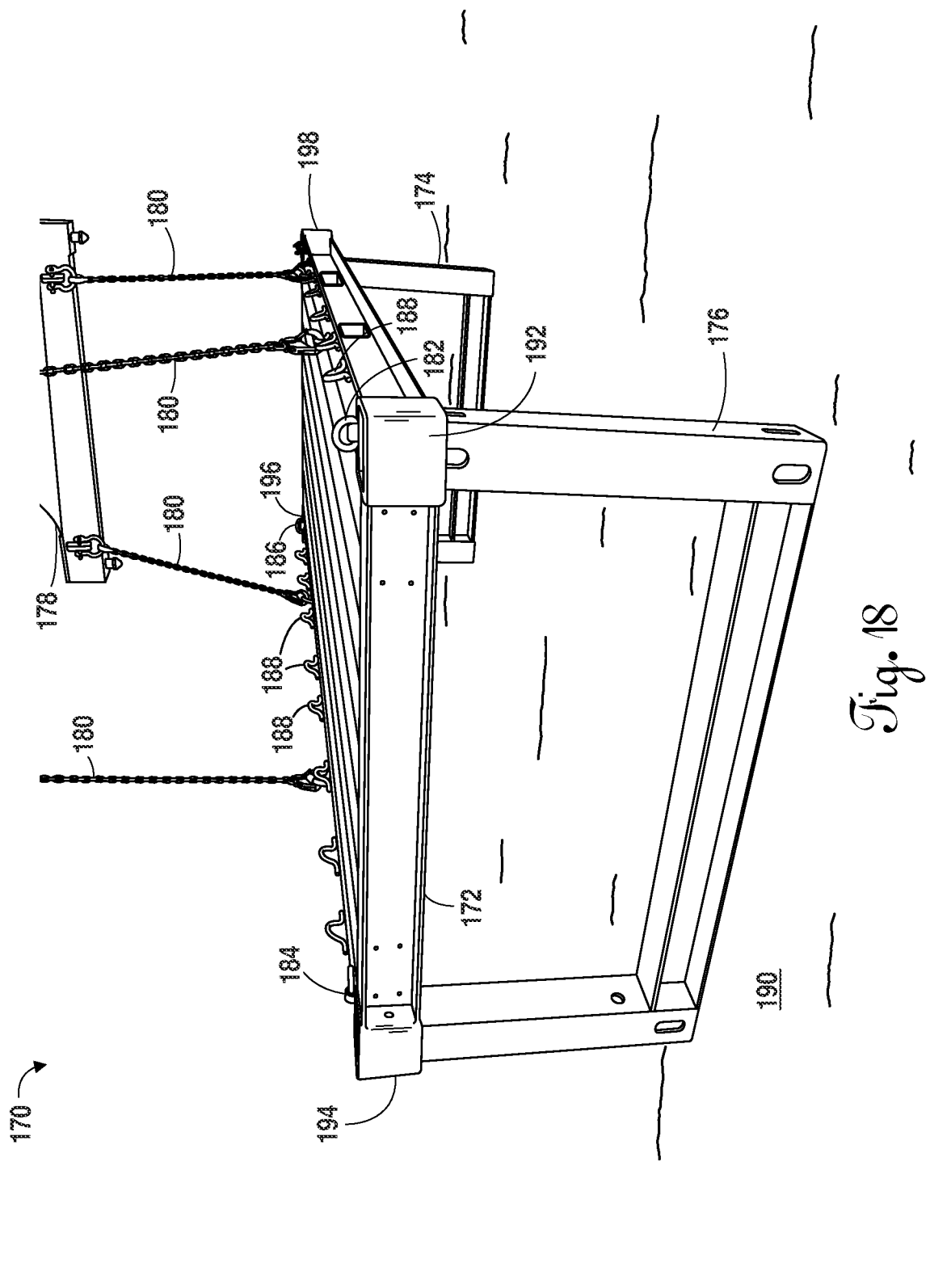
FIG. 18 a perspective view of another embodiment of the present invention with respect to FIG. 17 showing the platform sliding up removable pin posts.

Referring now to FIGS. 17 and 18, an alternative embodiment 170 of the present invention has platform or deck 172 separate from goal posts 174 and 176. Corners 182, 194, 196 and 198 are hollow (as opposed to having permanently attached pin posts, see, e.g., FIG. 5). Top handler 178 hoists deck 172 above ground 190 via heavy chains 180 such that the ends of each of goal post 174 and 176 traverse hollow corners 182, 194, 196 and 198. Deck 172 is then lowered over goal posts 174 and 176. Anchor mounts 182, 184, 186 and 188 are located at each corner of platform 172. Tie-down anchors 188 provide additional points of attachment for securing cargo to platform 172, as shown in FIGS. 17 and 18.

The bunks of the present invention is comprised of steel, and, in particular, galvanized steel and has solid commercial decking strips. However, other robust material may also be used and still remain within the contemplation of the present invention.

Figure 19:
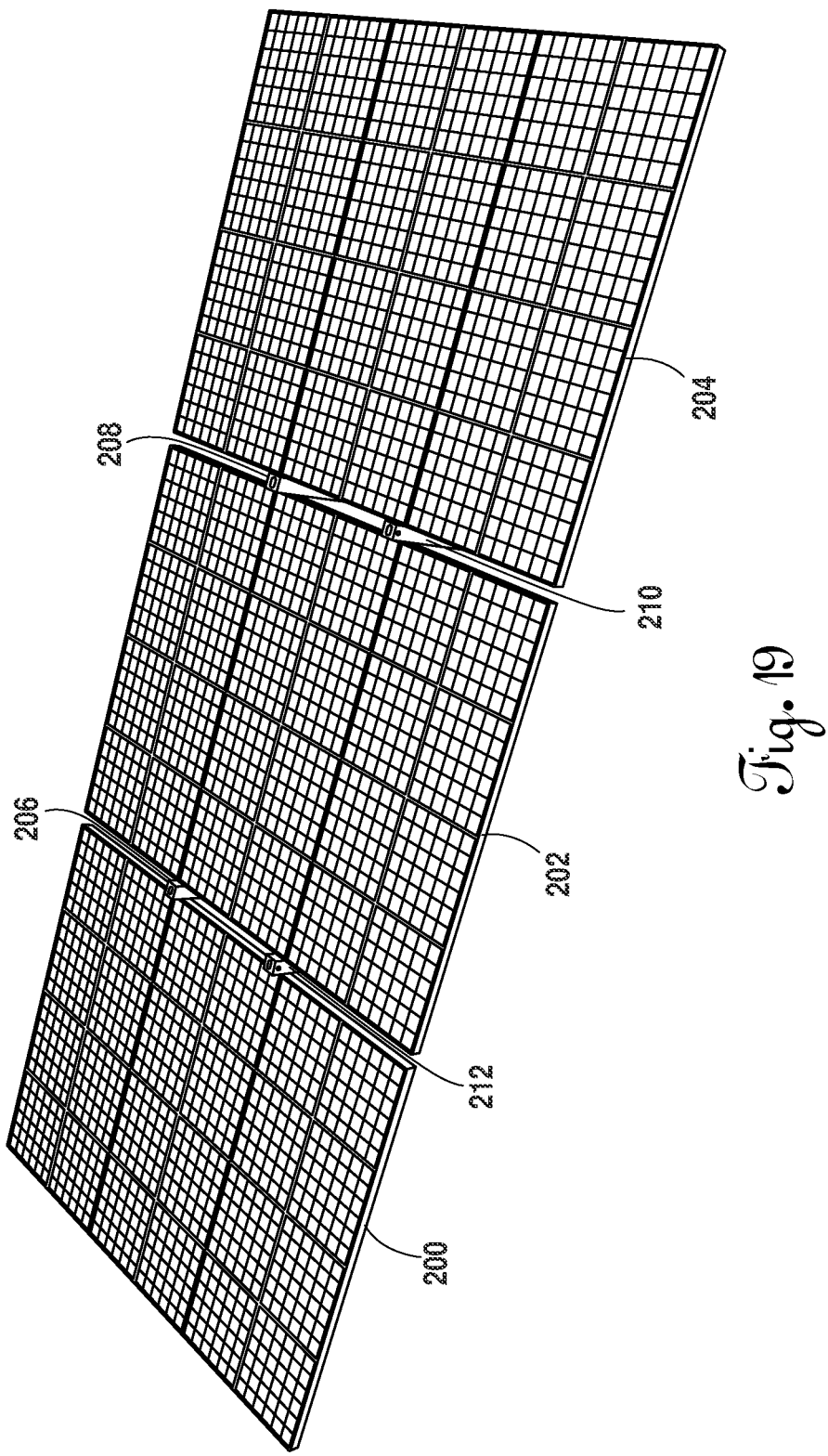
FIG. 19 is a perspective view of another embodiment of the present invention showing the incorporation of solar panels.
Figure 20:
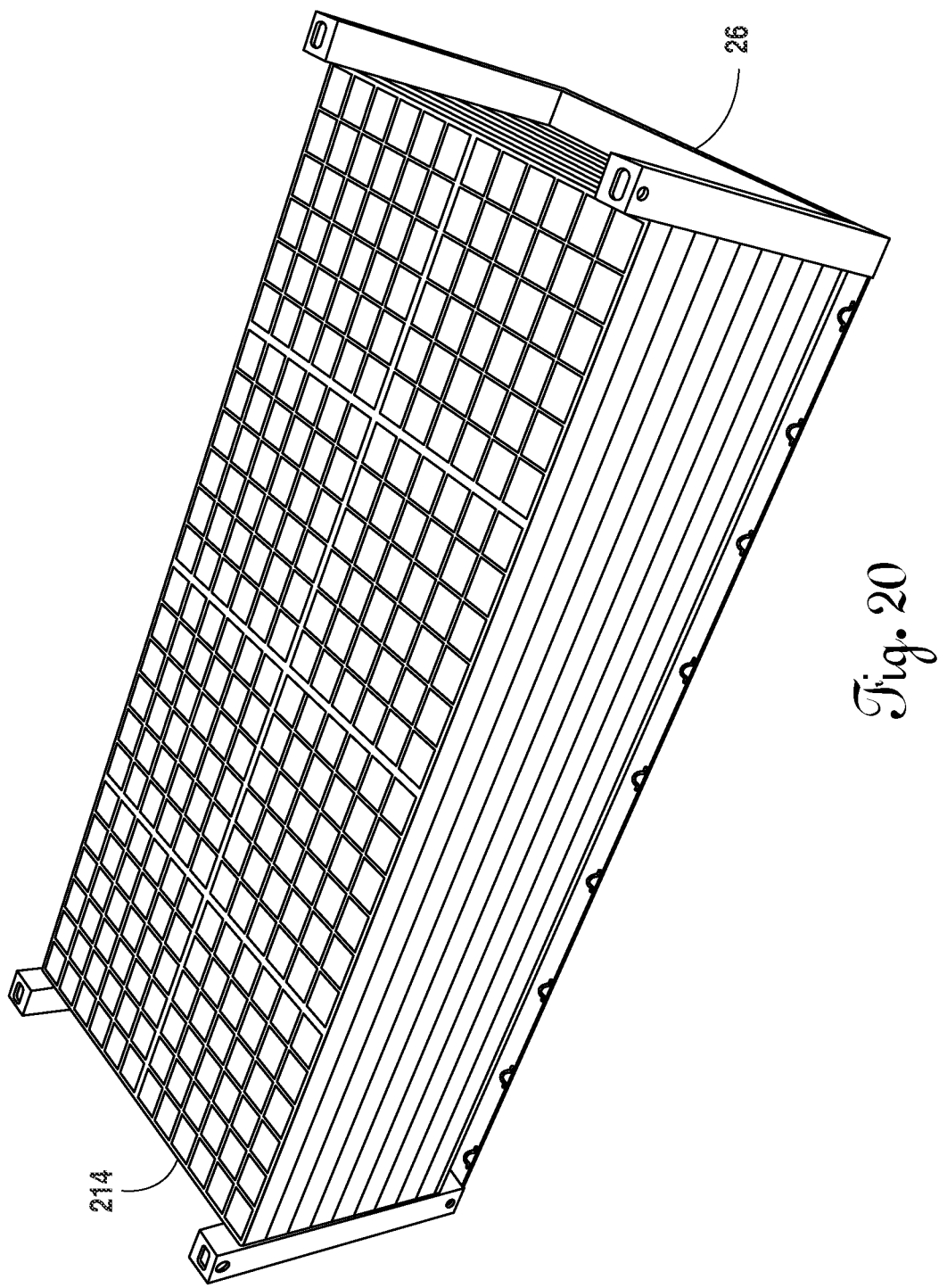
FIG. 20 is a perspective view of another embodiment of the present invention showing the incorporation of solar panels and headboards and side boards.
Figure 21:
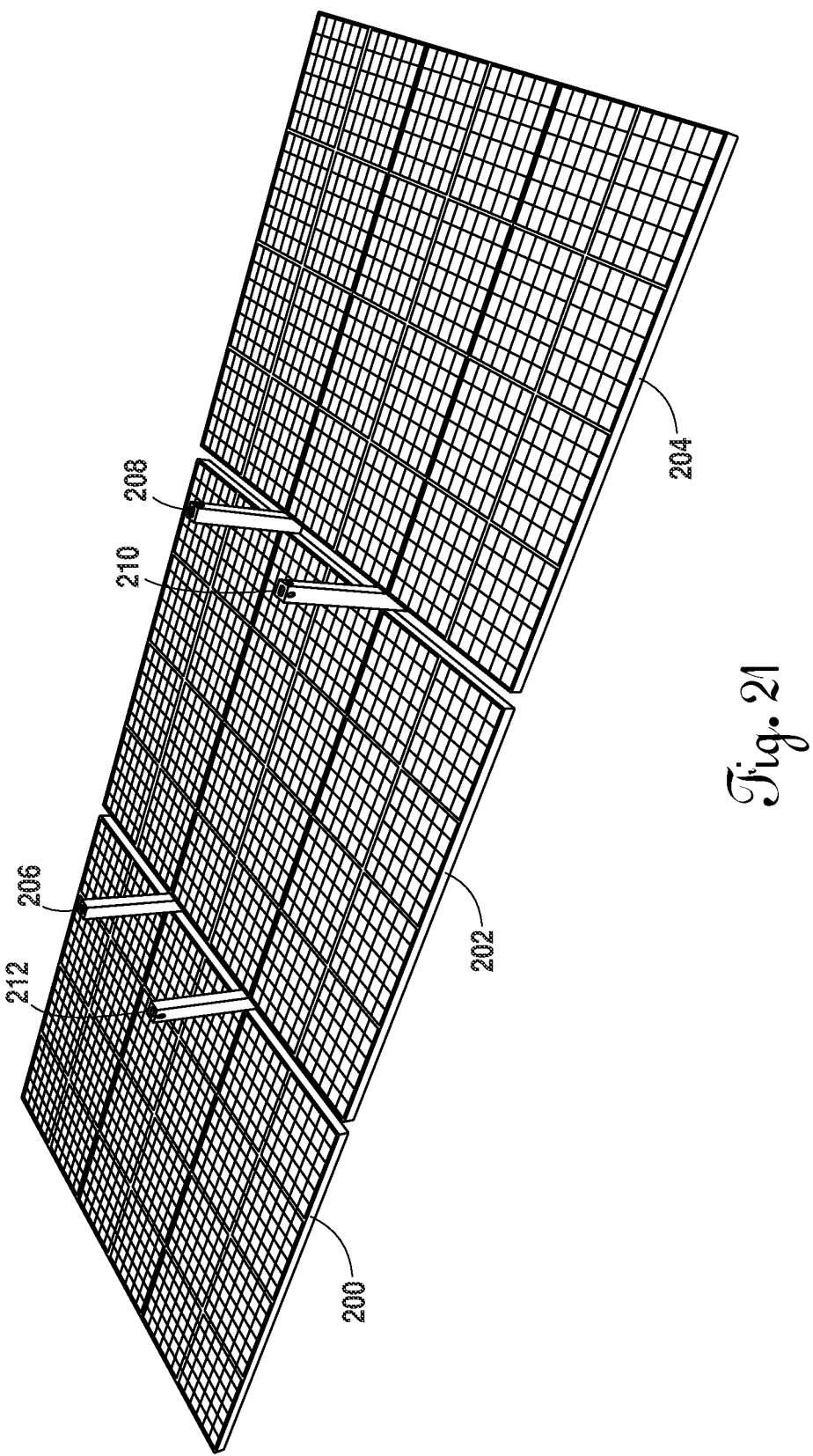
FIG. 21 is a perspective view of another embodiment of the present invention showing incorporation of the solar panels with the pin posts with respect to FIG. 20.

In another embodiment, the present invention may include solar panel arrays for generating electricity. For example, and referring to FIGS. 19, solar panel arrays 200, 202 and 204 may be placed around open frame rack 26 on top of a cargo such that solar panel arrays 200, 202 and 204 are at the upper portions of pin posts 206, 208, 210 and 212. Alternatively, sheets 214 of solar panel arrays may be stacked one on top of the other and loaded as cargo on open frame rack 26, as shown in FIG. 20. Alternatively, still, solar panel arrays 200, 202 and 204 may be configured similar to as shown in FIG. 19, but rather than at the upper portions of pin posts 206, 208, 210 and 212, solar panel arrays 200, 202 and 204 are at the lower portions of pin posts 206, 208, 210 and 212, as shown in FIG. 21.

Figure 22:
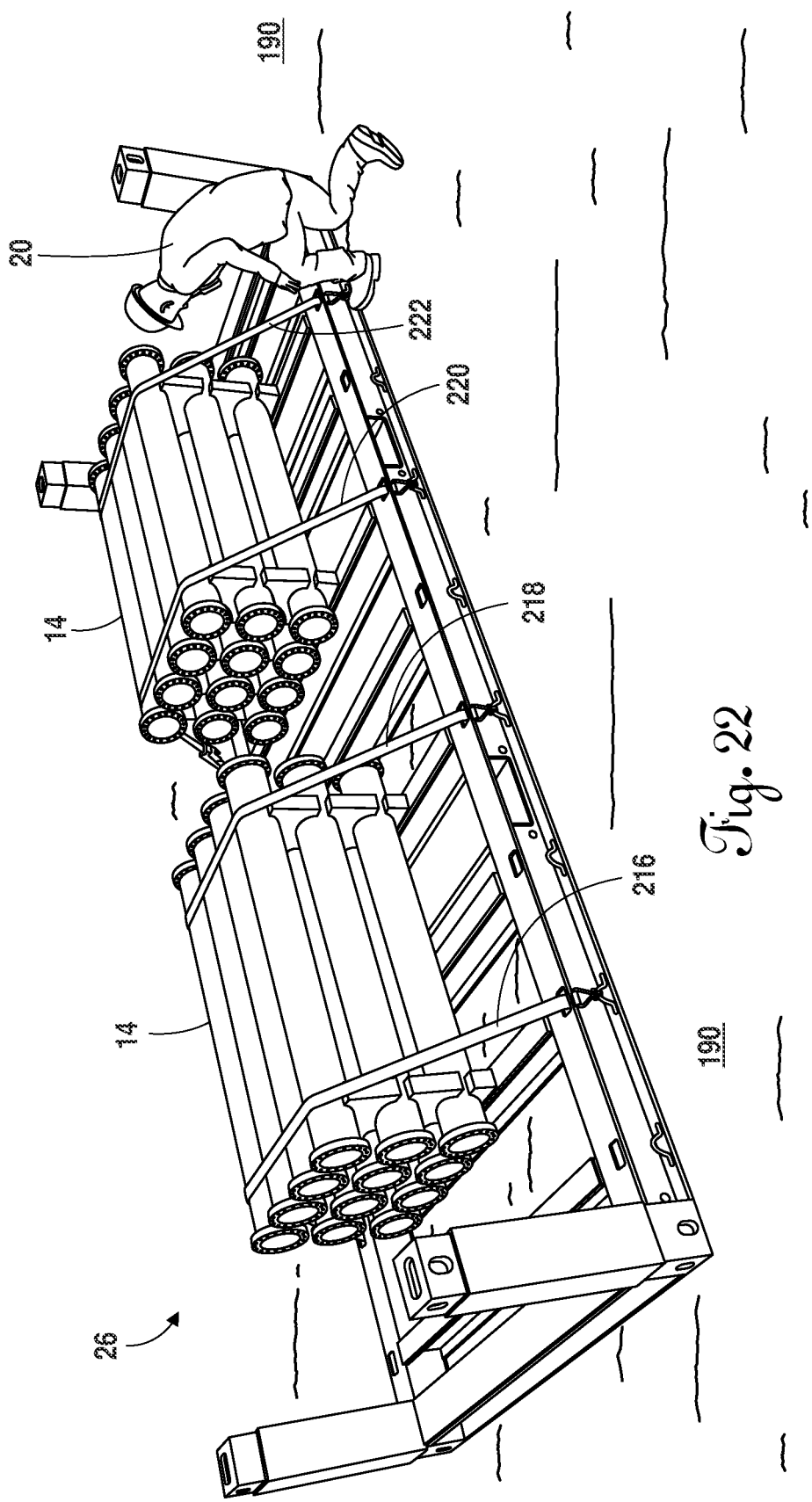
FIG. 22 is a perspective view showing the loading and securing cargo of an embodiment of the present invention.
Figure 23:
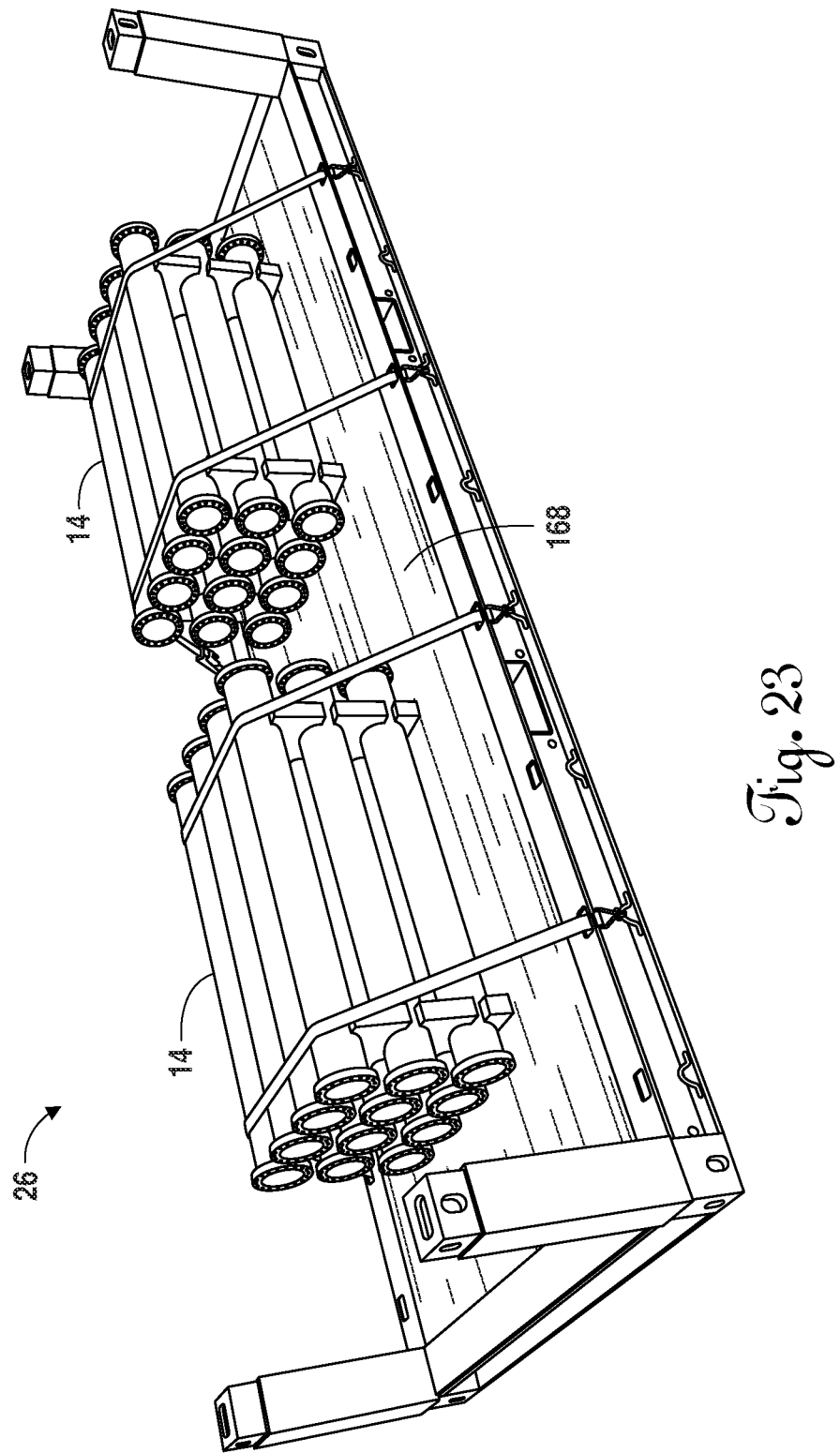
FIG. 23 is a perspective view showing proper distribution of load with bracing on an embodiment of the present invention.

Turning now to the loading and securing process, the bunk platform 26 of the present invention is the safer way to load and secure commodities, such as iron and spools, in the construction industry as such is secured on the ground for shipping before being loaded onto truck. Securing on the ground prevents slips and falls, and over height restrictions. Referring now to FIGS. 22 and 23, cargo, such as several pipe spools 14 are stacked on open frame rack 26 on ground 190 by worker 20. Whether the platform are cross beams (FIG. 22) or sheet 168 of lumber, worker 20 carefully distributes the weight of the load evenly across the platform. As open frame rack 26 is on the ground, worker 20 minimizes the probability of injury as opposed to having to secure cargo on a trailer and needing to constantly get on and get off to do so. In addition, only one individual is required for this, as is shown in FIG. 22. Worker 20 secures the cargo, e.g., several spools 14, via releasably attached straps 216, 218, 220 and 222. The ends of straps 216, 218, 220 and 222 pass through strap ports to secure onto tie-down anchors, as shown in FIGS. 22 and 23.

Figure 24:
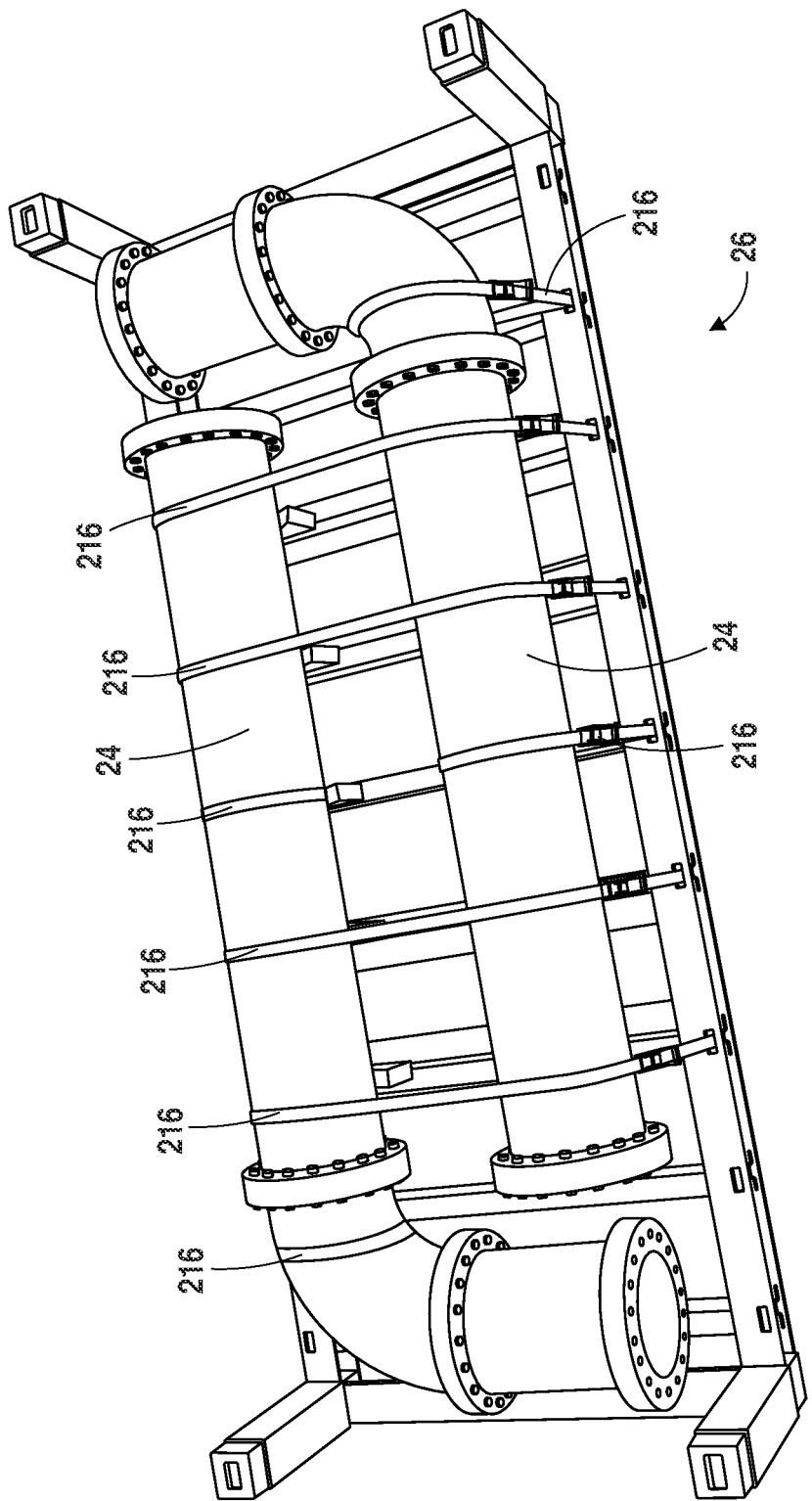
FIG. 24 is a top perspective view depicting a full deck open frame container of the present invention having irregular cargo secured for transportation.
Figure 25:
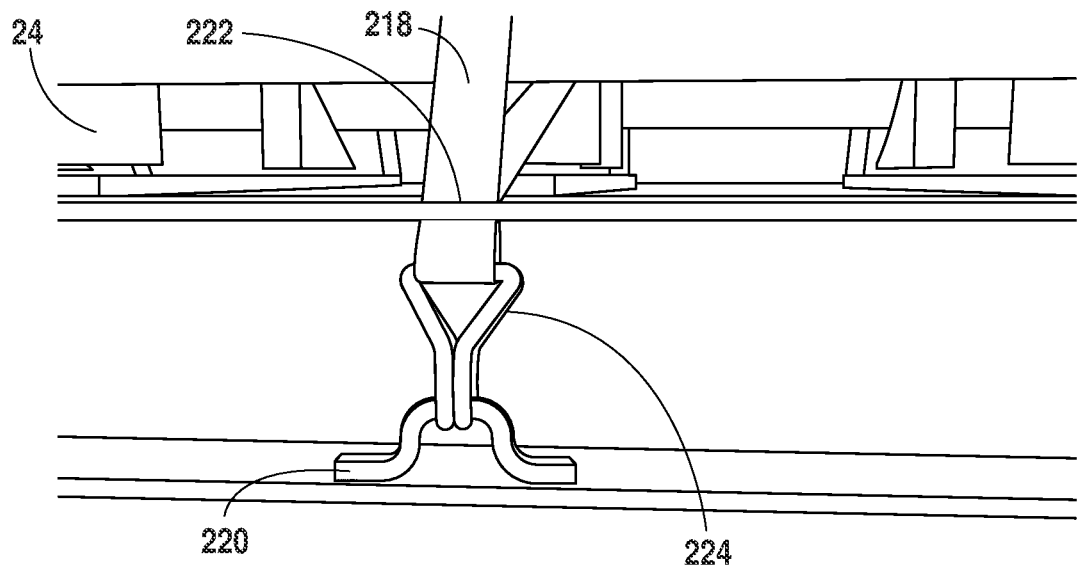
FIG. 25 is a partial closeup view depicting the tie-down ring or anchor and strap cutout securing mechanism for a load on an embodiment of the present invention.
Figure 26:
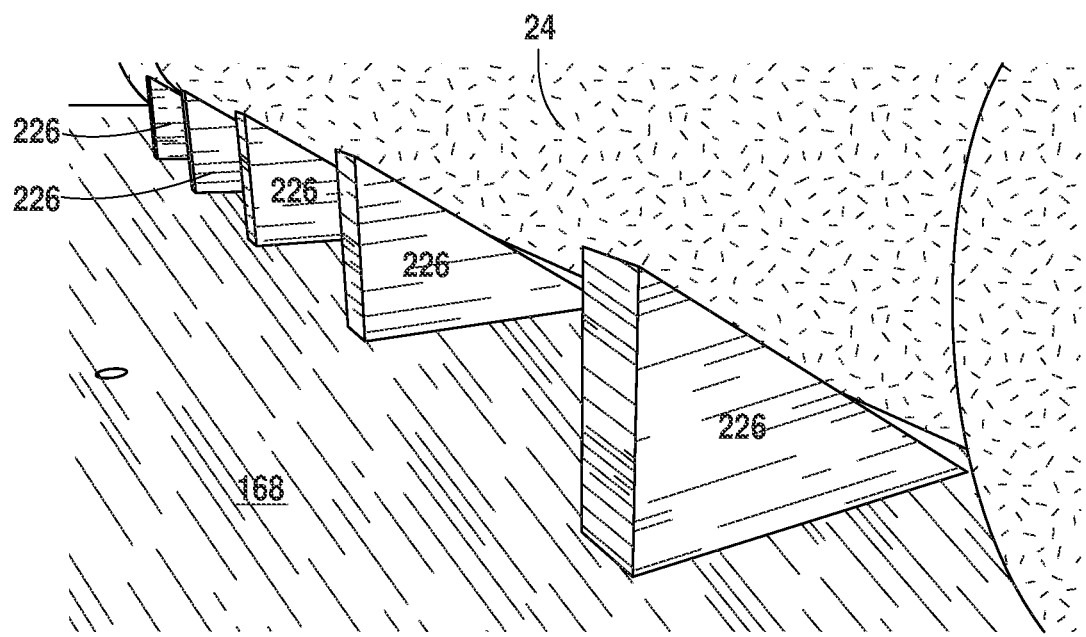
FIG. 26 is a partial closeup of the securing blocks fastened to the wooden deck as an additional securing mechanism for a load on an embodiment of the present invention.

When securing irregularly shaped cargo, such as irregularly shaped spools 24, again the cargo is loaded so as to carefully distribute the weight of the load evenly across the platform and then tied down with straps 216, as shown in FIG. 24. Turning now to FIGS. 25 and 26, strap 218 passes through strap port 222 to ultimately secure latch 224 to tie-down anchor 220. Tie-down anchors are provided along all sides of bunks 26 restrain up to 5,500 lbs./2,500 kg, per load restraint device. Strap port 222 provides protection for strap 218 during transport. Securing blocks may be screwed to wooden sheet 168 as added security and reinforcement of cargo, e.g., irregularly shaped spool 24, as shown in FIG. 26.

Figure 57:
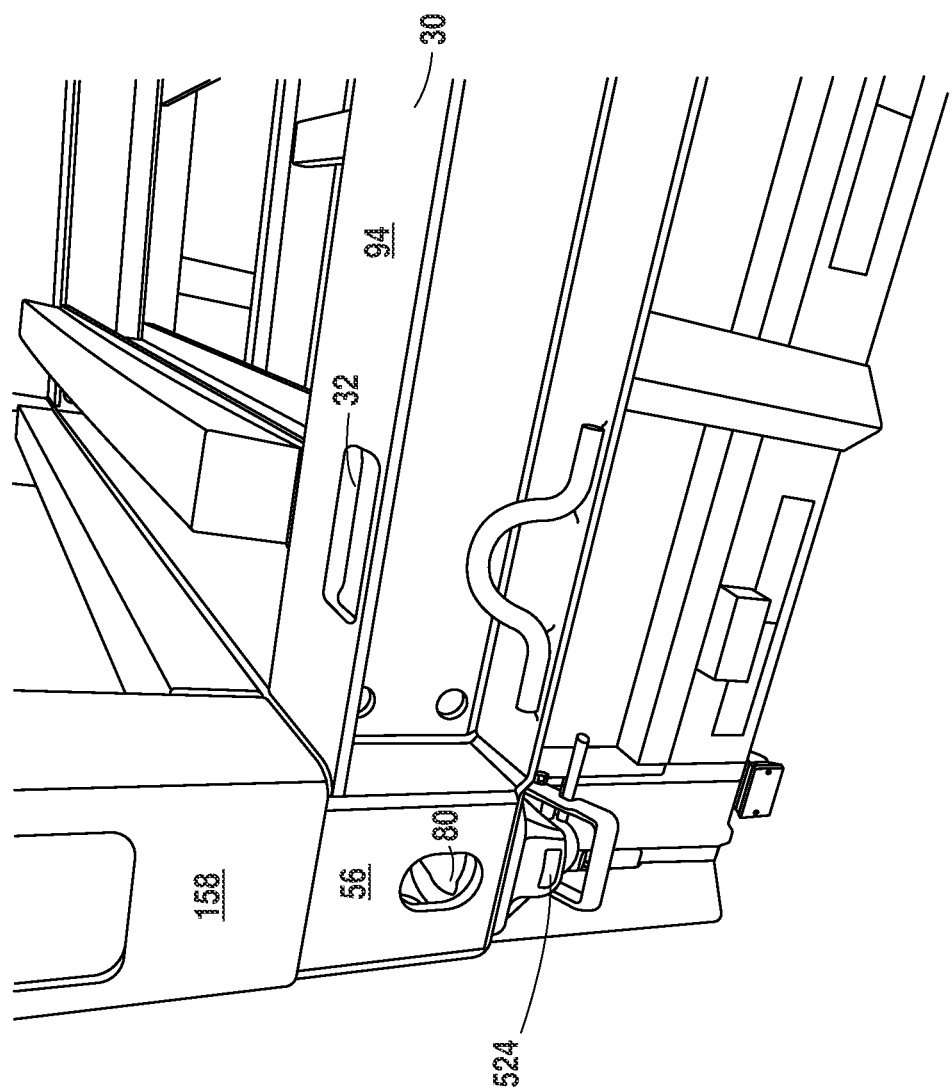
FIG. 57 is a partial closeup view showing sleeve over the pin post of an embodiment of the open frame rack of the present invention.

The present invention is compatible with any trailer having 20' pin locations. For example, pin post 56 of bunks 26 connects to trailer secured via double-cone twist lock container-to-container locking pin 524, as shown in FIG. 57. This ensures rapid load times without the necessity of additional securement. In this fashion, demurrage is eliminated.

For shipping, bunks 26 with pre-secured cargo are placed on container-compatible trailers. The placement of bunks 26 with pre-secured cargo on the trailers may be performed by a single individual. The loading process may be performed in under 10 minutes, eliminating demurrage at this point as well.

Figure 27:
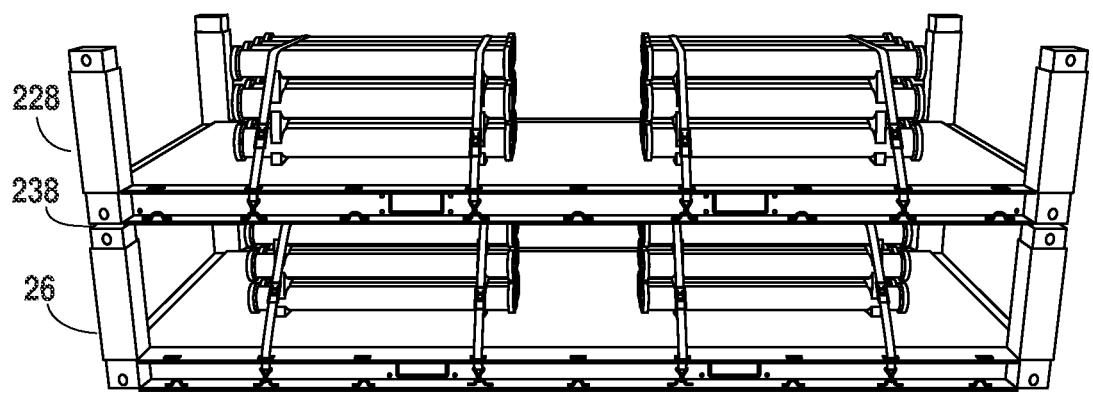
FIG. 27 depicts a side view of two cargo loaded open frame containers of the present invention in a properly stacked configuration.
Figure 28:
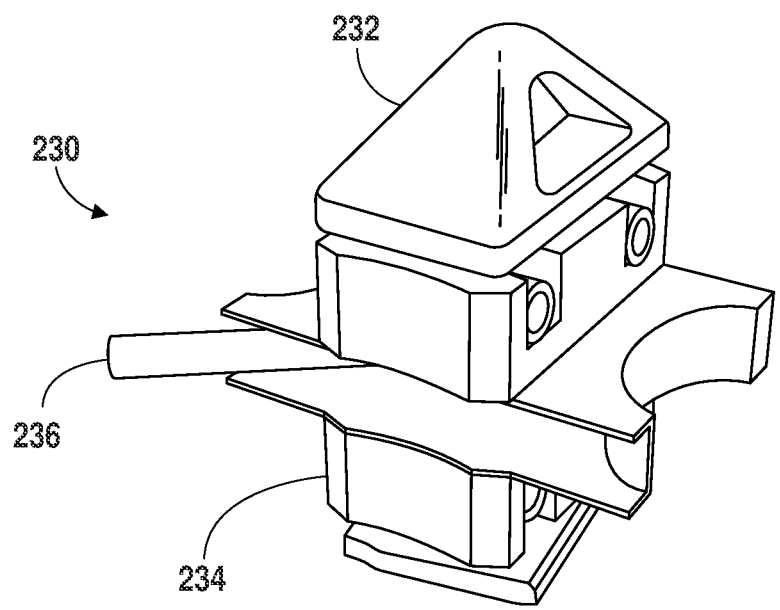
FIG. 28 is a perspective view of a double-cone twist lock container-to-container locking pin used to facilitate stacking of open frame containers of the present invention in a stacked configuration.

Bunks 26 of the present invention are capable of handling oversize loads. If two pre-secured cargo bunks are unable to go side-by-side on the trailer, bunks 26 may be stacked on top of each other by interlocking the pin posts of the bottom bunks with the pin posts of the bunk being stacked, thereby securing the two together for transport. Reference is now made to FIGS. 27 and 28. Double-cone twist lock container-to-container locking pins 230 are required to stack bunks. Double-cone twist lock container-to-container locking pin 230 has twistable cone 232, a bottom 234 and lever 236, as shown in FIG. 28. Double-cone twist lock container-to-container locking pin 230 is placed in junction 238 between two stacked bunks by inserting cone 232 side up, flat side down and lever 236 pushed all the way to the left to lock the lower pin. Once the upper flatrack 228 is seated, lever 236 is pushed all the way to the right to lock both pins such that all interfacing twist-locks are positively engaged. Once done, stacked cargo loaded bunks 26 and 228 are now ready for transport, as shown in FIG. 27. No additional securement is needed for transport.

The corner pin posts and forklift pockets allow the open frame rack (bunks) of the present invention to be used with all capacity-rated rough terrain MHEs. The present invention discussed the stacking of cargo loaded bunks. However, other structures, such as intermodal cargo containers, may also be stacked on top of the bunks of the present invention using the same locking mechanism described above, so long as such structures are ISO compatible.

The maximum capacity of the open framed rack 26 of the present invention is 26,500 lb./12,020 kg. The tare weight is 4,400 lb./1996 kg.

Figure 29:
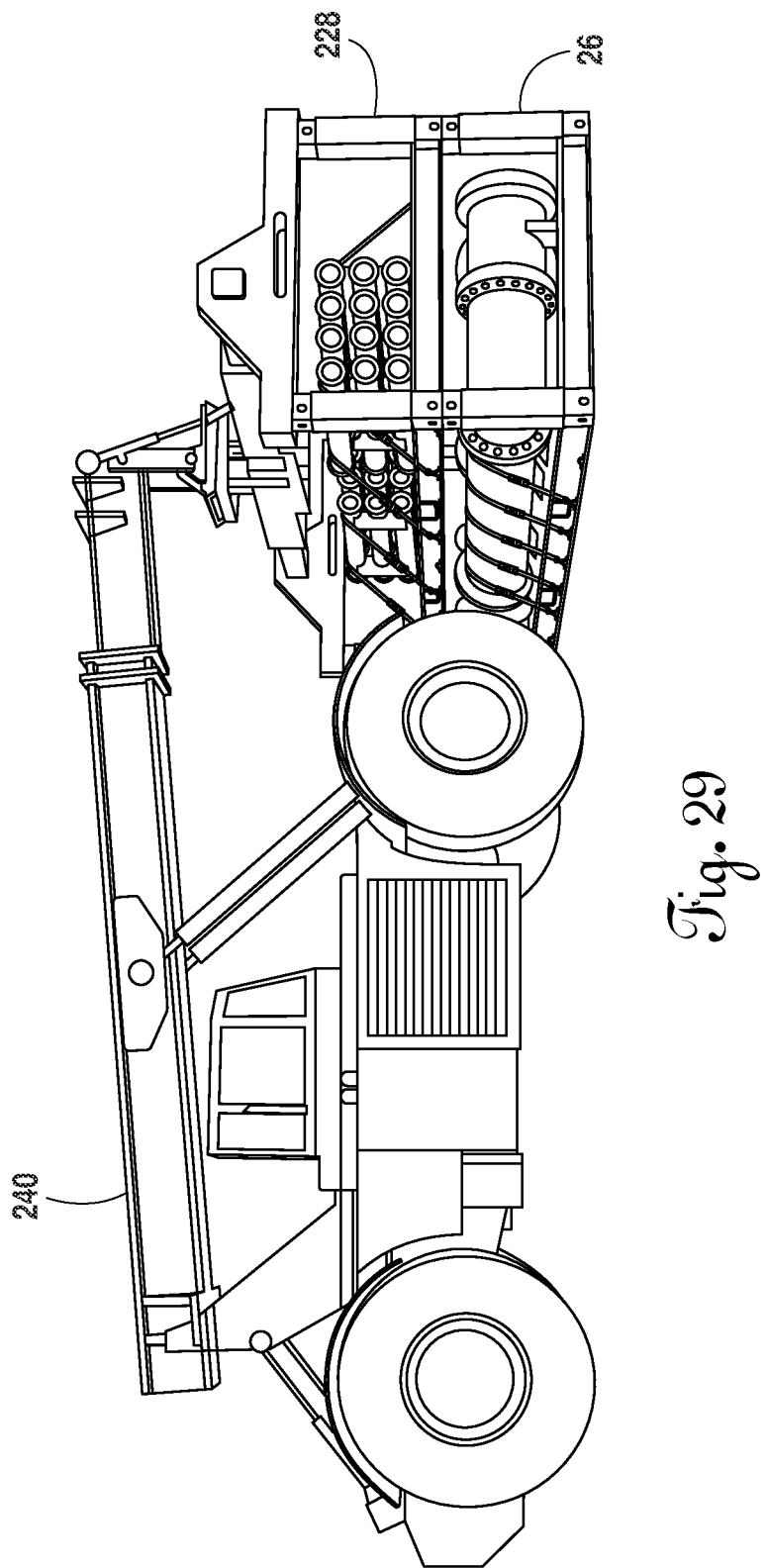
FIG. 29 depicts a side view of an embodiment of the present invention showing a rough terrain container handler pinlocked to double-stacked open framed racks.
Figure 30:
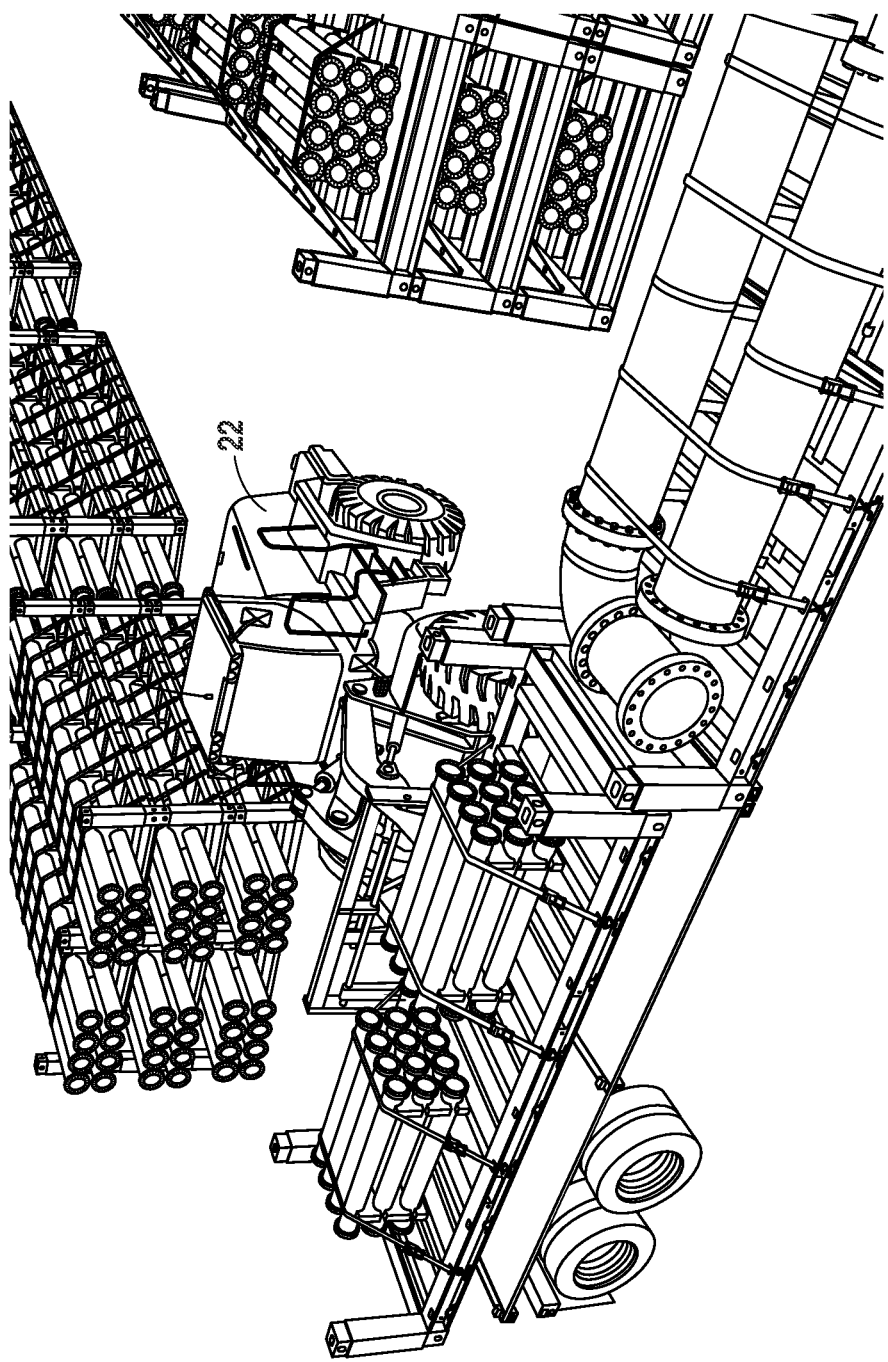
FIG. 30 shows the method of an embodiment of the present invention showing the loading of cargo-loaded open framed racks onto a trailer.
Figure 31:
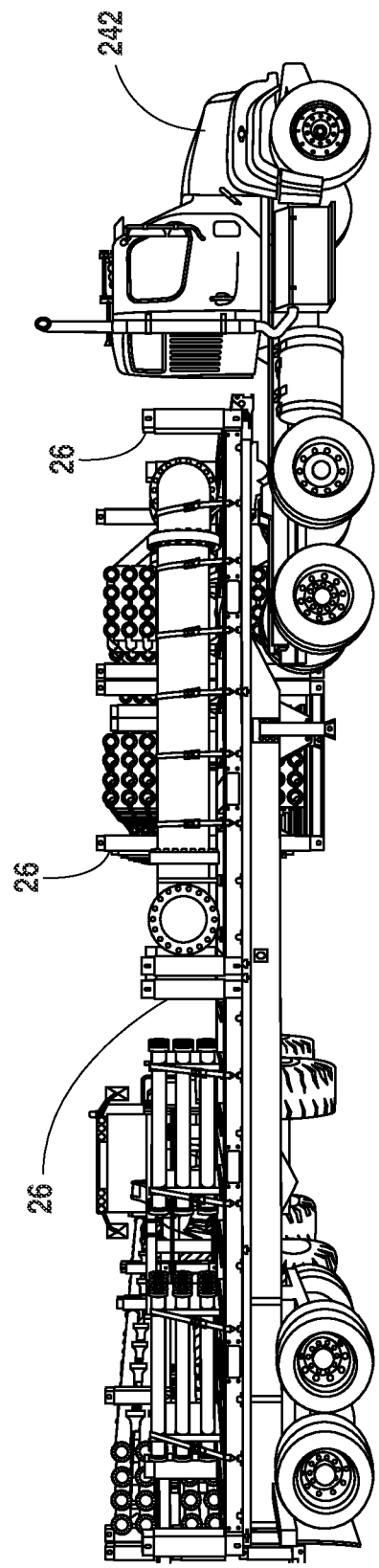
FIG. 31 is a side view of a trailer loaded with cargo-loaded open framed racks for transportation to a desired location.
Figure 50:
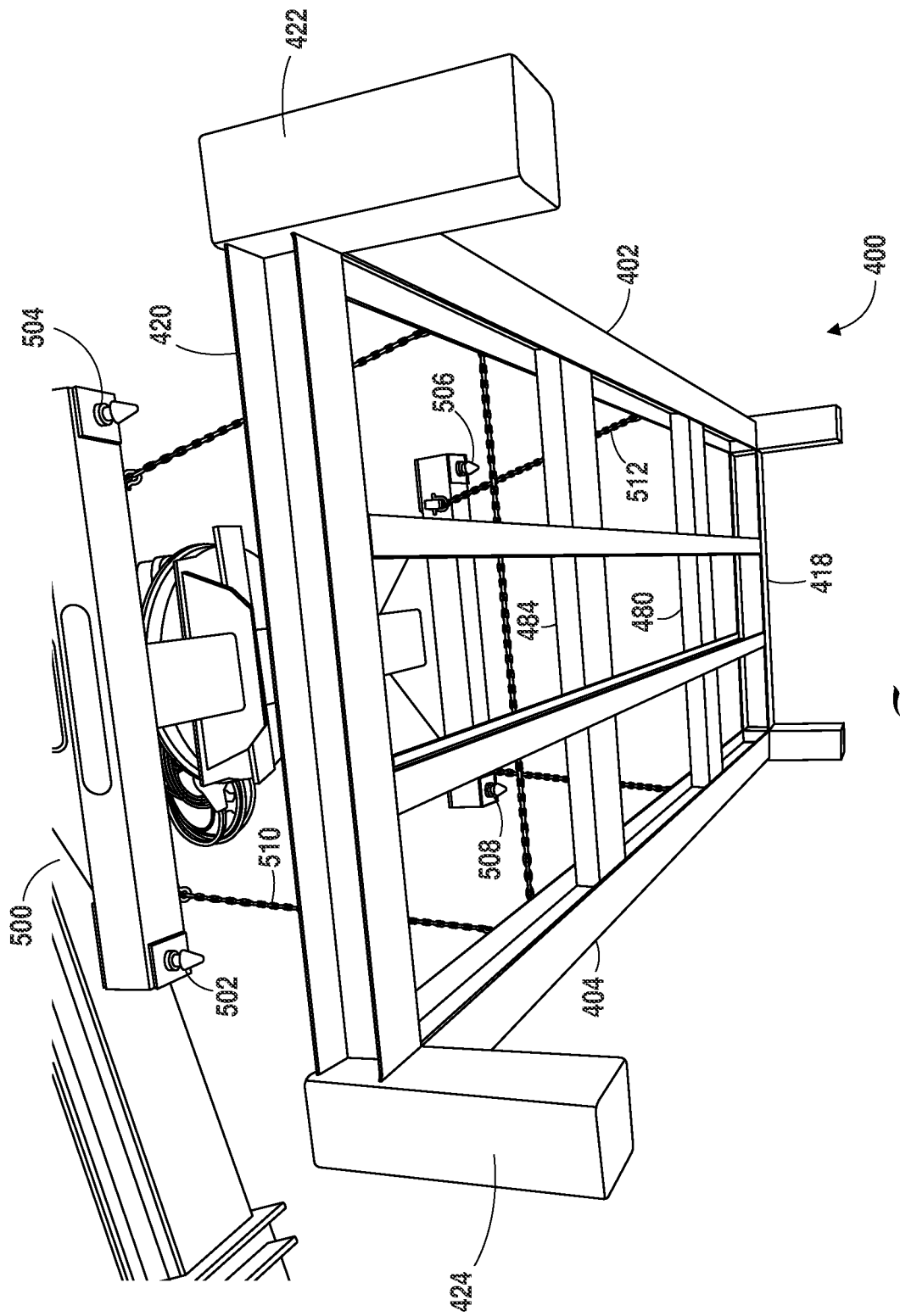
FIG. 50 depicts the transport of an embodiment of the closed frame rack of the present invention for attachment to the open frame rack of the present invention.
Figure 51:
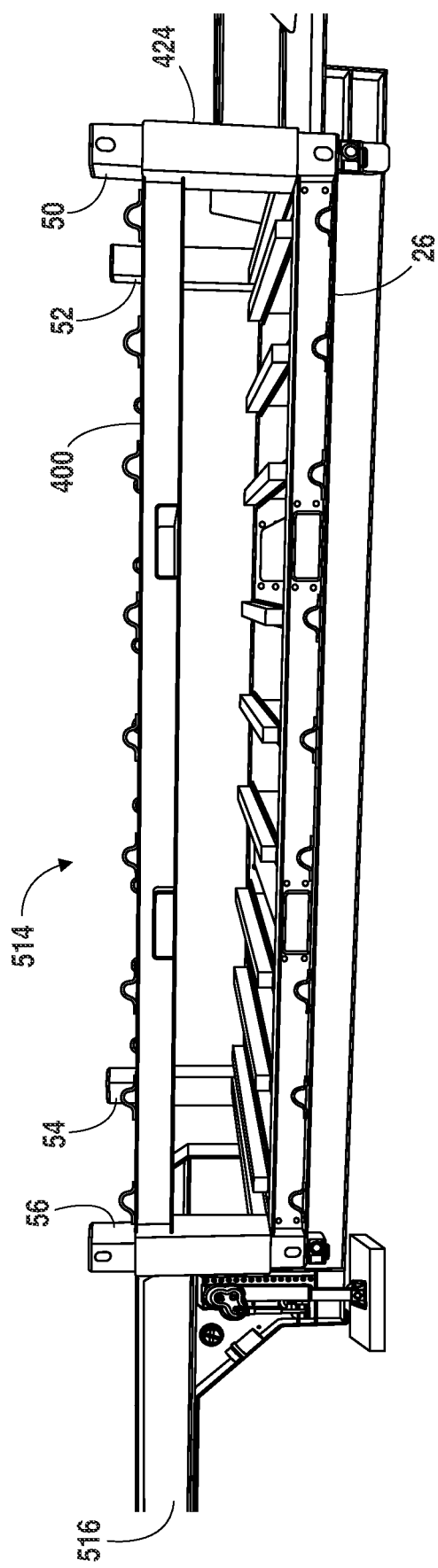
FIG. 51 is a side view of a trailer having an embodiment of an open frame rack of the present invention attached thereto and an embodiment of a closed frame rack of the present invention attached to an embodiment of an open frame rack of the present invention.
Figure 52:
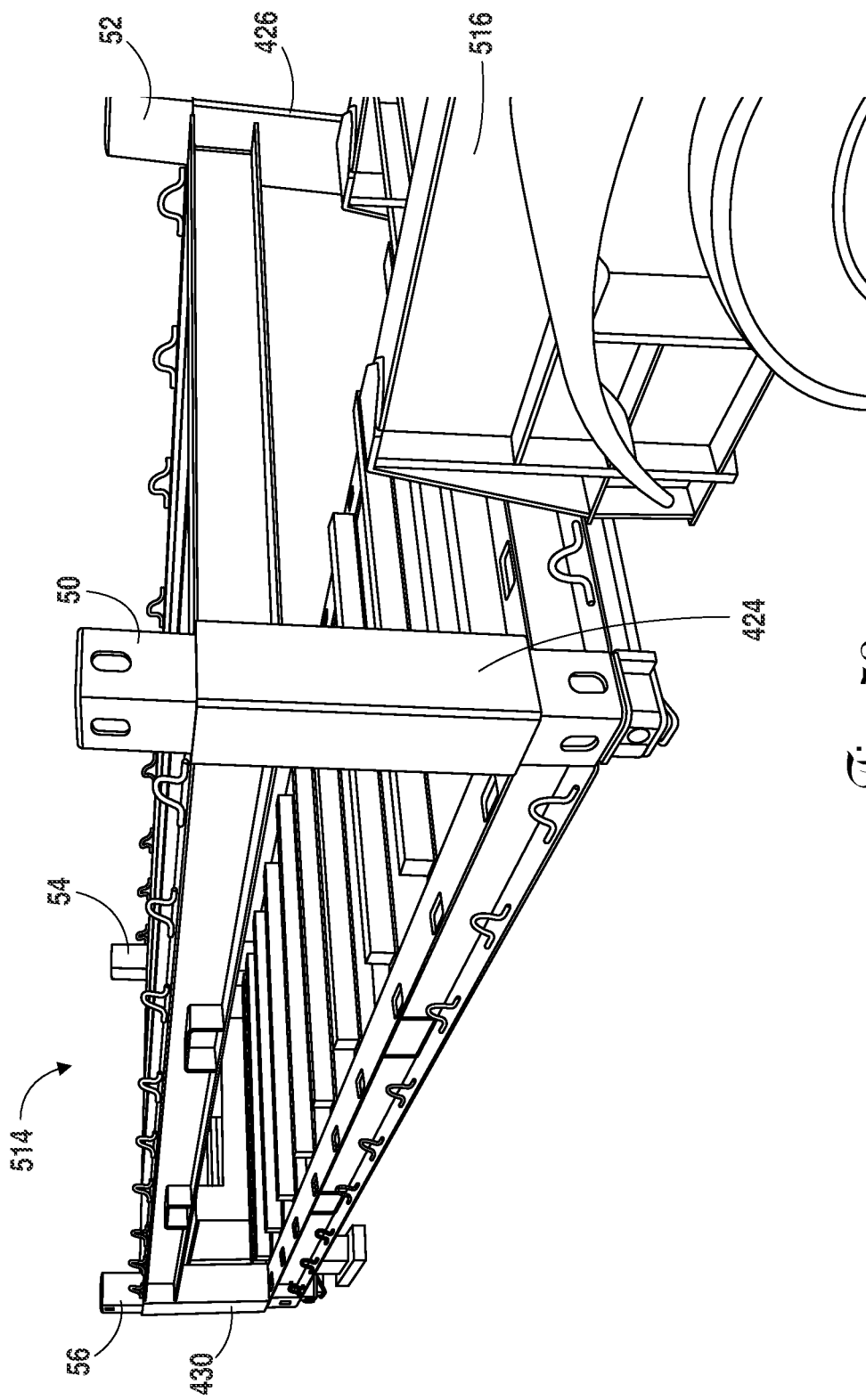
FIG. 52 is a perspective view with respect to FIG. 51 of the closed frame rack fitted over the open framed rack of the present invention.
Figure 53:
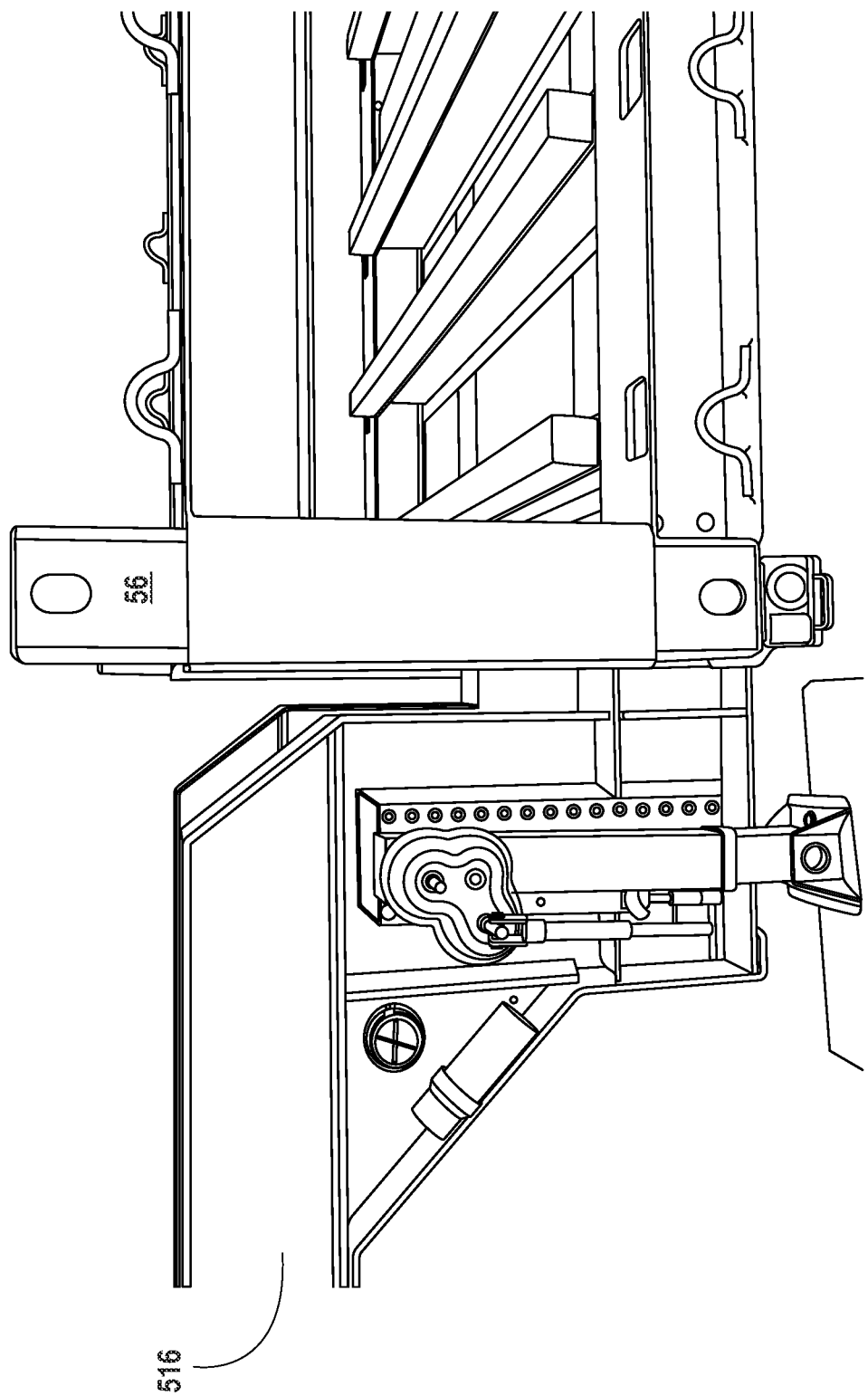
FIG. 53 is a partial closeup plan view with respect to FIG. 51 showing the connection of the hollow post of the closed frame rack fitted over the pin post of the open frame rack.

The lifting, transporting and stacking of the bunks are handled by forklifts, reach stackers and other top handlers, depending on the site conditions and total gross weight to be carried. For example, for hoisting and transporting a two stacked set of bunks requires a suitable MHE, such as handler 240, as shown in FIG. 29. The articulating arm of handler 240 has a double-cone twist lock container-to-container locking pin similar to double-cone twist lock container-to-container locking pin 230 and engages the apertures of pin pads of pin posts of open frame rack 228, as shown in FIG. 29 (see also, twist locks 502, 504, 506 in FIG. 50). The cargo loaded bunks, whether singles or stacked, may then be loaded onto a trailer for transport to the desired location, as shown in FIGS. 30 and 31.

Figure 32:
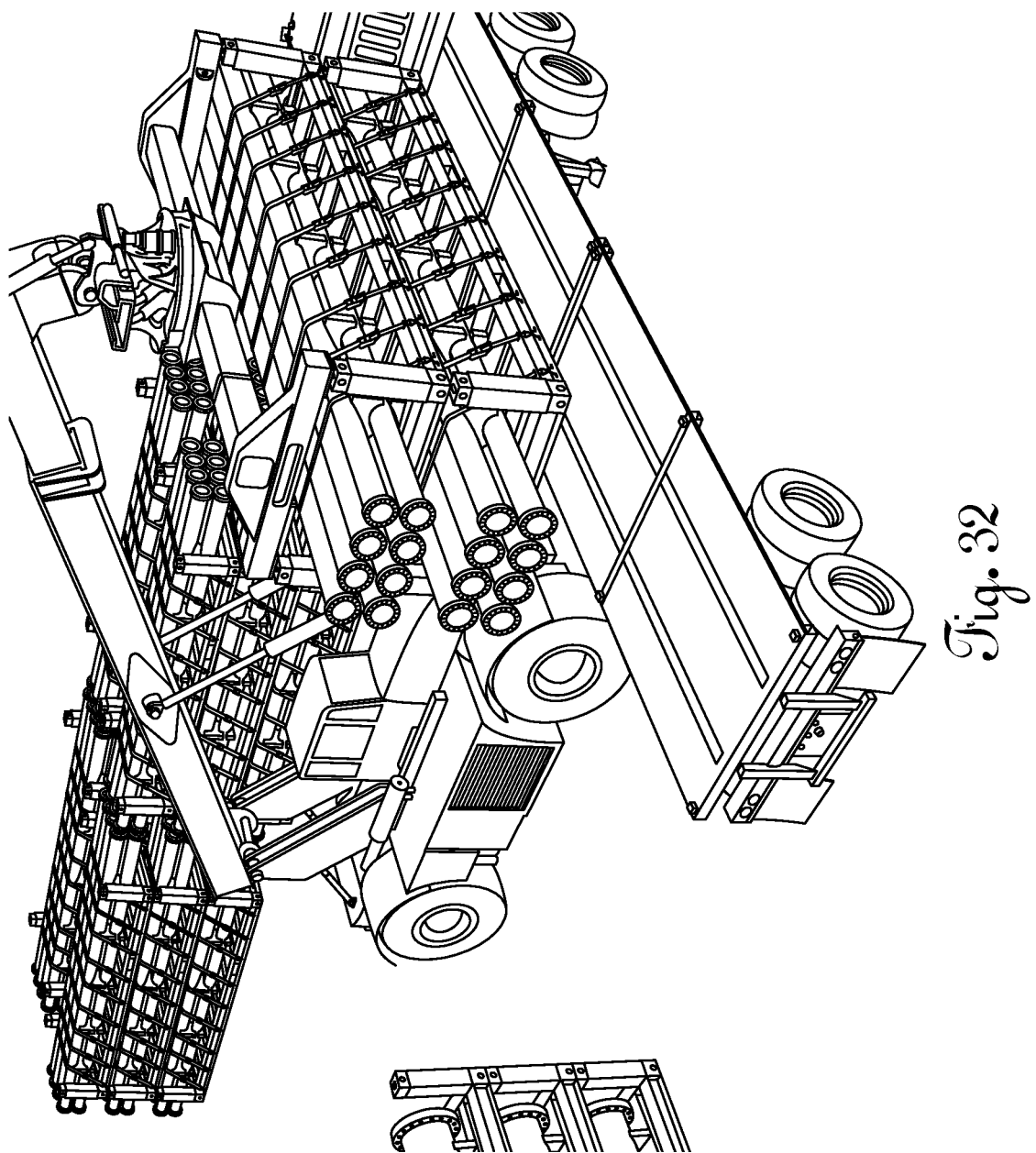
FIG. 32 shows the handling and unloading of cargo-loaded open framed racks and inventory of same using a top handler at a construction site.
Figure 34:
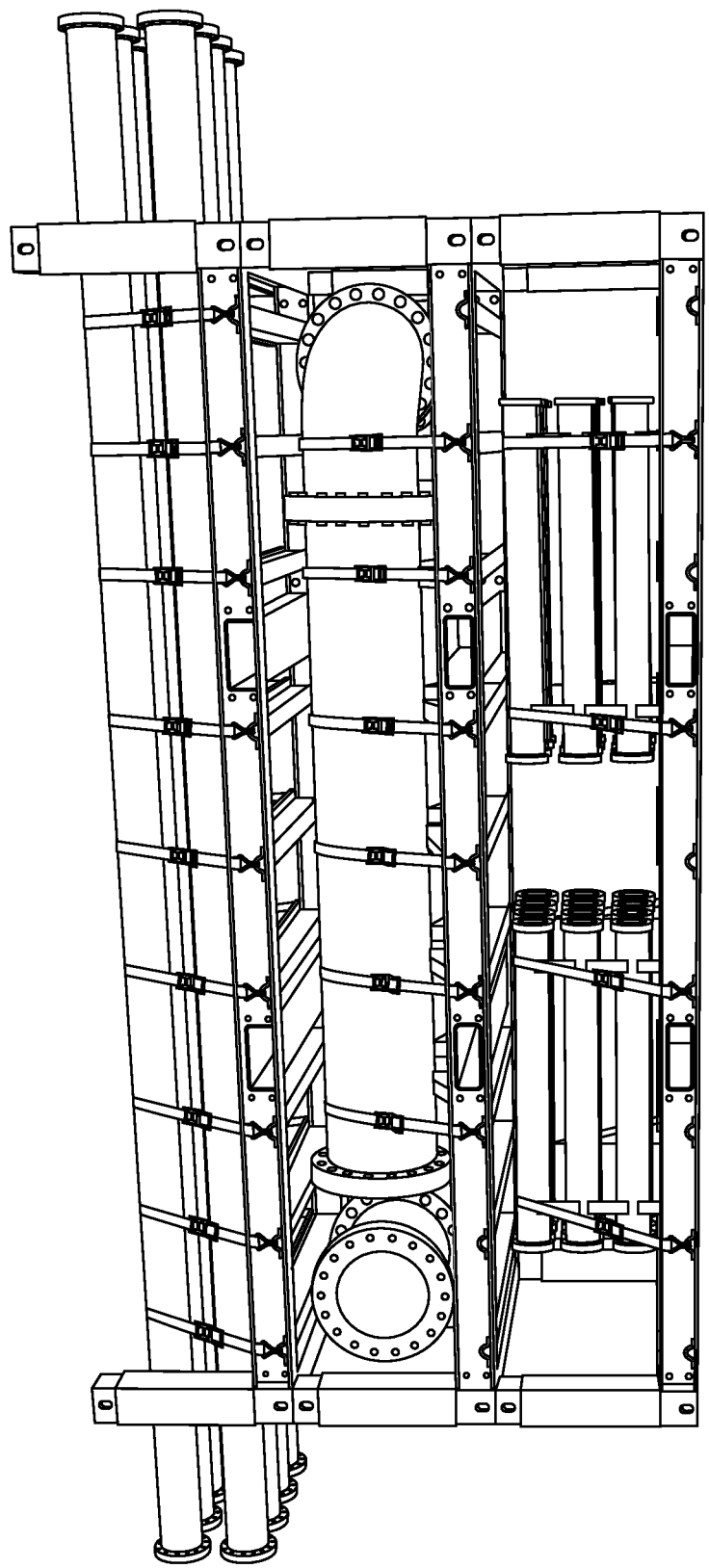
FIG. 34 depicts multiple cargo-loaded open framed racks in a stacked configuration, each rack accommodating different shaped and sized products.
Figure 35:
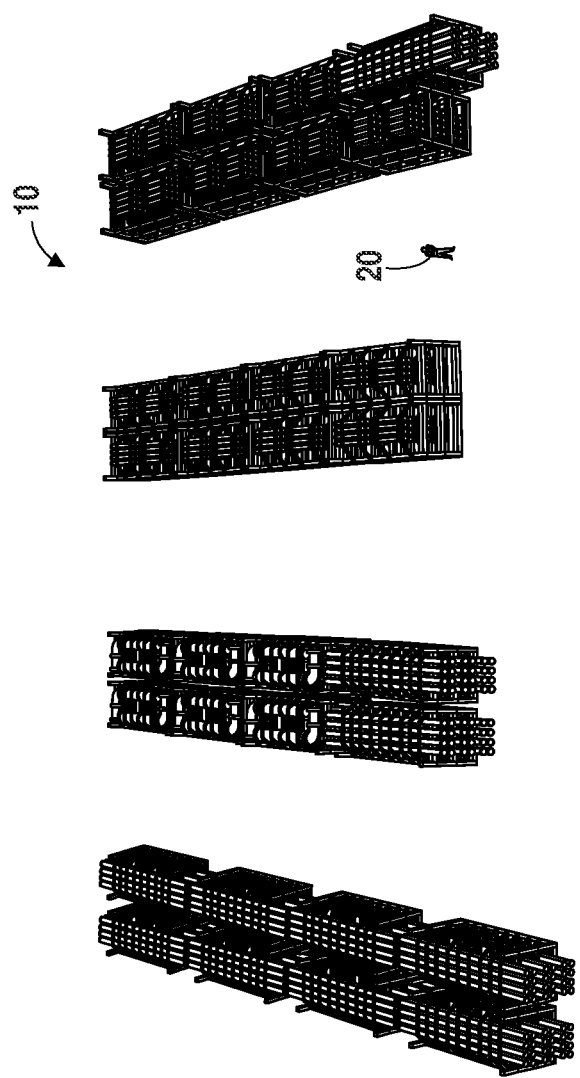
FIG. 35 depicts an aerial view of a yard utilizing the embodiments and methods of the present invention resulting in a substantially reduced yard footprint.

Once the cargo loaded bunks have arrived at the desired location, a similar process, but in reverse, is performed to remove the bunks from the trailers and place them at the desired location, as shown in FIGS. 32-34. Once the cargo arrives at the point of destination, e.g., at the project site, the cargo is unloaded from the trailers via forklifts, reach stackers and/or other top handlers. The color-coded sleeves, identification numbers and/or RFID system allows for easy check of the cargo by the recipient and placement into inventory. The bunks carrying the cargo are then arranged at the onsite staging area in order of assembly. Alternatively, of the material delivered is to be utilized soon after delivery, then the bunks are transported near the work area. The stackability of the bunks allows efficient use of limited work area around heavy machinery, such as cranes. The method of the present invention substantially reduces the footprint of the yard, as shown in FIG. 35.

The Tray

Referring now to FIGS. 36-40, closed frame rack 400 has a rectangularly configured frame comprised of side rails 402 and 404, end rails 418 and 420 and hollow legs 424, 426, 428 and 430 at the corners connecting side rails 402 and 404, end rails 418 and 420.

Figure 46:
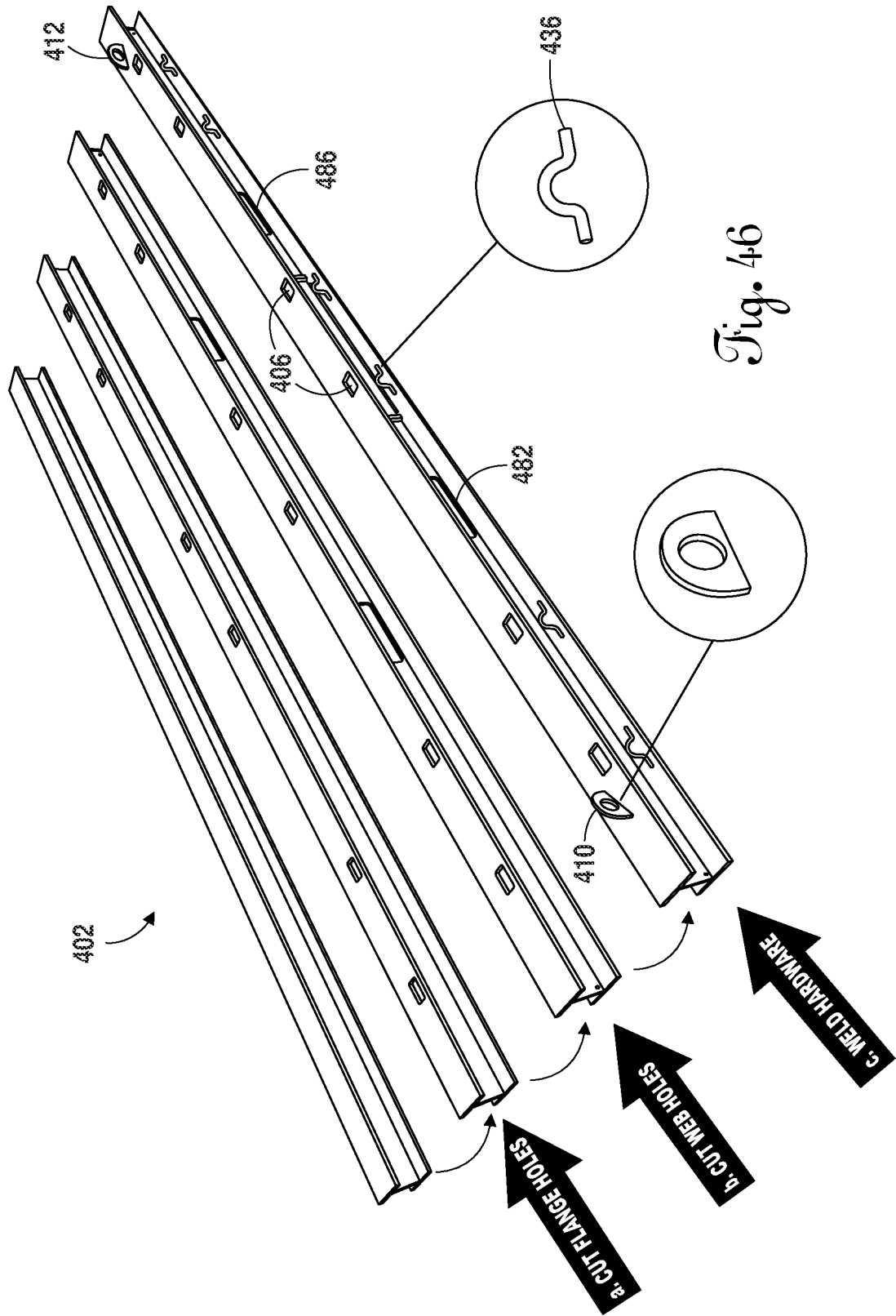
FIG. 46 is a perspective view of the side rails of an embodiment of the closed frame rack of the present invention.

Referring to FIGS. 36-39 and also to FIGS. 42 and 46, side rails 402 and 404 have I-beam configurations. Tie-down anchors are on the bottom of each I-beam side rail. For example, tie-down anchors 432, 434, 436, 438, 440 and 442 are spaced at predetermined intervals along lower surface 444 of side rail 404. Tie-down anchors 432, 434, 436, 438, 440 and 442 on the bottom of each I-beam side rail 404 are vertically aligned with a plurality of strap ports 406 along upper surface 446 of I-beam side rail 404. A strap, such as a tie down strap or other securing device, such as rachet straps, passes through strap ports 406 and is secure to tie-down anchors 432, 434, 436, 438, 440 and 442. In this fashion, the tie-down strap (not shown) is protected from damage during transport. Side rail 402 has a similar configuration. Decking strip 492 is located on lower surface 444 of side rail 404 between forklift pockets 482 and 486. The present invention contains six tie-down anchors. However, more tie-down anchors (and corresponding strap ports) may be included and still remain within the contemplation of the present invention.

Still referring to FIGS. 36-39 and also to FIGS. 42, 46, drain holes 408 (only one of which can be seen in FIG. 36) are at each end of side rails 402 and 404 proximate to end rails 418 and 420. Anchor mounts 410, 412, 414 and 416 at each end of side rails 418 and 420 extend distally from upper surfaces 446 and 450 of side rails 404 and 402, respectively. Anchor mounts 410, 412, 414 and 416 provide additional anchor points to engage, hoist and transport closed frame rack or tray 400.

Figure 44:
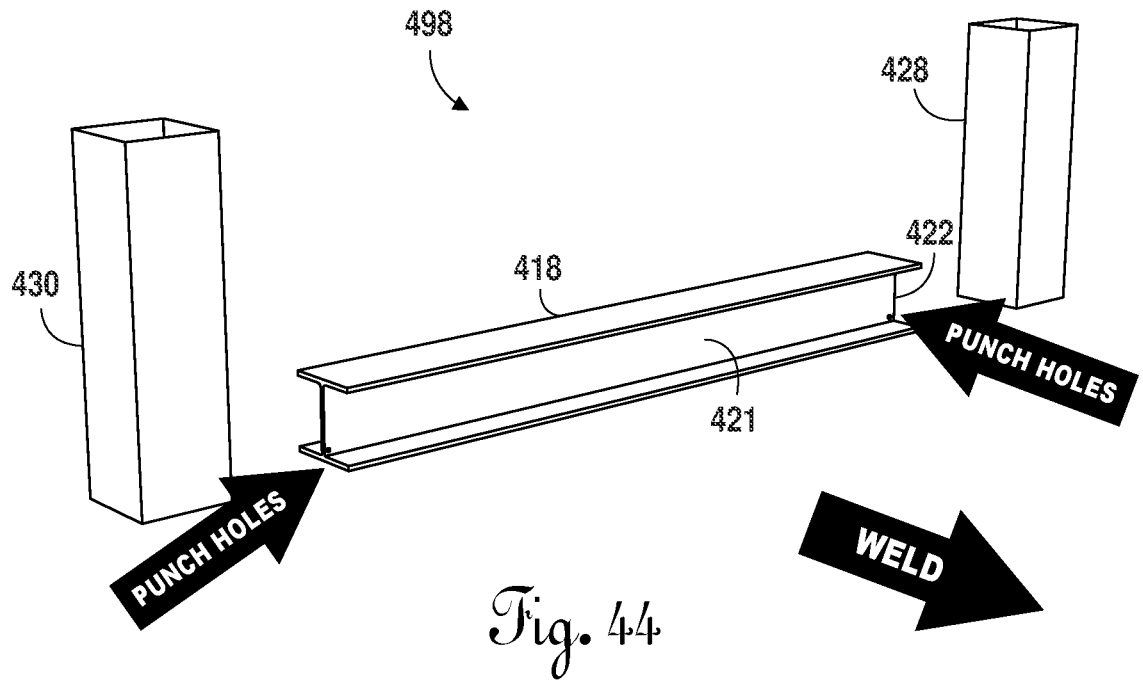
FIG. 44 shows posts and end rail of an embodiment of the closed frame rack of the present invention.
Figure 45:
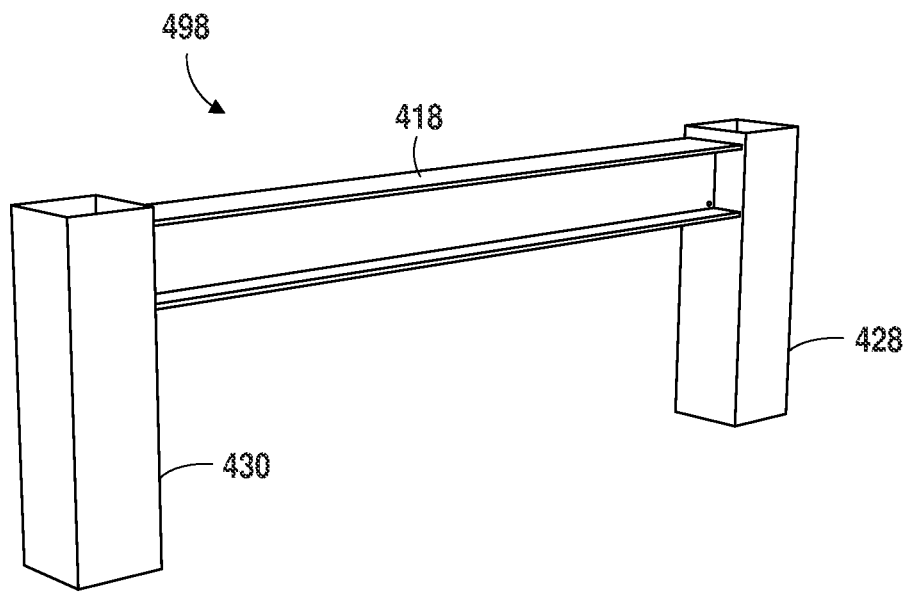
FIG. 45 depicts the attachment mechanism for the posts and end rail of an embodiment of the closed frame rack of the present invention.

Still referring to FIGS. 36-39 and also to FIGS. 44-45, end rails 418 and 420 are perpendicular to side rails 402 and 404. End rails 418 and 420 have I-beam configurations. Punch hole 422 is located on middle surface 421 of end rail 420. The connection of hollow legs 430 and 428 to either end of end rail 418 forms a "goal post" 498, as shown in FIGS. 44-45. Hollow legs 424 and 426 and end rail 420 form a similar goal post opposite goal post 498.

Referring still to FIGS. 36-39 and also to FIGS. 40, a critical feature of the present invention is the hollow leg incorporated into closed frame rack or tray 400. There are four hollow leg 424, 426, 428 and 430. One hollow leg at each corner of the tray or closed frame rack 400. Hollow leg 424 is comprised of hollow steel tubing in a rectangular configuration. Hollow leg 424 connects to end rail 420 and side rail 404. The connection is permanent and may be accomplished through welding. Hollow leg 424 is flush with the edges of the lower surface 444 and upper surface 446 of I-beam side rail 404. Hollow legs 426, 428 and 430 are similarly configured.

Each hollow leg is 33" high measured from the ground to the top of the hollow leg. However, different heights may also be used without deviating from the present invention.

Figure 47:
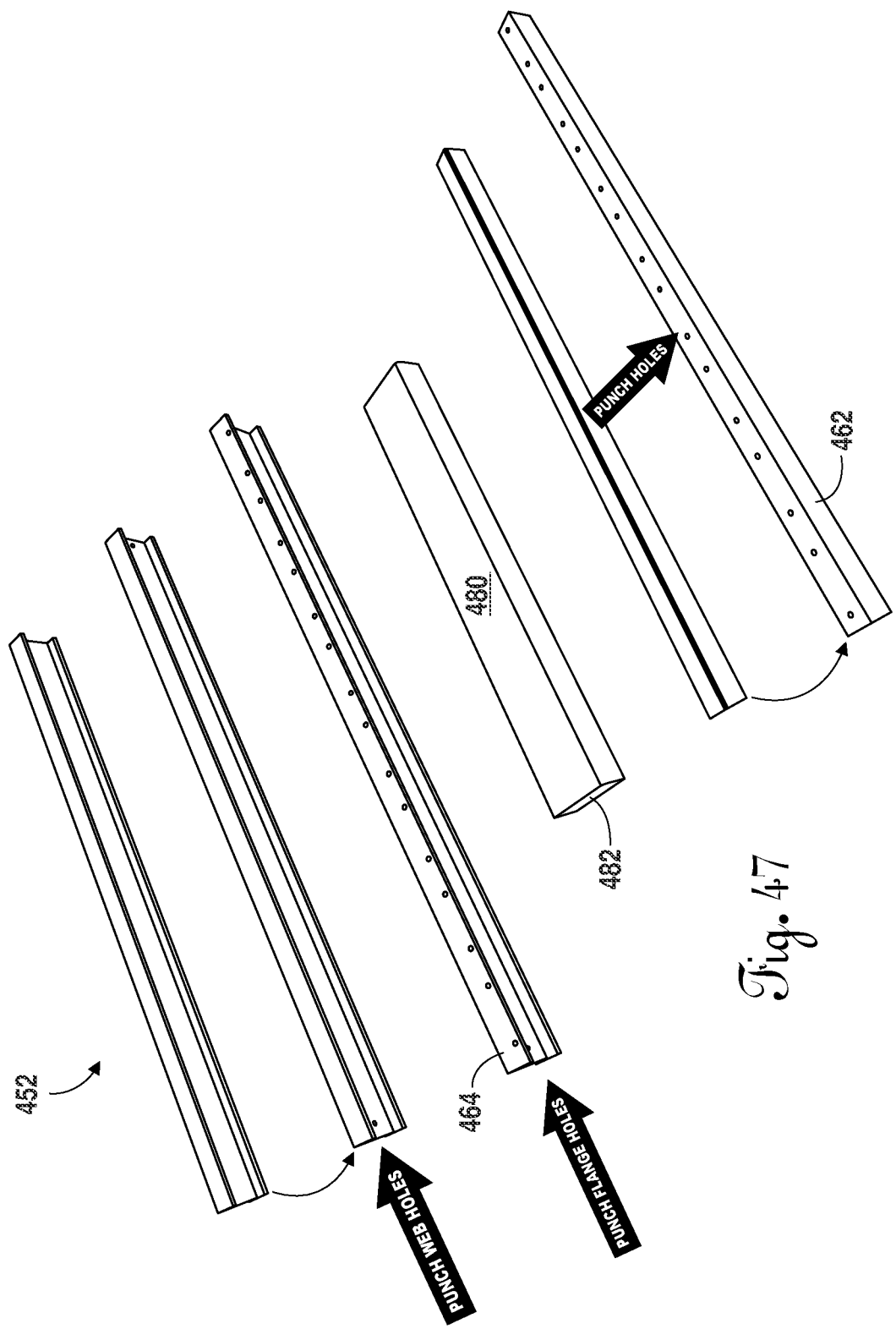
FIG. 47 is a perspective view of the cross members of an embodiment of the closed frame rack of the present invention.

Still referring to FIGS. 36-39 and also to FIG. 47, several cross beams or members provide strength and reinforcement to tray 26. Cross beams 452, 454, 456, 458 and 460 have an I-beam configuration. End cross members 462 and 466 have perforations at predetermined intervals along the top surface. Middle cross member 464 is in an I-beam configuration and also has perforations at predetermined intervals along its top surface.

Figure 36:
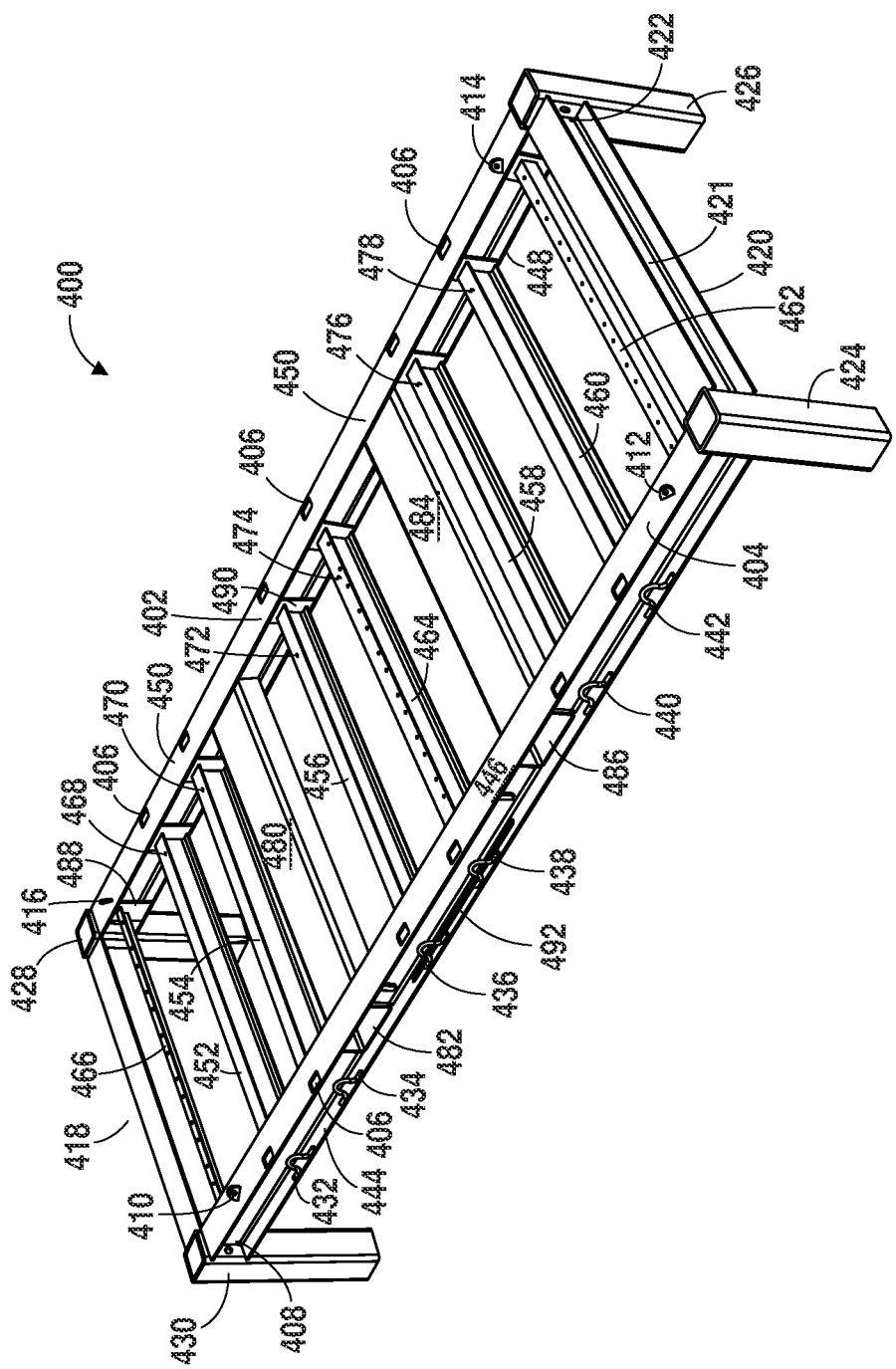
FIG. 36 is a perspective view of an embodiment of a closed frame rack of the present invention.
Figure 37:
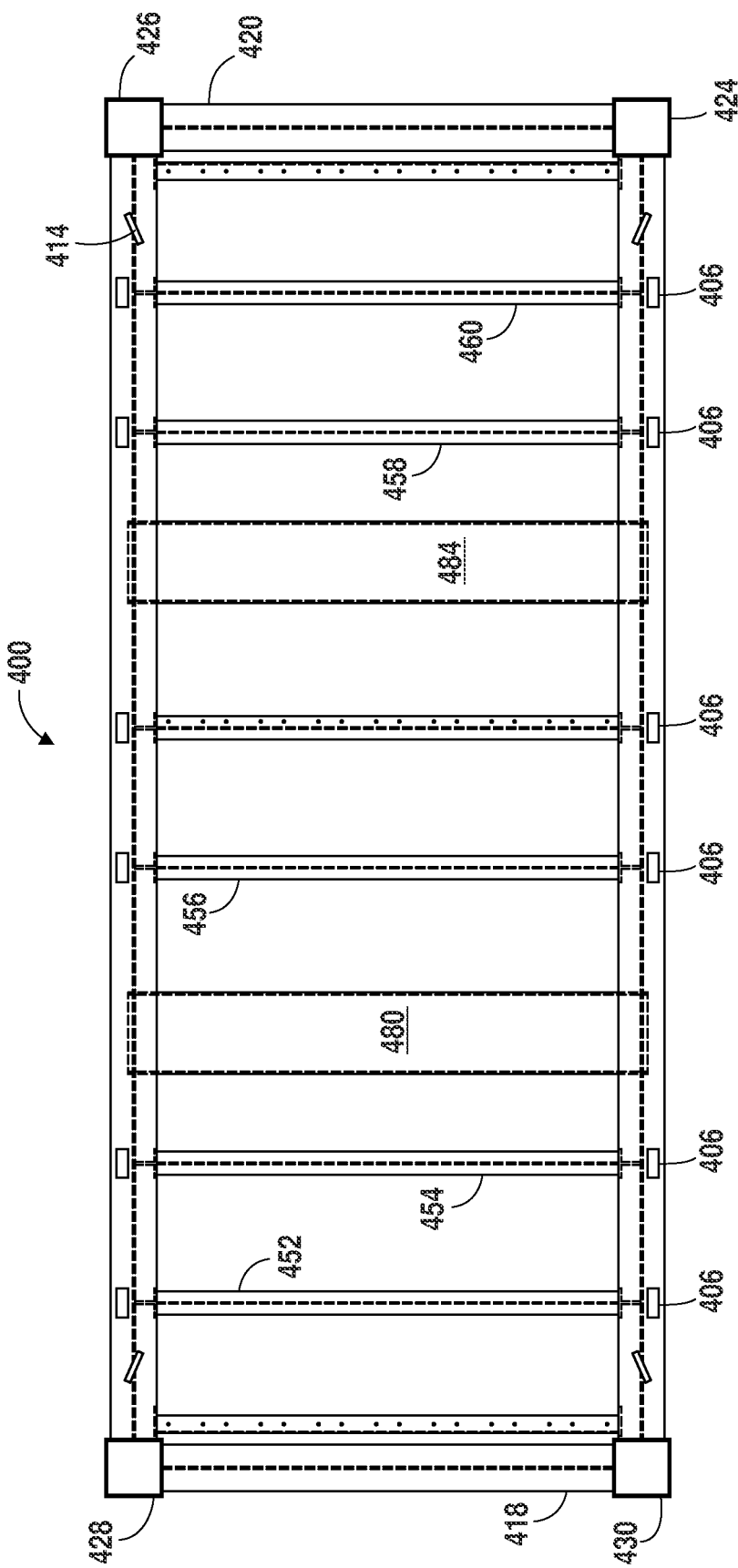
FIG. 37 is a top view with respect to FIG. 36 of the closed frame rack of the present invention.
Figure 38:
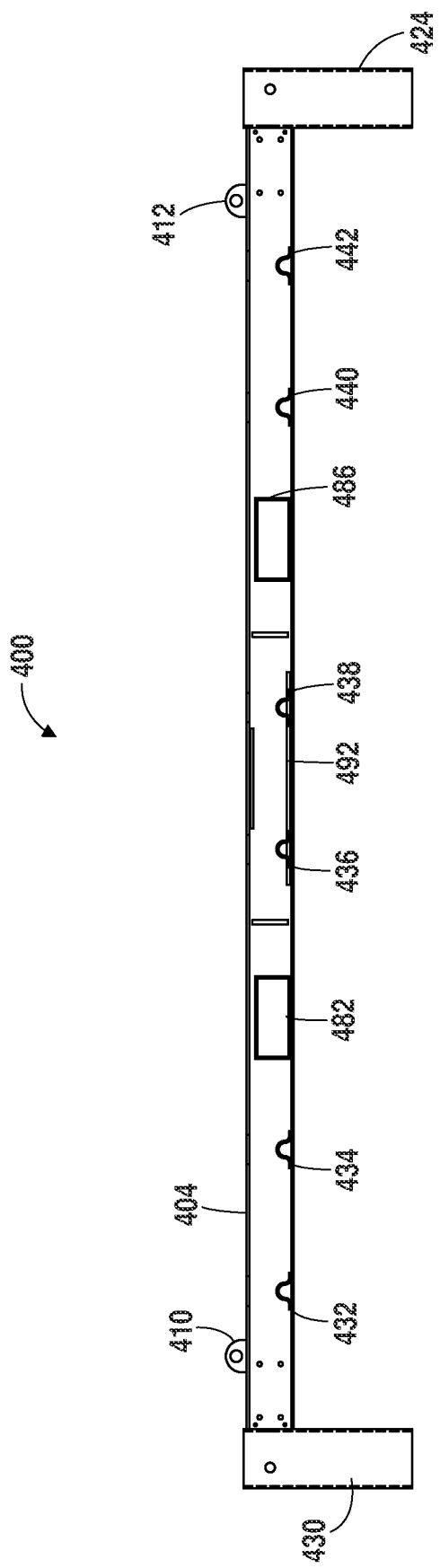
FIG. 38 is a side plan view with respect to FIG. 36 of an embodiment of the closed frame rack of the present invention.
Figure 39:
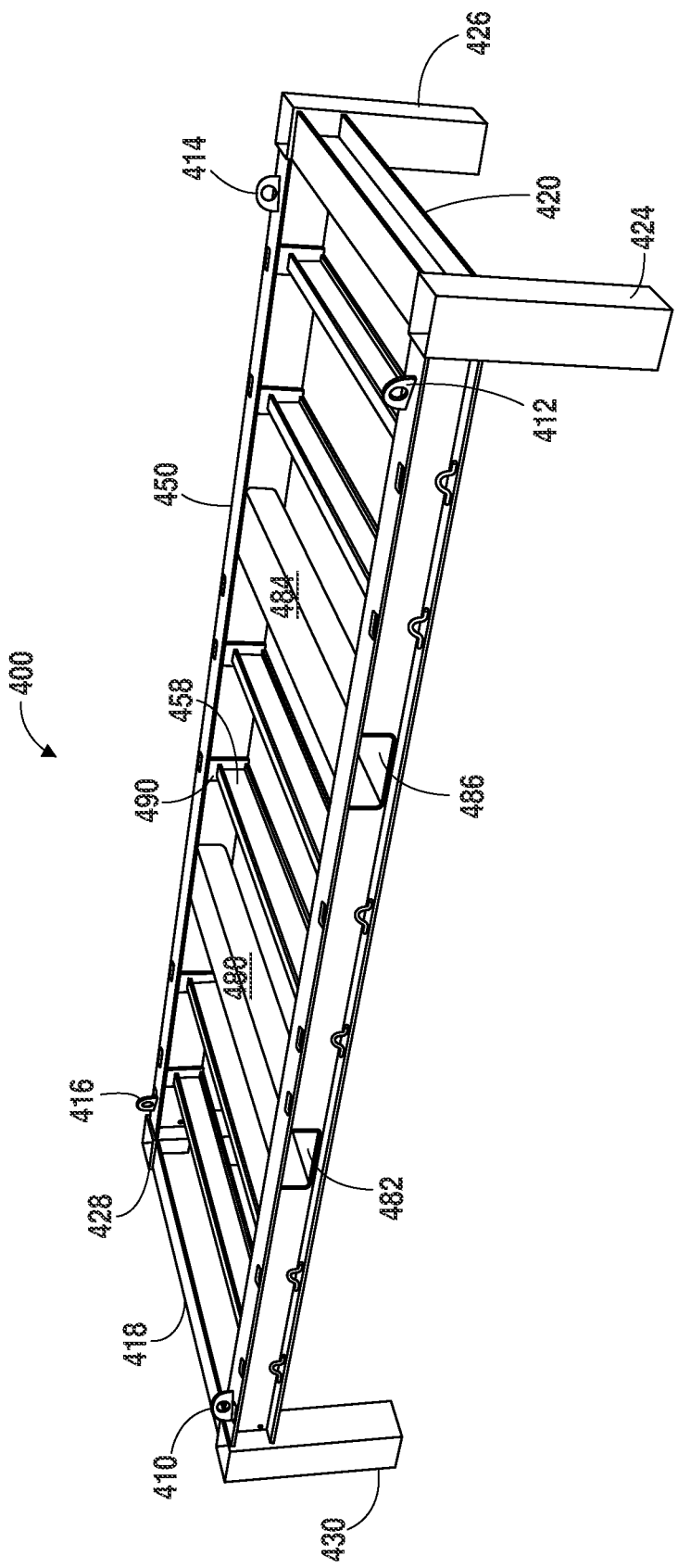
FIG. 39 is a perspective side view of an embodiment of the closed frame rack of the present invention.

Referring now to FIG. 43, plate 494 is welded to cross plate 488. Cross plates 488 and 490 are attached at each end of cross beams 452, 454, 456, 458 and 460 and of end cross members 462 and 466 and of middle cross member 464 (See, e.g., FIGS. 36 and 39). These cross plates secure the cross beams to the inside surface of side rails 402 and 404, as shown in FIG. 36. The cross plates are comprised of two welded plates.

A pair of fork tubes 480 and 484 traverse side rails 402 and 404 forming forklift pockets 482 and 486 which allows for a forklift to engage closed frame rack 400 for transporting to a different location (See, e.g., FIGS. 36-39). The distance between the fork pockets 482 and 486 of the tray 400 are generally about 72" apart. However, in some instances, it may be necessary to use a 15,000 lbs. forklift. These forklifts, however, cannot lift trays having a distance of 72" between fork pockets. These forklifts, instead, can only move trays having a distance of 60" between fork pockets. An alternative embodiment of the tray of the present invention includes a tray having a distance of 58" between fork pockets.

Figure 48:
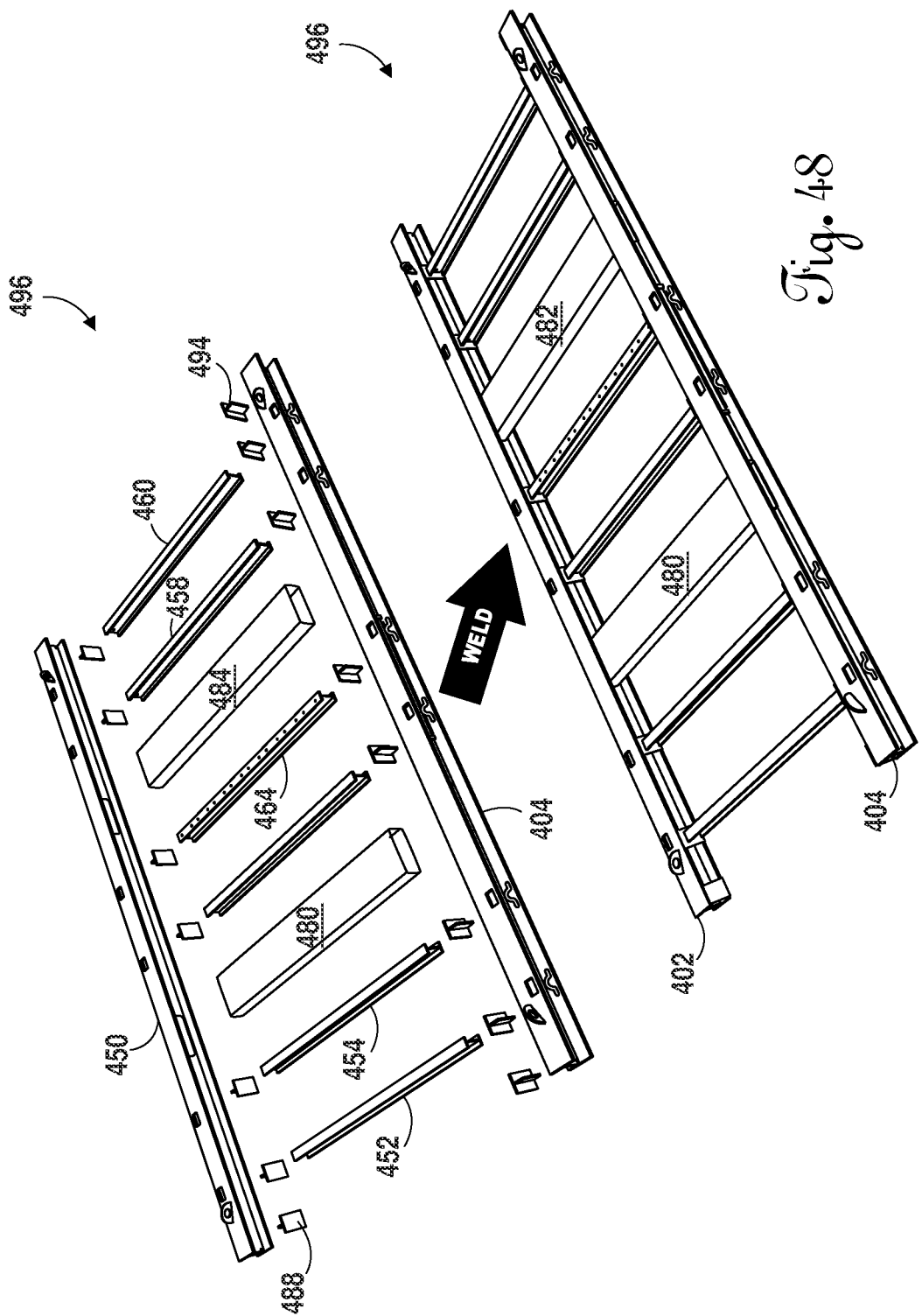
FIG. 48 shows an exploded view of the deck and manner of attachment of components for same of an embodiment of the closed frame rack of the present invention.
Figure 49:
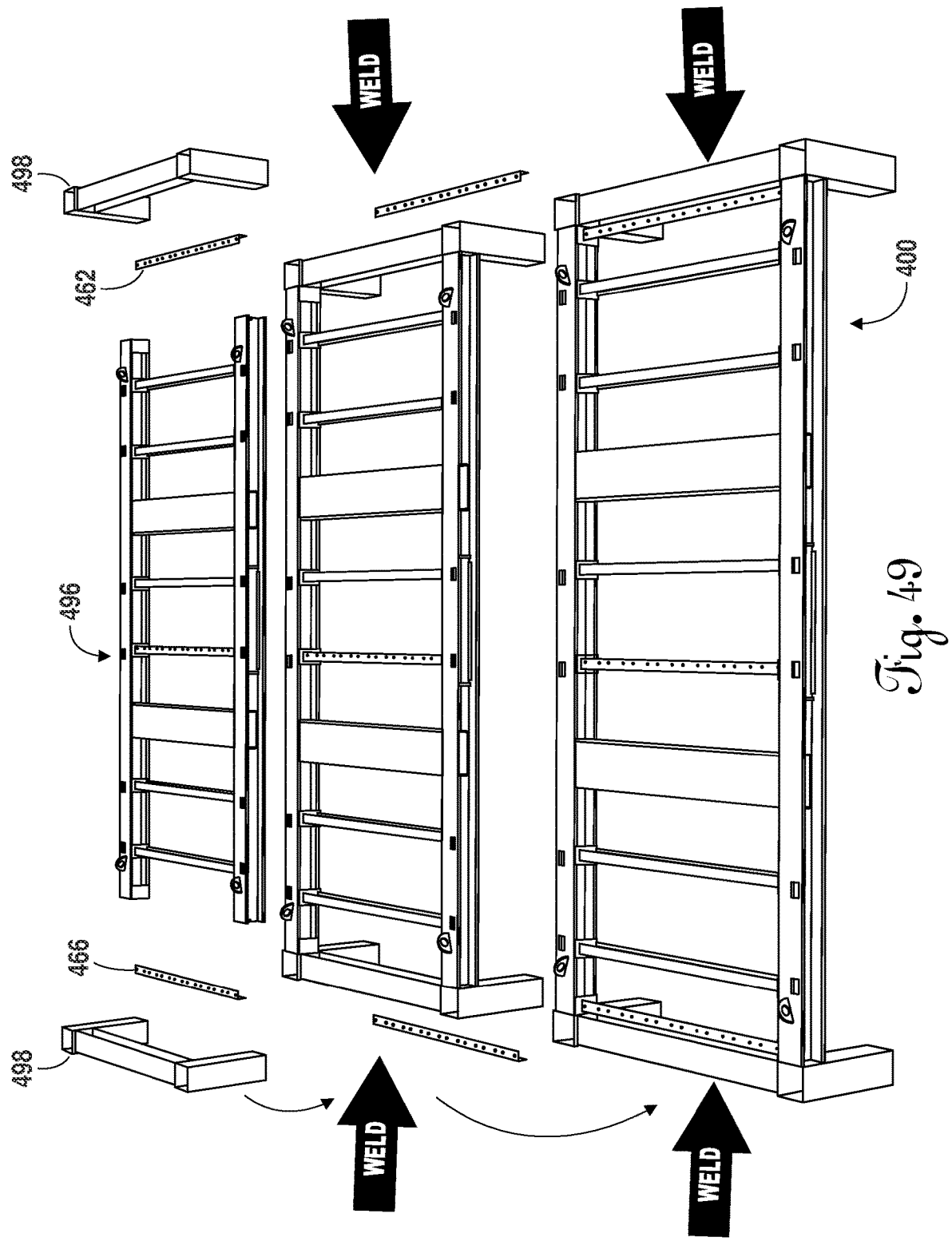
FIG. 49 depicts the final attachment mechanisms for components an embodiment of the closed frame rack of the present invention.

Referring now to FIG. 48, platform or deck 496 is comprised of side rails 402 and 404, cross members 452, 454, 456, 458 and 460, end cross members 462 and 466 and middle cross member 464, fork tubes 480 and 484, and plate 494 welded to cross plate 488. The deck or platform is formed by welding the components together. An exploded view of deck 496 describes the attachment mechanism, i.e., welding, used to connect these components. Goal posts 498 and end perforated cross members 466 and 462 are attached via welding to opposite ends of deck 496 to complete tray 400, as shown in FIG. 49.

Bunks Tray System

Figure 54:
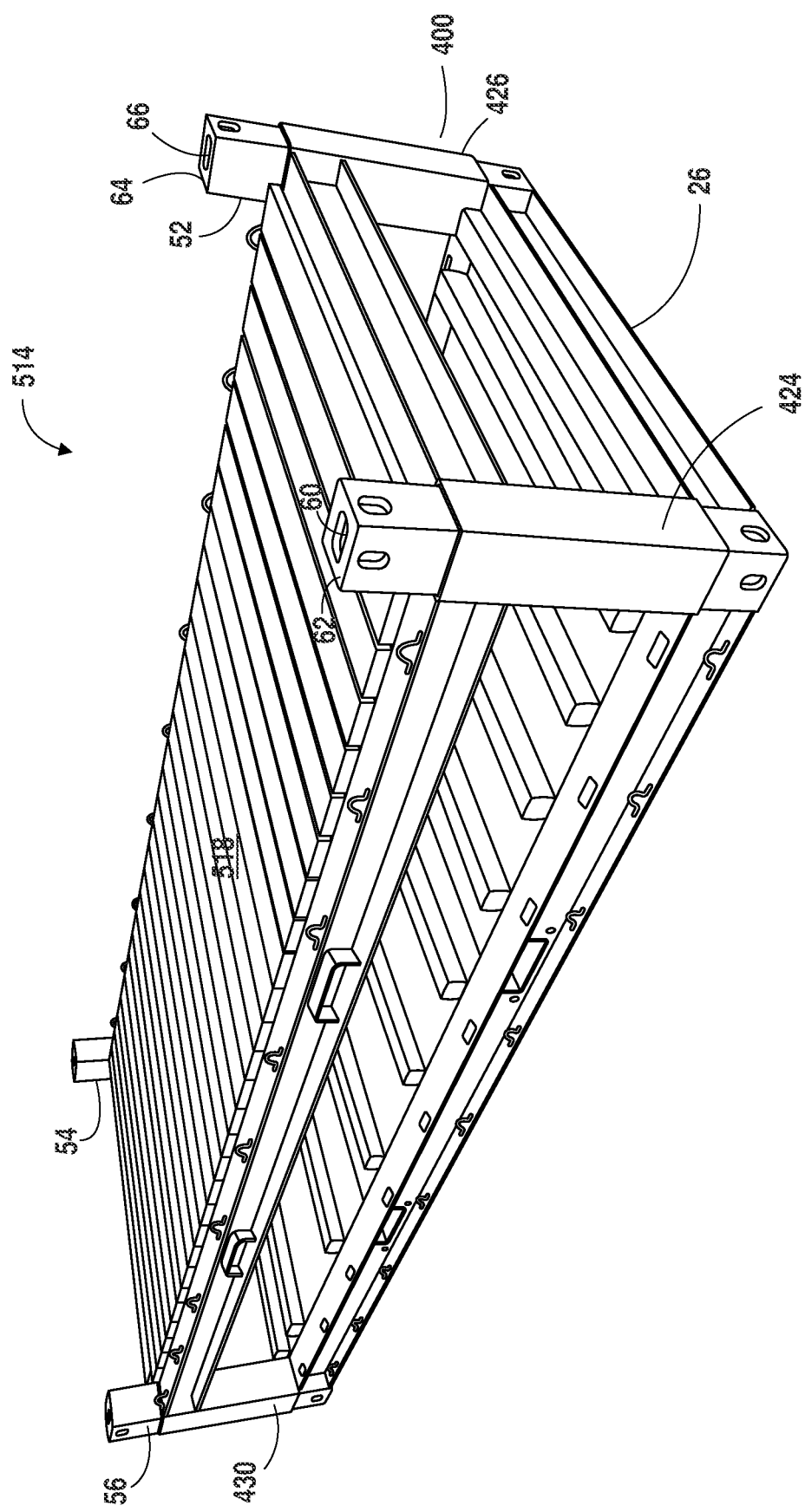
FIG. 54 is a perspective view of an embodiment of an open frame rack and a closed frame rack fitted together having cross members between the two longer sides of each rack.
Figure 55:
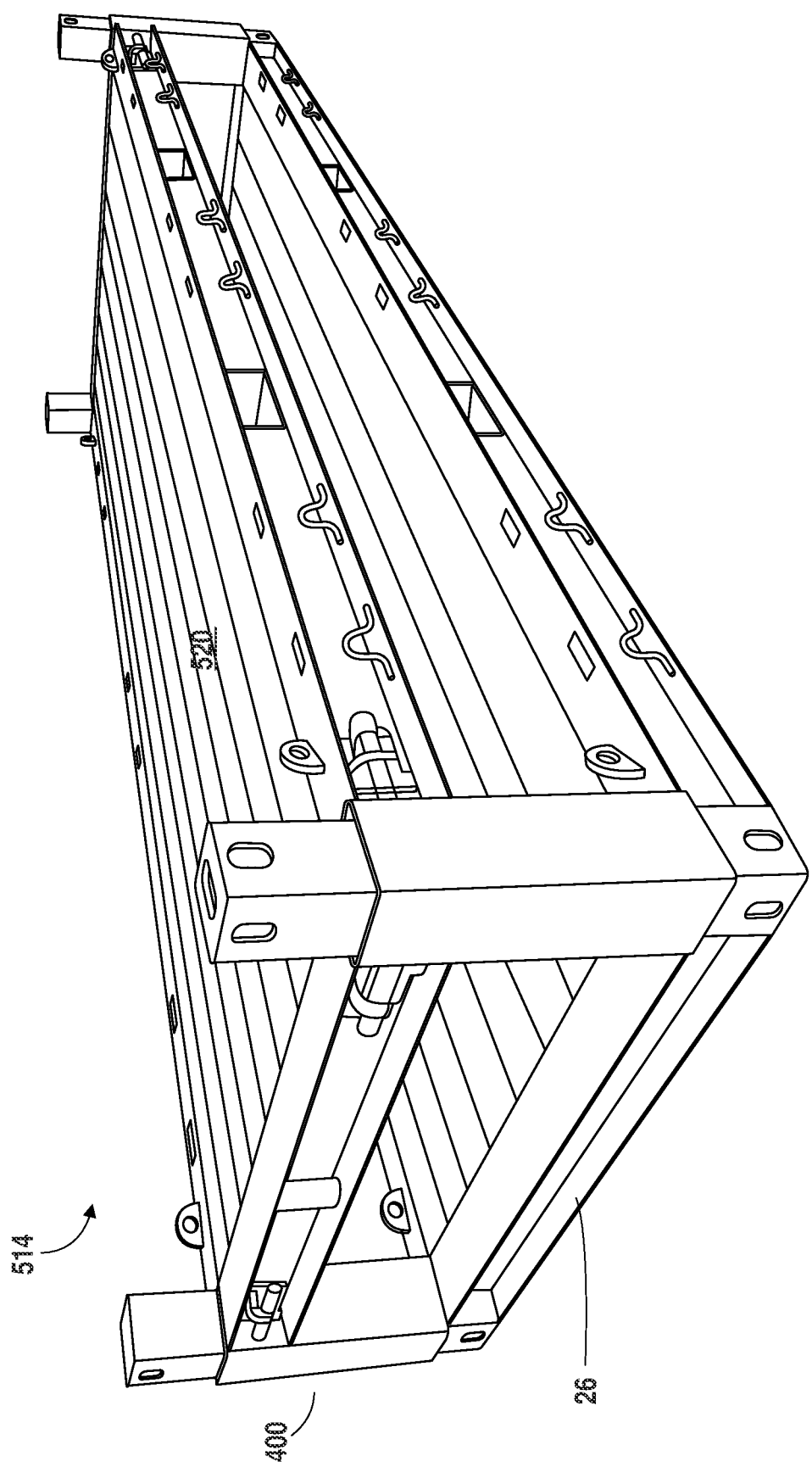
FIG. 55 is a perspective view of another embodiment of an open frame rack and a closed frame rack fitted together having cross members parallel to the two longer sides of each rack and displaying attachment of the pin pad to the pin post of an embodiment of the open frame rack of the present invention.

The bunks and trays combine to form a multi-level storage and transport medium for cargo. For example, and referring now to FIGS. 50-55, tray 400 is hoisted by handler (not shown) via articulating arm 500 using, for example, heavy duty chains 510 and 512. Tray 400 is placed over bunks 26 (previously secured to trailer 516) by sliding hollow legs 424, 426, 428 and 430 over corresponding pin posts 50, 52, 54 and 56 until hollow legs 424, 426, 428 and 430 rest on side rails 28 and 30 and end rails 44 and 46. Combination 514 now incorporates both bunks 26 and tray 400 as a multi-level storage and transport medium. Platform or deck 518 of tray 400 may be close fitting lumber cross members, as shown in FIG. 54, or platform or deck 520 may stretch across the length of bunks 26 and tray 400 as shown in FIG. 55.

Figure 61:
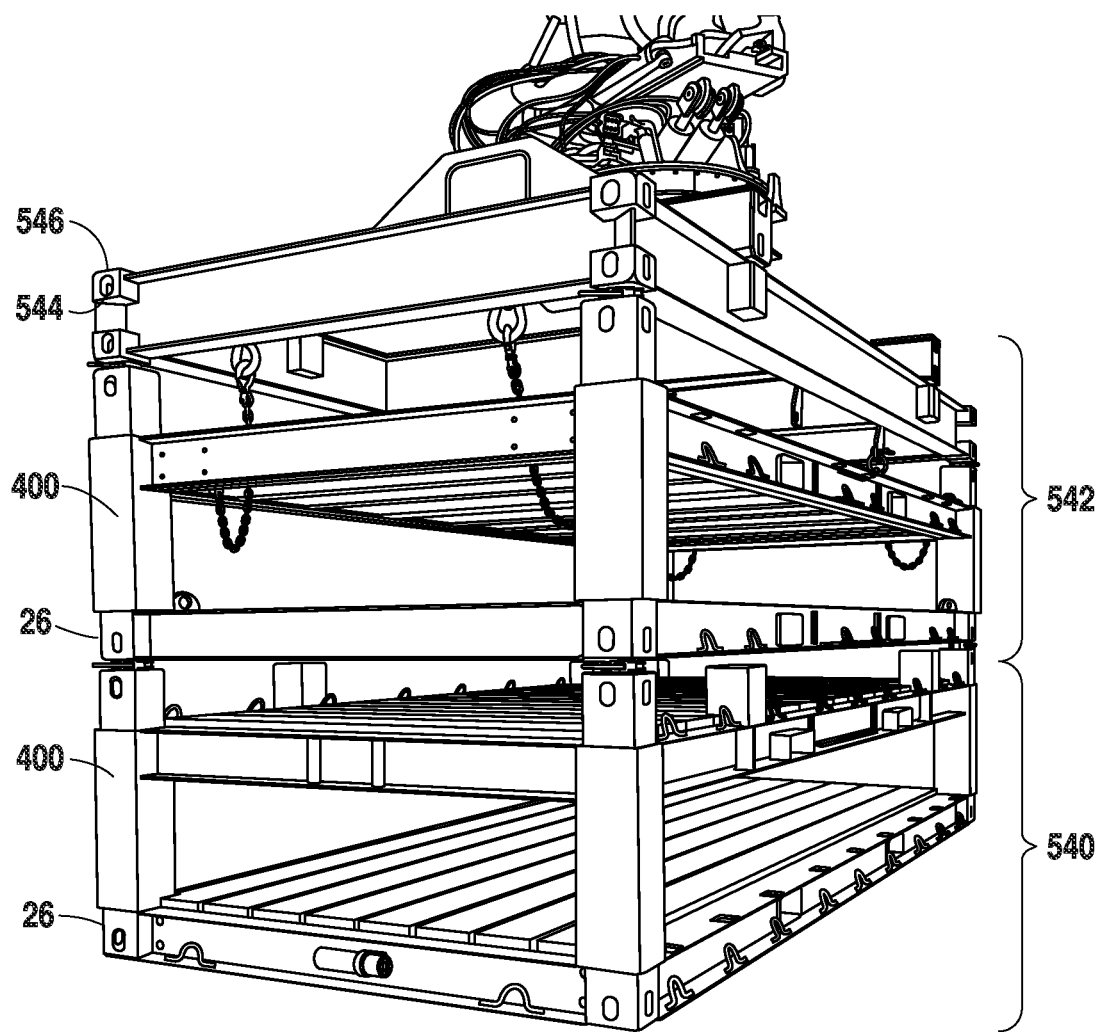
FIG. 61 shows two complete open frame rack and closed frame rack assemblies connected and ready to move.
Figure 62:
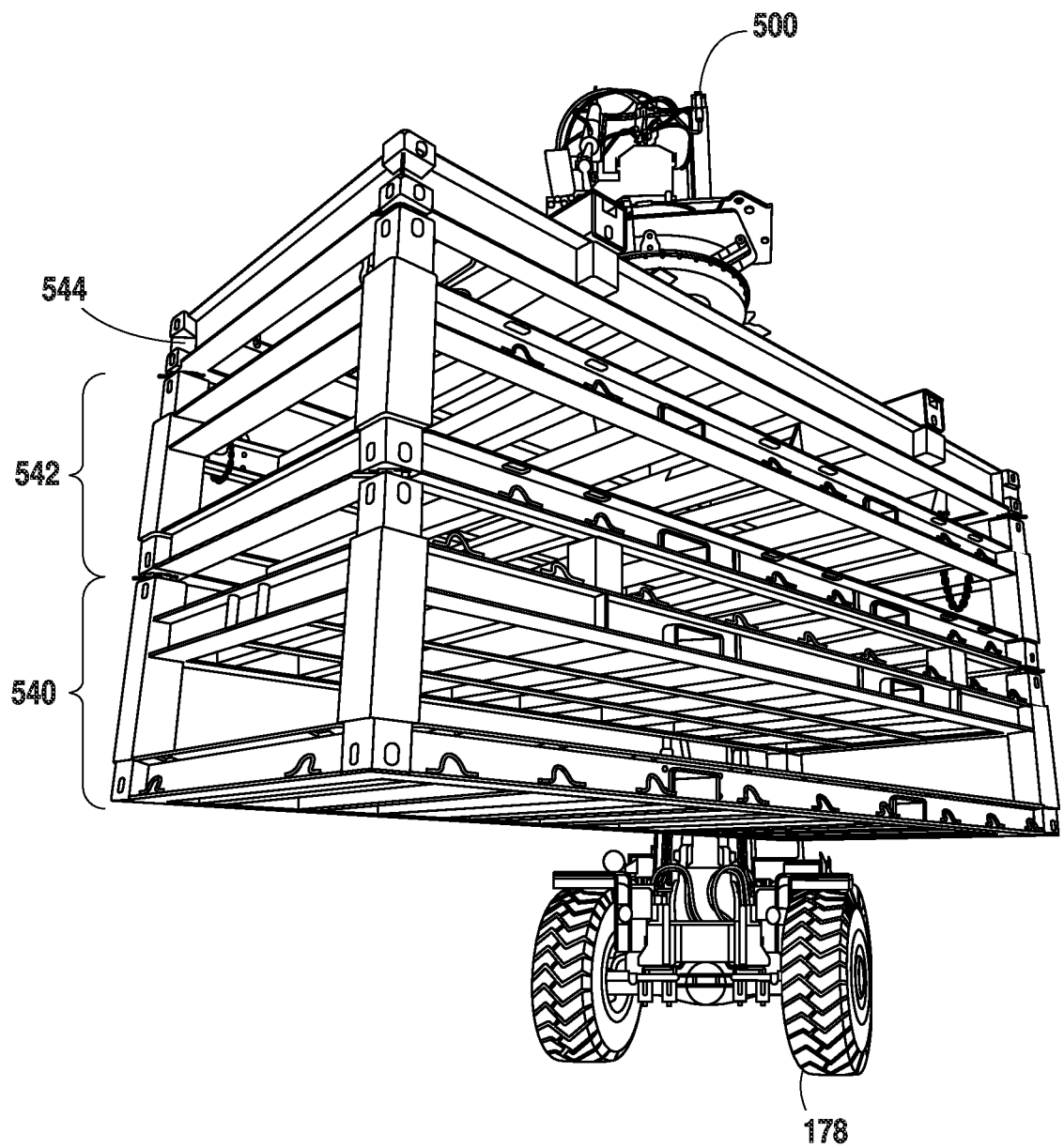
FIG. 62 shows two complete open frame and closed frame assemblies connected and in transport by a rough terrain container top handler.

Referring now to FIGS. 61-62, two complete bunks and trays assembly sets, connected and ready for transport, are shown. Tray 400 nests comfortably, safely and securely on bunks 26 by sliding hollow legs of tray 400 over pin posts of bunks 26, thus allowing for multiple levels of product to be assembled, stored and transported. Bunks and tray set 542 is stacked over bunks and tray set 540. An ISO compatible platform 544 connects and is secured to pin posts of bunks 26 in bunks and tray set 542. Articulating arm 500 of Top handler 178 is used to hoist and move Bunks and tray sets 540 and 542 in stacked configuration. Up to two bunk racks may be stacked and moved simultaneously by an MHE with the heavier loads positioned on the bottom.

The present invention generally utilizes top handlers having 20' twist lock pins for engagement to bunks and trays. However, a manual 12-20 adapter may also be used, as shown in FIG. 61, which requires the operator to engage the twist locks manually, and still remain within the contemplation of the present invention.

Referring now to FIG. 63, pin posts (of which only pin posts 50, 52, 56 can be seen) of the open frame flatrack may be extended to accommodate up to three trays 400. This increase in height further reduces the footprint of equipment stored in a yard.

The present invention has application in the construction industry. The present invention may also have application in the oil and gas industry and agricultural industry where the transporting, storing and maintaining of inventory of large products may be desired.

The various embodiments described herein may be used singularly or in conjunction with other similar devices. The present disclosure includes preferred or illustrative embodiments of specifically described apparatuses, assemblies, and systems. Alternative embodiments of such apparatuses, assemblies, and systems can be used in carrying out the invention as described herein. Other aspects and advantages of the present invention may be obtained from a study of this disclosure and the drawings.

I claim:

1. A system for the transportation, storage and inventory of a multitude of commodities, said system comprising:
   an open frame rack, said open frame comprising:
      a plurality of side rails having an I-beam configuration;
      a plurality of end rails;
      a plurality of pin posts connecting said plurality of side rails to said plurality of end rails, said plurality of pin posts having a top end and a bottom end, and wherein said plurality of side rails are perpendicular to said plurality of end rails;
      a plurality of plates, each of said plates attached to said top end and said bottom end of each of said plurality of pin posts, said plate attached to said top end having an aperture thereon; and
      a plurality of cross beams between said plurality of side rails; and
   a closed frame rack, said closed frame rack comprising a plurality of legs, and wherein said plurality of legs are slidably attached to said open frame rack.

2. The system for the transportation, storage and inventory of a multitude of commodities, as recited in claim 1, further comprising sleeves slidably attached to said plurality of pin posts, said sleeves having an area for placing indicia of identifying information.

3. The system for the transportation, storage and inventory of a multitude of commodities, as recited in claim 2, further comprising a protective case releasably attached to one of said plurality of end rails, said protective case for transportation of documentation.

4. The system for the transportation, storage and inventory of a multitude of commodities, as recited in claim 3, further comprising radio-frequency identification (RFID) tags.

* * * * *